(12) United States Patent  (10) Patent No.: US 8,782,639 B2
Nishiguchi et al.  (45) Date of Patent: Jul. 15, 2014

(54) COMPUTER SCHEDULING PRODUCT AND APPARATUS THEREFOR

(75) Inventors: Naoki Nishiguchi, Kawasaki (JP); Noboru Iwamatsu, Kawasaki (JP); Masatomo Yasaki, Kawasaki (JP)

(73) Assignee: Fujitsu, Limited, Kawasaki (JP)

( * ) Notice: Subject to any disclaimer, the term of this patent is extended or adjusted under 35 U.S.C. 154(b) by 215 days.

(21) Appl. No.: 13/345,424

(22) Filed: Jan. 6, 2012

(65) Prior Publication Data

US 2012/0240112 A1  Sep. 20, 2012

(30) Foreign Application Priority Data

Mar. 15, 2011 (JP) .................. 2011-057290

(51) Int. Cl.
*G06F 9/455* (2006.01)
*G06F 9/46* (2006.01)

(52) U.S. Cl.
USPC ................. 718/1; 718/102; 718/103

(58) Field of Classification Search
USPC ................. 718/100, 103, 104, 107
See application file for complete search history.

(56) References Cited

U.S. PATENT DOCUMENTS

| | | | |
|---|---|---|---|
| 4,805,107 A * | 2/1989 | Kieckhafer et al. | 714/4.3 |
| 5,095,427 A * | 3/1992 | Tanaka et al. | 718/1 |
| 7,810,096 B2 | 10/2010 | Saito et al. | |
| 2006/0005187 A1* | 1/2006 | Neil | 718/1 |
| 2006/0005190 A1 | 1/2006 | Vega et al. | |
| 2006/0129600 A1* | 6/2006 | Ode | 707/104.1 |
| 2009/0198766 A1* | 8/2009 | Chen et al. | 709/202 |

FOREIGN PATENT DOCUMENTS

| | | |
|---|---|---|
| EP | 1059582 A | 12/2000 |
| JP | 59-058553 A | 4/1984 |
| JP | 5-233572 A | 9/1993 |
| JP | 2000-242512 A | 9/2000 |
| JP | 2000-347883 A | 12/2000 |
| JP | 2006-018820 A | 1/2006 |
| JP | 2009-176139 A | 8/2009 |

* cited by examiner

*Primary Examiner* — Kenneth Tang
(74) *Attorney, Agent, or Firm* — Fujitsu Patent Center

(57) ABSTRACT

A computer-readable recording medium stores therein a scheduling program that causes a computer to execute a process. The process includes executing multiple virtual computing machines that operate an OS; receiving a change in the number of activations of completely activated software from the OS; updating when the change in the number of activations has been received, a first table that stores software completely activated in the OS; selecting from a second table that stores combinations of a completely activated software group, a combination according to a software group stored in the first table; extracting from the second table and according to the selected combination, priorities of software stored for each of the combinations; and updating the priorities of the software stored in the first table to the extracted priorities.

9 Claims, 38 Drawing Sheets

FIG.5

| VM ID | APPLICATION ID | APPLICATION RUNTIME INFORMATION |
|---|---|---|
| VM1 | APPLICATION A | 0x12345678 |
| | | 0x23456788 |
| | APPLICATION B | 0x3456789C |
| | unknown | 0x456789AC |
| | | ANY |
| VM2 | unknown | ANY |

302 ⟩ 501

| VM ID | APPLICATION ID | APPLICATION RUNTIME INFORMATION |
|---|---|---|
| VM1 | APPLICATION A | 1 |
| | | 2 |
| | APPLICATION B | 3 |
| | unknown | 4 |
| | | ANY |
| VM2 | unknown | ANY |

| PATTERN NUMBER | VM NUMBER | APPLICATION ID | PRIORITY INFORMATION |
|---|---|---|---|
| 1 | 1 | APPLICATION B | 1 |
| 2 | 1 | APPLICATION A | 5 |
| | | APPLICATION B | 4 |
| | | unknown | 0 |
| 3 | 1 | APPLICATION A | 5 |
| | | APPLICATION B | 3 |
| | | unknown | 1 |
| | 2 | APPLICATION C | 4 |
| | | APPLICATION D | 2 |
| | | unknown | 0 |

FIG.7

| VM ID | APPLICATION UNDER EXECUTION | APPLI-CATION ID | PRIORITY INFOR-MATION |
|---|---|---|---|
| VM1 | APPLICATION A | APPLI-CATION A | 3 |
| | | APPLI-CATION B | 5 |
| | | unknown | 0 |
| VM2 | APPLICATION C | APPLI-CATION C | 4 |
| | | unknown | 2 |
| VM3 | unknown | unknown | 1 |

⎫701

| VM ID | APPLICATION UNDER EXECUTION 0 | APPLICATION UNDER EXECUTION 1 | APPLI-CATION ID | PRIORITY INFOR-MATION |
|---|---|---|---|---|
| VM1 | APPLI-CATION A | APPLI-CATION B | APPLI-CATION A | 3 |
| | | | APPLI-CATION B | 5 |
| | | | unknown | 0 |
| VM2 | APPLI-CATION C | | APPLI-CATION C | 4 |
| | | | unknown | 2 |
| VM3 | unknown | | unknown | 1 |

| VM SUBJECT TO OPERATION | VM ID | APPLICATION ID | FOREGROUND APPLICATION |
|---|---|---|---|
| 1 | VM1 | APPLICATION A | APPLICATION A |
| | | APPLICATION B | |
| | | unknown | |
| | VM2 | unknown | |

FIG.19

| PATTERN NUMBER | VM NUMBER | APPLICATION ID | PRIORITY INFORMATION 1702 ||||
|---|---|---|---|---|---|---|
| | | | VM-UNDER-OPERATION || VM-NOT-UNDER-OPERATION ||
| | | | FOREGROUND | BACKGROUND | FOREGROUND | BACKGROUND |
| 1 | 1 | APPLICATION B | 3 | 1 | 3 | 1 |
| 2 | 1 | APPLICATION A | 5 | 4 | 5 | 3 |
| | | APPLICATION B | 4 | 3 | 4 | 3 |
| | | unknown | 2 | 1 | 0 | 0 |
| 3 | 1 | APPLICATION A | 5 | 5 | 5 | 4 |
| | | APPLICATION B | 4 | 3 | 4 | 3 |
| | | APPLICATION C | 5 | 4 | 5 | 4 |
| | 2 | APPLICATION D | 5 | 2 | 4 | 2 |

PRIORITY SPECIFICATION 1:

| VM ID | APPLI-CATION ID | PRIORITY INFORMATION 3405-1 ||||
| --- | --- | --- | --- | --- | --- |
| | | VM-UNDER-OPERATION || VM-NOT-UNDER-OPERATION ||
| | | FORE-GROUND | BACK-GROUND | FORE-GROUND | BACK-GROUND |
| VM1 | APPLICATION A | 5 | 5 | 5 | 5 |

PRIORITY SPECIFICATION 2:

| VM ID | APPLI-CATION ID | PRIORITY INFORMATION 3405-2 ||||
| --- | --- | --- | --- | --- | --- |
| | | VM-UNDER-OPERATION || VM-NOT-UNDER-OPERATION ||
| | | FORE-GROUND | BACK-GROUND | FORE-GROUND | BACK-GROUND |
| VM1 | APPLICATION A | 5 | | | |

PRIORITY SPECIFICATION 3:

| VM ID | APPLI-CATION ID | PRIORITY INFORMATION 3405-3 ||||
| --- | --- | --- | --- | --- | --- |
| | | VM-UNDER-OPERATION || VM-NOT-UNDER-OPERATION ||
| | | FORE-GROUND | BACK-GROUND | FORE-GROUND | BACK-GROUND |
| VM1 | APPLICATION A | 5 | | 5 | |

PRIORITY SPECIFICATION 4:

| VM ID | APPLI-CATION ID | PRIORITY INFORMATION 3405-4 ||||
| --- | --- | --- | --- | --- | --- |
| | | VM-UNDER-OPERATION || VM-NOT-UNDER-OPERATION ||
| | | FORE-GROUND | BACK-GROUND | FORE-GROUND | BACK-GROUND |
| VM1 | APPLICATION A | 5 | 5 | | |

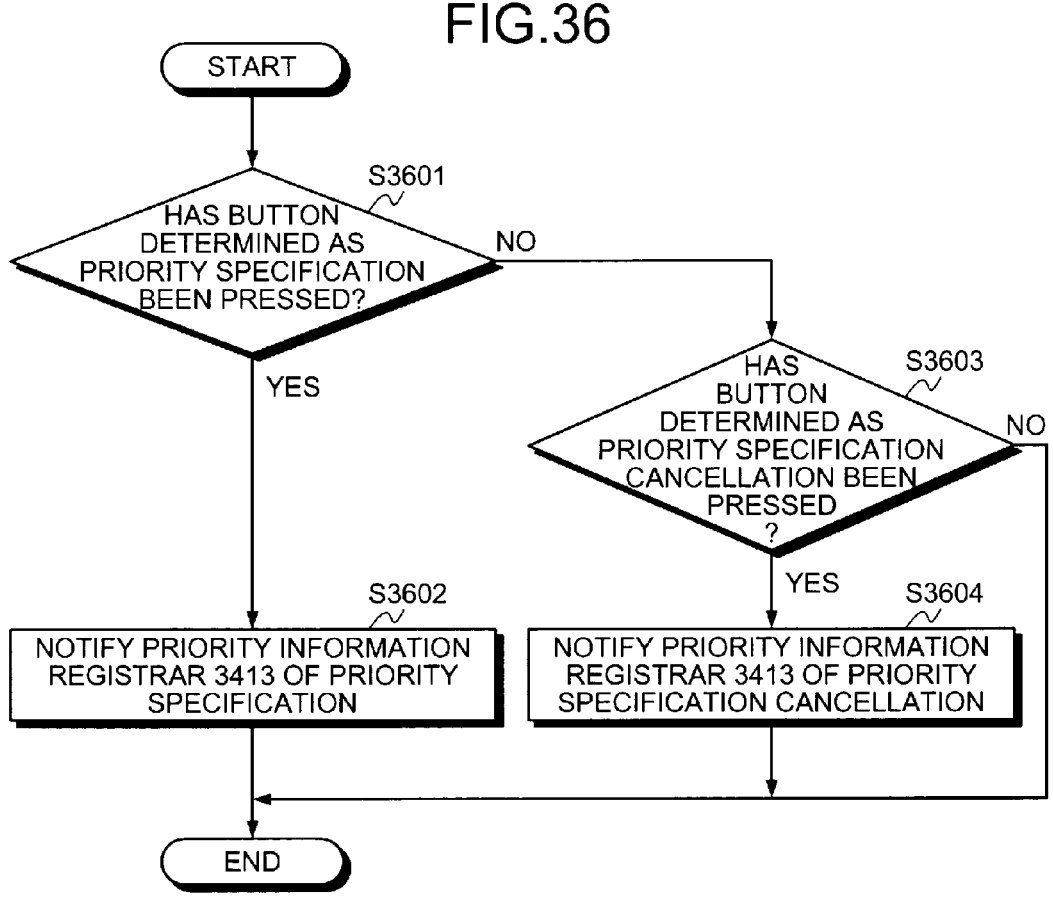

COMPUTER SCHEDULING PRODUCT AND APPARATUS THEREFOR

CROSS REFERENCE TO RELATED APPLICATIONS

This application is based upon and claims the benefit of priority of the prior Japanese Patent Application No. 2011-057290, filed on Mar. 15, 2011, the entire contents of which are incorporated herein by reference.

FIELD

The embodiments discussed herein are related to an apparatus that schedules OS.

BACKGROUND

With respect to portable terminals such as portable phones, the application of a virtualization technique enabling multiple operating systems (OS) to run on a single computing device is expected. If multiple OSs become operable on a single portable terminal by applying such a virtualization technique, a user carrying multiple portable terminals can integrate the functions of the portable terminals into a single portable terminal. The portable terminal switches among the multiple OSs to execute application software (hereinafter, "application") executed by each of the OSs. The virtualization technique includes a method where a hypervisor that controls each of the OSs directly operates on hardware, and a method where a host OS first operates and a hypervisor works as one application on the host OS to operate other guest OSs.

Since multiple OSs are executed in one apparatus in this way, a portable terminal subject to the virtualization technique, executes a scheduling process that determines which OS is to be executed among the multiple OSs. In a technique disclosed as an OS scheduling technique, for example, OSs notify a hypervisor of the priority of each application executed by the OSs, whereby the priorities between the OSs are compared and an OS that executes an application with a higher priority is selected. A technique is also disclosed of setting priorities for interrupting processes of OSs and thereby set a priority of an OS as a priority corresponding to an interruption (see, for example, Japanese Laid-Open Patent Publication Nos. 2000-347883 and 2009-176139).

For a host-OS type hypervisor, a technique is disclosed of classifying applications executed on a host as prioritized applications and non-prioritized applications, where non-prioritized applications are given the same priority and the hypervisor enables the prioritized applications to be preferentially executed. A technique is also disclosed for ensuring a common communication region between a hypervisor and a virtual machine (virtual computing device) of a virtualization technique to eliminate transfer of control between the hypervisor and the virtual machine, thereby making processes more efficient (see, e.g., Japanese Laid-Open Patent Publication Nos. S59-058553 and 2006-18820).

The priorities of applications of OSs may not comply with a unified standard. Consequently, for such a case, a technique has been disclosed in which a hypervisor normalizes priorities of OSs into common comparable priorities and compares the priorities among the OSs (see, e.g., Japanese Laid-Open Patent Publication No. 2000-242512).

However, in the conventional techniques described above, a hypervisor uses priorities supplied from OSs to execute the scheduling of the OSs. Although the priorities supplied from OSs enable efficient operation of applications executed by individual OSs, it is difficult to efficiently operate applications running on an apparatus as a whole.

SUMMARY

According to an aspect of an embodiment, a computer-readable recording medium stores therein a scheduling program that causes a computer to execute a process. The process includes executing multiple virtual computing machines that operate an OS; receiving a change in the number of activations of completely activated software from the OS; updating when the change in the number of activations has been received, a first table that stores software completely activated in the OS; selecting from a second table that stores combinations of a completely activated software group, a combination according to a software group stored in the first table; extracting from the second table and according to the selected combination, priorities of software stored for each of the combinations; and updating the priorities of the software stored in the first table to the extracted priorities.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is an explanatory view of an example of storage contents in an application execution information table 302.

FIG. 6 is an explanatory view of an example of storage contents in a priority application pattern table 113.

FIG. 7 is an explanatory view of an example of storage contents of an application priority information table 114.

FIG. 18 is an explanatory view of an example of storage contents in an executable application information table 1701 according to the second embodiment.

FIG. 19 is an explanatory view of an example of storage contents in a priority application pattern table 1702 according to the second embodiment.

FIG. 20 is an explanatory view of an example of extraction of priority information from the priority application pattern table 1702.

FIG. 35 is an explanatory view of an example of storage contents in a priority application information table 3405.

FIG. 36 is a flowchart of an example of a process procedure of a priority specifier 3418 according to the sixth embodiment.

DESCRIPTION OF EMBODIMENTS

Preferred embodiments of the present invention will be explained with reference to the accompanying drawings.

Figure 1:
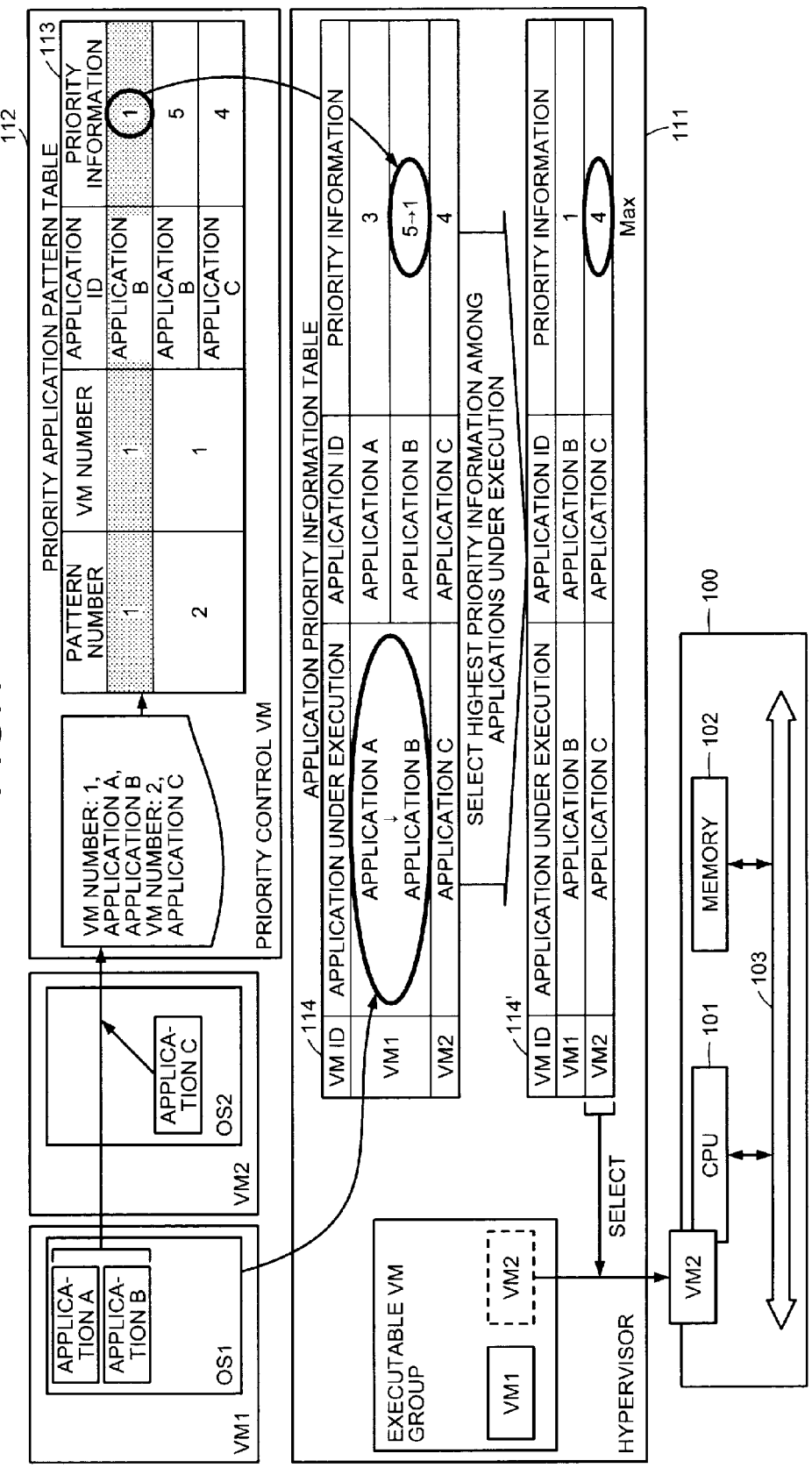
FIG. 1 is an explanatory view of an operation example of an information processing apparatus 100 according to a first embodiment.

FIG. 1 is an explanatory view of an operation example of an information processing apparatus 100 according to a first embodiment. The information processing apparatus 100 includes a CPU (central processing unit) 101 and a memory 102. The CPU 101 and the memory 102 are connected through a bus 103. The CPU 101 controls the information processing apparatus 100. The memory 102 is a storage device accessible from the CPU 101.

The CPU 101 executes a hypervisor 111. The hypervisor 111 is software that virtualizes a computer to enable execution of multiple OSs. In the example depicted in FIG. 1, the hypervisor 111 activates a virtual machine VM (virtual machine) 1, a virtual machine VM2, and a priority control VM 112. The hypervisor 111 executes a scheduling process of selecting a VM to be allocated to the CPU 101 from among the virtual machine VM1 and the virtual machine VM2, and allocates the selected VM to the CPU 101 in the scheduling process.

The virtual machine VM1 and the virtual machine VM2 are virtual computers operating on the information processing apparatus 100. For example, the virtual machine VM1 and the virtual machine VM2 are software that virtualizes the CPU 101, the memory 102, etc., which are hardware resources of the information processing apparatuses 100, to provide a virtualized execution environment to software executed on the VMs. In the example depicted in FIG. 1, the software executed on the VM1 is an OS1 and the OS1 executes an application A and an application B. Similarly, the software executed on the VM2 is an OS2 and the OS2 executes an application C.

In the following description, terms "executable state" and "execution state" are defined as states of an application. An application in the executable state has the execution information for the application expanded on the memory 102 by an OS to complete the activation of the application by the OS and is subject to scheduling by the OS. An application in the executable state will hereinafter be referred to as an executable application. An application in the execution state is an application that is among an executable application group and that has been allocated to the CPU 101 by the OS scheduling. An application in the execution state will hereinafter be referred to as an application under execution.

An application has a standby state in addition to the executable state and the execution state. An application in the standby state is an application transitioned to the standby state because an input/output process etc. is started during the execution state. If an application in the standby state becomes executable after completion of an input/output process etc., the application is transitioned to the executable state. In this embodiment, an application in the standby state may be included in the executable application group.

In the following description, an application whose the execution information has been expanded on the memory 102 by the OS to complete the activation process is defined as a completely activated application. Completely activated applications are transitioned to any one of the executable state, the execution state, and the standby state. In the following description, a completely activated application is an application in the executable state, an application in the execution state, or an application in the standby state.

The priority control VM 112 has a function of notifying the hypervisor 111 of priority information for each executable application, according to the executable applications in each of the VMs. The priority information indicates priorities of executable applications. The priority information may include a default priority for a case in which an application is not identified. Although the function of the priority control VM 112 is implemented as a virtual machine, the function of the priority control VM 112 may be included in the hypervisor 111.

The information processing apparatus 100 can access a priority application pattern table 113 and an application priority information table 114. The priority application pattern table 113 and the application priority information table 114 are stored in the memory 102. The priority application pattern table 113 is a table that for each combination of the completely activated software groups, stores priorities for software in the completely activated software groups. Details of the priority application pattern table 113 will be described later with reference to FIG. 6. The application priority information table 114 is a table that retains an application under execution, an executable application, and priority information of application in a combined manner for each of the VMs. Details of the application priority information table 114 will be described later with reference to FIG. 7.

In the information processing apparatus 100 embodied as described above, it is assumed that the OS1 newly activates the application B. In this case, the priority control VM 112 identifies that the application A and the application B are the executable applications of the VM number 1 corresponding to a first VM and that the application C is the executable application of the VM number 2 corresponding to a second VM. Subsequently, based on the identification result, the priority control VM 112 selects the most appropriate pattern from the patterns registered in the priority application pattern table 113. In the example depicted in FIG. 1, since the application B is included as the VM number 1 and the application B is also included as the pattern number 1, the priority control VM 112 selects the pattern number 1. After the selection, the priority control VM extracts priority information of application from the selected pattern and notifies the hypervisor 111 of the extracted priority information.

When receiving the notification from the priority control VM 112, the hypervisor 111 updates the priority information of the application B of the VM1 to the received value "1" in the application priority information table 114.

After the update, the hypervisor 111 updates the application under execution field of the VM1 of the application priority information table 114 to the application B. Subsequently, the hypervisor 111 selects the VM that executes the application having the highest priority information set among the application under executions in all the VMs. An application priority information table 114' is an image when only the applications under execution in all the VMs are displayed from the records of the application priority information table 114. In the example of FIG. 1, since the application C is the application having the highest priority, the hypervisor 111 allocates the VM2 among the VM1 and the VM2 making up an executable VM group as an execution VM to the CPU for the execution.

As described above, when receiving that an application in the executable state is activated or terminated in each of multiple OSs, the information processing apparatus 100 updates the priority of the application according to the combination of executable applications of each OS. This enables the information processing apparatus 100 to schedule the OSs according to the execution state of the applications running on the apparatus as a whole, without using the priorities set by the OSs. The information processing apparatus 100 according to the first embodiment will hereinafter be described with reference to FIGS. 2 to 16.

Figure 2:
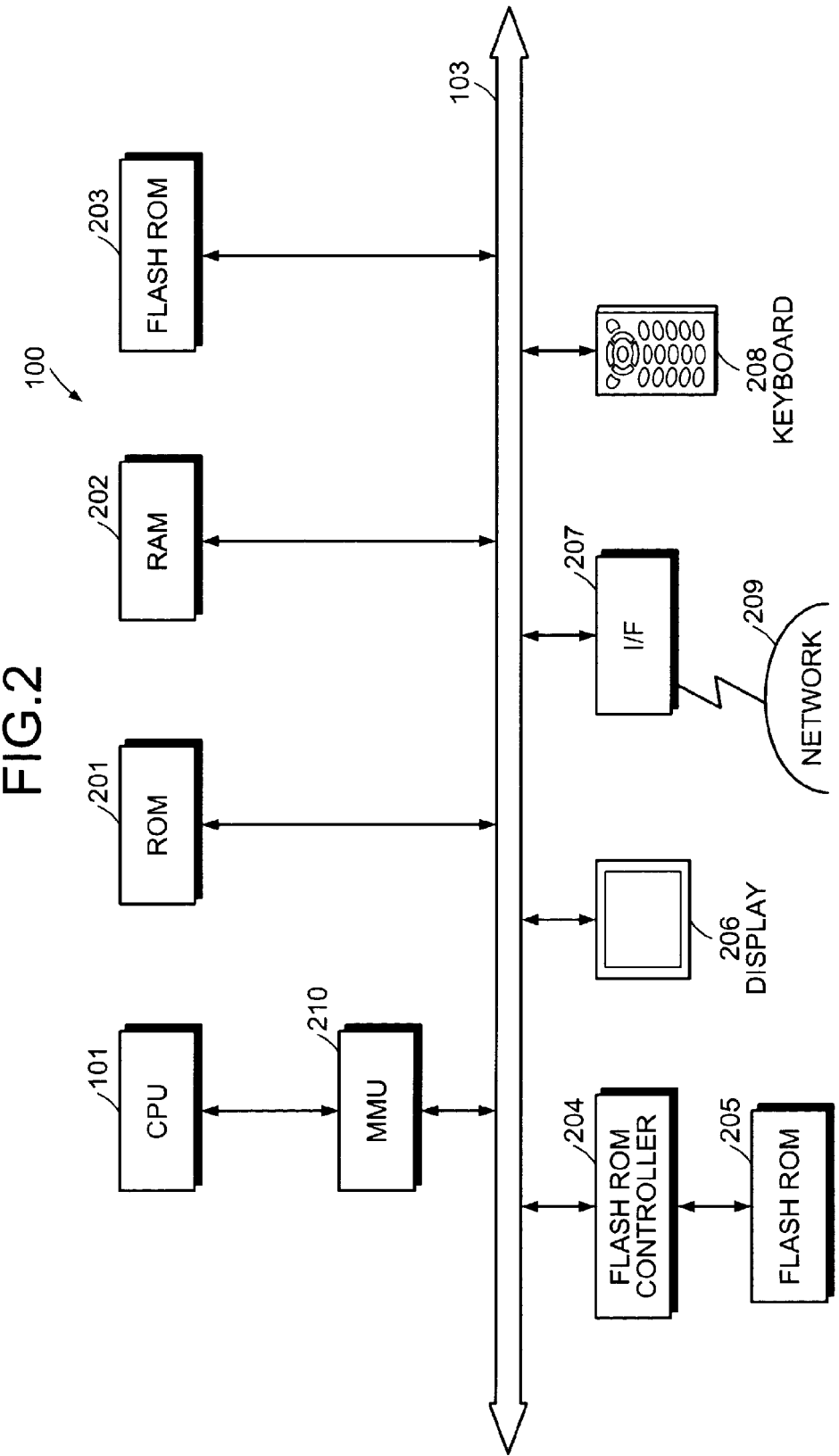
FIG. 2 is a block diagram of an example of hardware of the information processing apparatus 100 according to the first embodiment.

FIG. 2 is a block diagram of an example of hardware of the information processing apparatus 100 according to the first embodiment. As depicted in FIG. 2, the information processing apparatus 100 includes the CPU 101, a read-only memory (ROM) 201, and a random access memory (RAM) 202. The information processing apparatus 100 further includes a flash ROM 203, a flash ROM controller 204, and a flash ROM 205. The information processing apparatus 100 further includes a display 206, an interface (I/F) 207, and a keyboard 208 as input/output devices for users and/or other apparatuses. The components are connected to each other by the bus 103. The memory 102 depicted in FIG. 1 is implemented by all or a part of the ROM 201, the RAM 202, and the flash ROMs 203 and 205.

The CPU 101 governs overall control of the information processing apparatus 100. The information processing apparatus 100 according to the present embodiment is a single-core processor system including one CPU, however, may be a multi-core processor system including multiple CPUs. The multi-core processor system is a computer system that includes a processor(s) on which multiple cores are mounted. As long as multiple cores are mounted, the multi-core processor system may be a single processor with multiple cores or a group of processors in which single-core processors are connected in parallel. The CPU 101 may include a dedicated cache memory. The CPU 101 and the bus 103 are connected by a memory management unit (MMU) 210.

The MMU 210 processes memory access required by the CPU 101. For example, the MMU 201 accesses a page table that stores therein, as an entry, a virtual address accessed by an application and a physical address that is an address in the RAM 202, and when the virtual address is accessed by the CPU 101, converts the virtual address to the physical address. The MMU 210 can also access to a translation lookaside buffer (TLB) that caches the entries of the page table that may be stored for each application.

The TLB may include an address space identifier (ASID) for identifying virtual address spaces for respective applications. The ASID is an ID for identifying entries of the page table for the same virtual addresses. A TLB that does not include the ASID cannot include page entries of multiple applications, and is flushed when the OS switches application. On the other hand, a TLB that includes ASIDs associated with applications need not to be flushed when the OS switches application, thereby reducing cost of switching application.

The ROM 201 stores therein programs such as a boot program. The RAM 202 is used as a work area of the CPU 101. The flash ROM 203 is a flash ROM with a fast read speed such as a NOR flash memory. The flash ROM 203 stores therein system software such as OS and applications. For example, when updating OS, the information processing apparatus 100 receives a new OS through the I/F 207 and updates an old OS stored in the flash ROM 203 by the new OS.

The flash ROM controller 204, under the control of the CPU 101, controls the reading and writing of data with respect to the flash ROM 205. The flash ROM 205 is a flash ROM mainly used for storing and carrying data, such as a NAND flash memory. The flash ROM 205 stores therein data written under the control of the flash ROM controller 204. The data are, for example, image data and video data that are obtained by a user of the information processing apparatus 100 through the I/F 207, or the scheduling program according to the present embodiment. A memory card and an SD card may be employed as the flash ROM 205.

The display 206 displays data such as text, images, functional information, etc., in addition to a cursor, icons, and/or tool boxes. A thin-film-transistor (TFT) liquid crystal display may be employed as the display 206.

The I/F 207 is connected to a network 209 such as the local area network (LAN), the wide area network (WAN), and the Internet via a communication line, and to other apparatuses through the network 209. The I/F 207 administers an internal interface with the network 209 and controls the input/output of data from/to external apparatuses. For example, a modem or a LAN adaptor may be employed as the I/F 207.

The keyboard 208 includes keys for inputting numerals and various instructions and performs the input of data. Alternatively, a touch-panel-type input pad or numeric keypad, etc. may be adopted as the keyboard 208.

Figure 3:
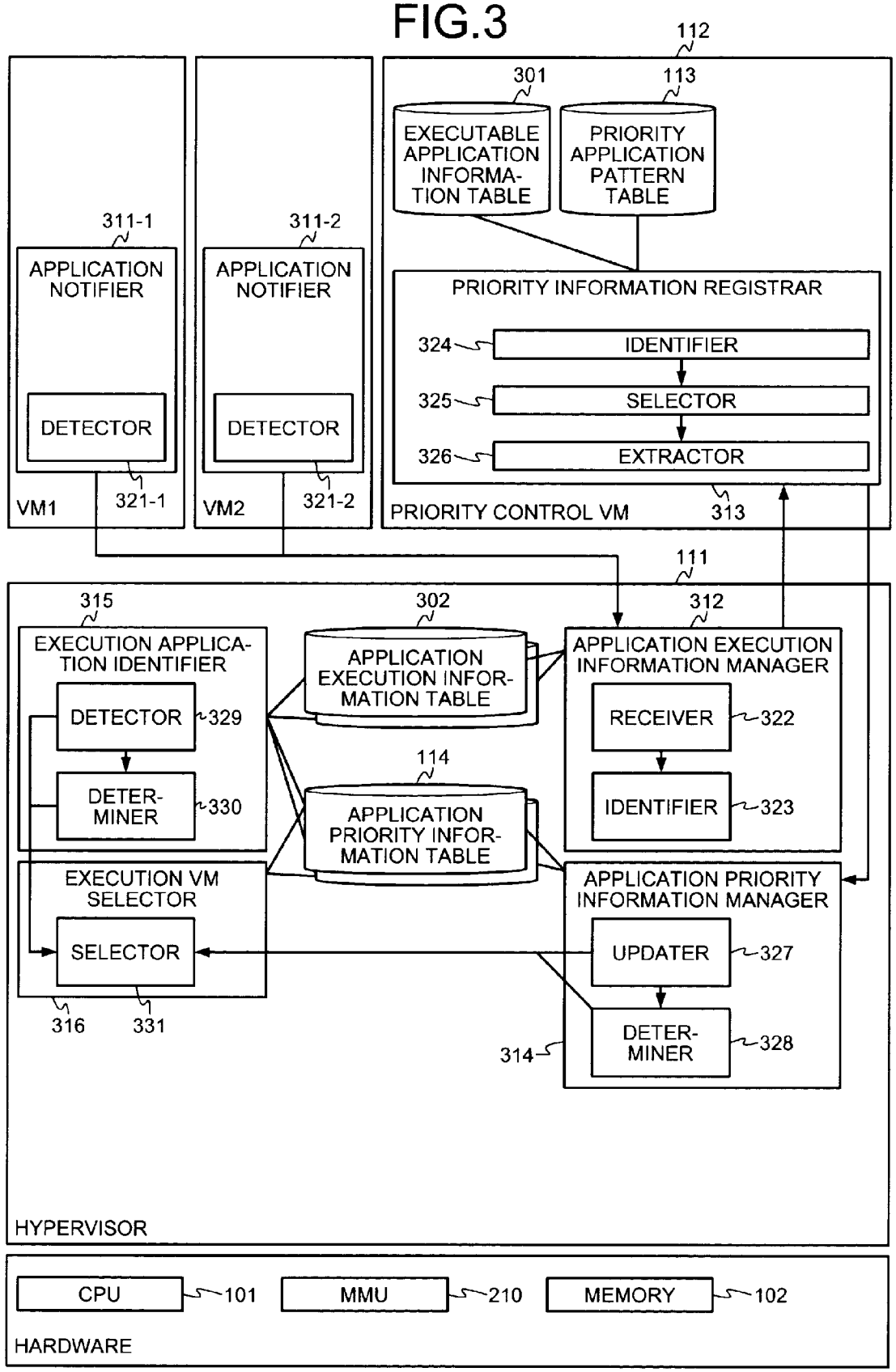
FIG. 3 is a block diagram of a functional example of the information processing apparatus 100.

FIG. 3 is a block diagram of a functional example of the information processing apparatus 100. The information processing apparatus 100 can access the priority application pattern table 113, the application priority information table 114, an executable application information table 301, and an application execution information table 302, as tables accessed from the functions. The priority application pattern table 113, the application priority information table 114, the executable application information table 301, and the application execution information table 302 are stored in the memory 102. The executable application information table 301 and the priority application pattern table 113 are accessed by the priority control VM 112, and the application execution information table 302 and the application priority information table 114 are accessed by the hypervisor 111.

The information processing apparatus 100 includes an application notifier 311, an application execution information manager 312, a priority information registrar 313, an application priority information manager 314, an execution application identifier 315, and an execution VM selector 316. The information processing apparatus 100 also includes a detector 321, a receiver 322, an identifier 323, an identifier 324, a selector 325, an extractor 326, an updater 327, a determiner 328, a detector 329, a determiner 330, and a selector 331 within the application notifier 311 to the execution VM selector 316. These functions (the detector 321 to the selector 331) making up a control unit are implemented by the CPU 101 executing programs stored in storage devices. The storage devices specifically are, for example, the ROM 201, the RAM 202, the flash ROM 203, and the flash ROM 205 depicted in FIG. 2.

A detector 321-1 and a detector 321-2 are included in an application notifier 311-1 and an application notifier 311-2, respectively. The receiver 322 and the identifier 323 are included in the application execution information manager 312; the identifier 324, the selector 325, and the extractor 326 are included in the priority information registrar 313; and the updater 327 and the determiner 328 are included in the application priority information manager 314. The detector 329 and the determiner 330 are included in the execution application identifier 315, and the selector 331 is included in the execution VM selector 316.

The application notifier 311 is a function included in the virtual machine VM1 and the virtual machine VM2. Specifically, an application notifier 311-1 is a function included in the virtual machine VM1, and an application notifier 311-2 is a function included in the virtual machine VM2. The application execution information manager 312 and the application priority information manager 314 to the execution VM selector 316 are functions included in the hypervisor 111, and the priority information registrar 313 is a function included in the priority control VM 112. The priority information registrar 313 may be a function included in the hypervisor 111.

An implementing method of the virtual machine VM1 and the virtual machine VM2 includes two types of methods. A first virtualizing method is full virtualization that enables direct operation without modifying OS, and a second virtualizing method is paravirtualization that modifies a privileged instruction as a call to the hypervisor 111 to operate OS. A call to the hypervisor 111 is referred to as a hypercall.

If the implementing method is the full virtualization, a method of notification to the hypervisor 111 of the virtual machine VM1 and the virtual machine VM2 enables the notification to the hypervisor 111 by the CPU 101 generating an exception when a privileged instruction is executed on the VMs.

If the implementing method is the paravirtualization, a method of notification to the hypervisor 111 of the virtual machine VM1 and the virtual machine VM2 enables the notification by executing a hypercall. The hypercall is implemented by utilizing functions of the CPU 101 such as software interrupt. Even if a VM uses the full virtualization as the implementing method, notification by a hypercall is available. The VMs utilize these notification functions to give instructions to the hypervisor 111.

The executable application information table 301 is a table that stores a completely activated application group in OS on VM for each VM. The executable application information table 301 stores a VM and identification information of applications as one record. Details of the executable application information table 301 will be described later with reference to FIG. 4.

The application execution information table 302 is a table that retains application IDs for identifying applications, and application runtime information as a combination for each VM. The application runtime information is information that enables the hypervisor 111 to identify an application in execution in OS. Details of the application execution information table 302 will be described with reference to FIG. 5.

The application notifier 311 notifies the application execution information manager 312 if an application is activated in OS on VM and the activation is completed or if an application is terminated. The pieces of information supplied to the application execution information manager 312 are the application ID and the application runtime information.

The application execution information manager 312 receives the notifications of application activation and application termination from the application notifier 311 and registers the application ID and the application runtime information into the application execution information table 302 at the time of application activation. The application execution information manager 312 deletes a record corresponding to the application ID of the received notification from the application execution information table 302 at the time of application termination. The application execution information manager 312 notifies the priority information registrar 313 of the registration deletion of application. The supplied information includes the VM ID of the VM that executes the registered or deleted application, and the application ID.

The priority information registrar 313 receives the notifications of application activation and application termination from the application execution information manager 312 and registers the VM ID and the application ID into the executable application information table 301 at the time of application activation. The priority information registrar 313 deletes a record of the VM ID and the application ID from the executable application information table 301 at the time of application termination. The priority information registrar 313 extracts priority information of the applications registered in the executable application information table 301 from the executable application information table 301 and the priority application pattern table 113. After the extraction, the priority information registrar 313 notifies the application priority information manager 314 of the priority information.

The priority information registrar 313 may be a function of the hypervisor 111. If the priority information registrar 313 is a function of virtual machines, the notifications of application activation and application termination from the application execution information manager 312 received by the priority information registrar 313 are enabled by calling back an interrupt handler.

The application priority information manager 314 receives the priority information for each application determined by the priority information registrar 313 and updates the application priority information table 114. At the time of application switching by OS on VM, the execution application identifier 315 refers to the application execution information table 302 to identify the application after the switching. The execution VM selector 316 is a scheduler in the hypervisor 111 and determines which VM is scheduled, by using the application priority information.

The detector 321 has a function of detecting that a change is made in the number of activations of completely activated software in any one of multiple OSs. The number of activations is the number of pieces of completely activated software. The number of activations of completely activated software is changed if an application is activated or if an application is terminated. For example, if the application A is activated and the activation is completed in the OS1 on the VM1, the detector 321 detects that a change is made in the number of activations of completely activated software. The detected data is stored in a storage area such as a register of the CPU 101, a cache memory of the CPU 101, the RAM 202, and the flash ROM 203.

The receiver 322 has a function of receiving a change in the number of activations of completely activated software from any one of multiple OSs. For example, the receiver 322 receives from the OS1 a notification that the application A is activated and completely activated and causes an increase in the number of activations of completely activated software. The receiver 322 may receive information of the application A causing the increase in the number of activations of completely activated software. A received notification may be stored in the storage area such as the register of the CPU 101, the cache memory of the CPU 101, the RAM 202, and the flash ROM 203.

The identifier 323 and the identifier 324 have a function of identifying a completely activated software group in each of multiple OSs after a change in the number of activations if a change in the number of activations been received. For example, it is assumed that the receiver 322 receives a notification that the application A is activated in the OS1 and causes an increase in the number of activations of completely activated software. In this case, the identifier 323 registers the VM ID of the VM that activates the application A causing the increase, and the identification information of the application A into the application execution information table 302. The identifier 324 registers the VM ID of the VM that activates the application A, and the identification information of the application A into the executable application information table 301.

It is then assumed that the receiver 322 receives a notification that the application A is terminated in the OS1 and causes a decrease in the number of activations of completely activated software. In this case, the identifier 323 deletes a record having the VM ID of the VM that executed the application A causing the decrease, and the identification information of the application A from the application execution information table 302. Similarly, the identifier 324 deletes a record having the VM ID of the VM that executed the application A, and the identification information of the application A from the executable application information table 301.

As described above, the identifier 323 and the identifier 324 can update the application execution information table 302 and the executable application information table 301 to continuously retain the information identifying a completely activated application group in multiple OSs. A result of performing the identification may be stored in the storage area such as the register of the CPU 101, the cache memory of the CPU 101, the RAM 202, and the flash ROM 203.

The selector 325 has a function of selecting a combination corresponding to an identified software group from a second table. The second table is the priority application pattern table 113 that stores priorities of software in the completely activated software group for each combination of the completely activated software group.

For example, it is assumed that the identifier 324 identifies that the application A and the application B are completely activated in the OS1 on the VM1 and that the application C is completely activated in the OS2 on the VM2. It is also assumed that two registered patterns exist and that the application B having the priority information of 1 and the OS executing the application B are registered as the pattern number 1. It is also assumed that the application B having the priority information of 5, the application C having the priority information of 4, and the OS executing the application B and the application C are registered as the pattern number 2.

In this case, the selector 325 selects the pattern number 1 corresponding to the identified application group from the priority application pattern table 113. A pattern selection method will be described later with reference to FIG. 8. The number of the selected pattern or a pointer etc., to the selected pattern is stored in the storage area such as the register of the CPU 101, the cache memory of the CPU 101, the RAM 202, and the flash ROM 203.

The extractor 326 has a function of extracting priorities of software in the identified software group, from the selected combination. For example, it is assumed that the selector 325 selects a pattern having 1 registered as the priority information of the application B. In this case, the extractor 326 extracts the priority information of the application B from the selected pattern. The extracted priority information is stored in the storage area such as the register of the CPU 101, the cache memory of the CPU 101, the RAM 202, and the flash ROM 203.

The updater 327 has a function of updating the priorities of software in the identified software group to the extracted priorities in a first table that stores priorities of completely activated software for each one of multiple OSs running on the information processing apparatus 100. The first table means the application priority information table 114.

For example, it is assumed that the extractor 326 extracts 1 as the priority information of the application B. In this case, the updater 327 updates the priority information of the application B in the application priority information table 114 to the extracted priority information. The information of execution of the update may be stored in the storage area such as the register of the CPU 101, the cache memory of the CPU 101, the RAM 202, and the flash ROM 203.

The determiner 328 has a function of determining whether any piece of software in the identified software group is in the execution state after the update by the updater 327. For example, if the priority information of the application B executed in the OS1 on the VM1 is updated, the determiner 328 determines whether the application B is in the execution state.

The determiner 328 may determine whether the OS executing the software with the priority information updated is an execution OS. The execution OS is an OS running on the execution VM. For example, if the priority information of the application B executed in the OS1 on the VM1 is updated, the determiner 328 determines whether the OS1 is the execution OS.

The determiner 328 may determine the high/low relationship between the priority after update of the software whose the priority information has been updated and the priority before update of the software whose the priority information has been updated. For example, the determiner 328 determines whether the priority information after update of the application B is higher than the priority information before update. The determination result is stored in the storage area such as the register of the CPU 101, the cache memory of the CPU 101, the RAM 202, and the flash ROM 203.

The detector 329 has a function of detecting that software in the execution state is switched in any one of multiple OSs running on the information processing apparatus 100. For example, the detector 329 detects that the application in the execution state is switched from the application A to the application B in the OS1 on the VM1. A specific method of identifying a switched application includes a method using page table addresses and a method using ASID. The information of application in the execution state after the detected switching is registered in the application priority information table 114 and may also be stored in the storage area such as the register of the CPU 101 and the cache memory of the CPU 101.

The determiner 330 has a function of determining the high/low relationship between the priority of software before switching and the priority of software after switching if the detector 329 detects the switching of software in the execution state. For example, it is assumed that the detector 329 detects that the application A is switched to the application B. In this case, the determiner 330 determines the high/low relationship between the priority of the application A before the switching and the priority of the application B after the switching. The determination result is stored in the storage area such as the register of the CPU 101, the cache memory of the CPU 101, the RAM 202, and the flash ROM 203.

The selector 331 has a function of selecting an operation subject OS among multiple OSs by reference to the first table if the updater 327 updates the first table. For example, the selector 331 selects the OS executing the application under execution having the highest priority information among applications under execution in the application priority information table 114.

The selector 331 may select the execution OS based on a determination result from the determination of the determiner 328. For example, it is assumed that the priority information of the application B executed in the OS1 on the VM1 is updated. In this case, if it is determined that the application B is in the execution state, that the OS1 executing the application B is the execution OS, and that the priority information after the update of the application B is lower than the priority information before the update, the selector 331 selects the execution OS. If it is determined that the application B is in the execution state, that the OS1 executing the application B is not the execution OS, and that the priority information after the update of the application B is higher than the priority information before the update, the selector 331 selects the execution OS.

The selector 331 may select the execution OS if the detector 329 detects that the software in the execution state is changed. The selector 331 may select the execution OS based on a result of determination by the determiner 330. For example, if a result of determination by the determiner 330 indicates that the priority of application after switching is lower than the priority of application before switching, the selector 331 selects the execution OS. The identification information of the selected execution OS is stored in the storage area such as the register of the CPU 101, the cache memory of the CPU 101, the RAM 202, and the flash ROM 203.

Figure 4:
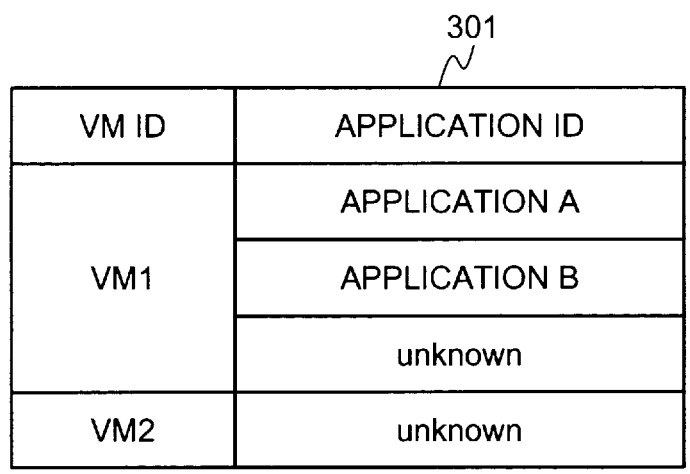
FIG. 4 is an explanatory view of an example of storage contents in an executable application information table 301.

FIG. 4 is an explanatory view of an example of storage contents in the executable application information table 301. The executable application information table 301 includes two fields of the VM ID and the application ID. The VM ID field stores identification information for identifying a VM. The identification information for identifying a VM may specifically be a name of the VM or a uniquely assigned number etc.

The application ID field stores identification information for identifying an executable application in OS running on VM specified by VM ID. A value set as an application ID is not a closed ID within one OS and is an ID identifiable from the hypervisor 111 and other OSs. The identification information for identifying an application may specifically be a name of the application, an application ID calculated by some sort of conversion from a name of the application, or identification information embedded in a file of the application. If application is not identified, the application ID field may store "unknown". For example, in the example of FIG. 4, the VM1 executes the application A, the application B, and another application other than the application A or the application B. The VM2 executes some kind of application.

In the executable application information table 301 depicted in FIG. 4, the VM ID fields from a first record to a third record are integrated and the VM1 is stored in the integrated field. The executable application information table 301 may have such a data form or the same value may be stored in the fields of records. The same applies to other tables described below.

FIG. 5 is an explanatory view of an example of storage contents in the application execution information table 302. In FIG. 5, possible forms of the application execution information table 302 will be described as two possible forms of the application execution information table 302, i.e., an explanatory view denoted by reference numeral 501 and an explanatory view denoted by reference numeral 502. The application execution information table 302 includes three fields of the VM ID, the application ID, and the application runtime information. The VM ID field stores identification information for identifying a VM. The application ID field stores identification information for identifying an executable application in OS running on VM specified by VM ID. The application runtime information field stores information that enables the hypervisor 111 to identify an application identified in the application ID field. If an application under execution is not identified and may be any application, the application runtime information field stores "ANY".

The explanatory view denoted by reference numeral 501 is an example when page table addresses are employed for the application runtime information field. A page table is a virtual address prepared for an application and is different for each application. Therefore, at the time of a switching request of a page table associated with switching of an application, the hypervisor 111 can identify the application after the switching by comparing the page address after the switching with the application runtime information of the application execution information table 302.

For example, in the application execution information table 302 denoted by reference numeral 501, the VM1 activates the application A, the application B, and another application other than the application A or the application B. The application A uses two page tables, which are a page table with an address starting from 0x12345678 and a page table with an address starting from 0x23456788. The application B uses a page table with an address starting from 0x3456789C. Another application other than the application A or the application B is an unidentified application. The application using a page table with an address starting from 0x456789AC as a page table and an application using a page table other than the four page table addresses are not identified.

The record of the VM2 indicates an initial state when the VM2 is activated. In such a case, an application cannot be identified in the VM2. When the hypervisor 111 registers an application ID and the application runtime information, a record is added.

The explanatory view denoted by reference numeral 502 is an example when ASID is employed for the application runtime information field. If ASID is correlated with an application, when the ASID is switched in association with switching of the application, the hypervisor 111 can identify the application after the switching by comparing the ASID after the switching with the application runtime information of the application execution information table 302.

For example, in the application execution information table 302 denoted by reference numeral 502, the VM1 activates the application A, the application B, and another application other than the application A or the application B. The application A uses two ASIDs, which are ASID:1 and ASID:2. The application B uses ASID:3. Another application other than the application A or the application B is an unidentified application. The application using ASID:4 as ASID and an application using ID other than the ASIDs:1 to 4 are not identified. The VM2 indicates an initial state when the VM2 is activated.

FIG. 6 is an explanatory view of an example of storage contents in the priority application pattern table 113. The table includes four fields of the pattern number, the VM number, the application ID, and the priority information. The pattern number field stores identification information for identifying a pattern. The VM number field stores the number for distinguishing a VM that executes applications. Therefore, the VM number and the VM ID field are different pieces of information. The application ID field stores identification information of applications executed during an object pattern.

The priority information field stores a priority of an application stored in the application ID field. The priority information field may be set such that a larger number indicates a higher priority or such that a smaller number indicates a higher priority. In the setting of the priority information field according to this embodiment, it is assumed that 0 indicates the lowest priority and that a larger number indicates a higher priority.

For example, the priority application pattern table 113 depicted in FIG. 6 has three registered patterns. The pattern number 1 indicates a state where the application B having the priority information of 1 is the executable application in a certain VM. The pattern number 2 indicates a state where the application A having the priority information of 5 and the application B having the priority information of 4 are the executable applications in a certain VM. The pattern number 3 indicates a state where the application A having the priority information of 5 and the application B having the priority information of 3 are the executable applications in a certain VM and the application C having the priority information of 4 and the application D having the priority information of 2 are the executable applications in another VM.

For the priority information when the application ID is unknown, default priority information may be prepared. If priority information other than default is set, a record having unknown in the application ID field is registered in the priority application pattern table 113. For example, the pattern number 2 indicates that the priority information is 0 for an application other than the application A or the application B. The pattern number 3 indicates that the priority information is 1 for an application other than the application A or the application B, which is an executable application in a certain VM, and that the priority information is 0 for an application other than the application C or the application D, which is an executable application in another VM.

For example, although the application B has a lower priority when solely executed as indicated by the pattern number 1, the application B has a higher priority when the application A is an executable application as indicated by the patter number 2. Such setting is effective when the application A and the application B operate in a coordinated manner.

For example, it is assumed that the application B is an application that acquires location information and that the application A is an application that guides a route from the present location to a certain position. In this case, if the application B is an executable application and the application A is not activated, it is not necessary to actively acquire the location information and, therefore, the information processing apparatus 100 sets a lower priority to the application B. However, if the application B is an executable application and the application A is completely activated and turns to an executable application, the present location indicated by the application A can be made more accurate by frequently acquiring location information. Therefore, the information processing apparatus 100 sets the priorities of the application B and the application A higher than other applications, thereby providing more useful priority control to a user.

FIG. 7 is an explanatory view of an example of storage contents of the application priority information table 114. In FIG. 7, possible forms of the application priority information table 114 will be described as two possible forms of the application priority information table 114, i.e., an explanatory view denoted by reference numeral 701 and an explanatory view denoted by reference numeral 702.

The application priority information table 114 of the explanatory view indicated by reference numeral 701 depicts a case where the VM1 to VM3 are VMs for a single core. The application priority information table 114 includes four fields of the VM ID, the application under execution, the application ID, and the priority information. The VM ID field stores identification information for identifying a VM. The application under execution field stores identification information of an application executed in a given VM. The application ID field stores identification information for identifying an application executable in the given VM. The priority information field stores the priority information of the executable application.

For example, in the application priority information table 114 depicted in the explanatory view of reference numeral 701, the VM1 activates the application A having the priority information of 3, activates the application B having the priority information of 5, and activates (or may not activate)

some kind of application with application ID unidentified having the priority information of 0, and executes the application A among the applications. Similarly, the VM2 activates the application C having the priority information of 4 and activates (or may not activate) some kind of application with application ID unidentified having the priority information of 0, and executes the application C among the applications. The VM3 executes some kind of application with application ID unidentified having the priority information of 1.

The application priority information table 114 of the explanatory view of reference numeral 702 is an example of storage contents when VMs support a multi-core processor system. In the application priority information table 114 of the explanatory view of reference numeral 702, the application under execution field is expanded to an application under execution 0 field and an application under execution 1 field. The example denoted by reference numeral 702 depicts a state of the VM1 corresponding to two processors. The VM1 executes the application A and the application B. Since the VM2 and the VM3 are assumed to be VMs for a single core processor system, an application ID is set in the application under execution 0 field and no value is set in the application under execution 1 field.

The application priority information table 114 may have an application under execution flag, instead of the application under execution field, as a form different from the two possible forms of the application priority information table 114 denoted by reference numeral 701 and reference numeral 702. In the application under execution flag field, if an application stored in the application ID field is in execution, a flag is turned on. In the case of a VM supporting a multi-core processor system, flags of the application under execution flag field are turned on by the number of records corresponding to applications under execution. With such a data form, the number of fields of the application priority information table 114 can be kept constant regardless of the number of the CPUs 101 included in the information processing apparatus 100.

Figure 8:
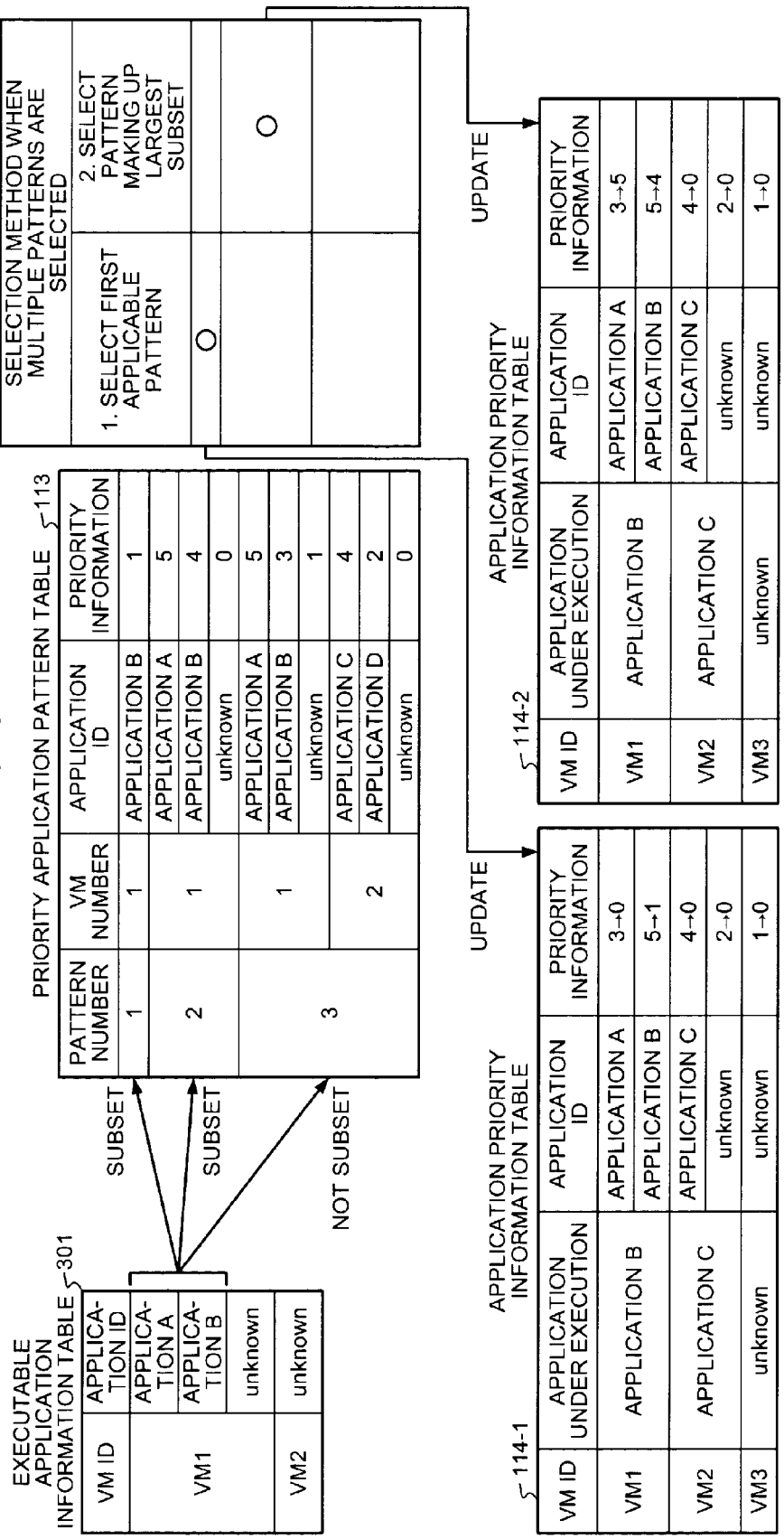
FIG. 8 is an explanatory view of an example of a method of updating the application priority information table 114.

FIG. 8 is an explanatory view of an example of a method of updating the application priority information table 114. First, the priority control VM 112 refers to the executable application information table 301 to select a pattern most applicable to the activation state of applications in the information processing apparatus 100 among the patterns registered in the priority application pattern table 113. The pattern is specifically selected by selecting whether each pattern is a subset of the executable application information table 301. The priority control VM 112 then extracts the priority information for all the executable applications from the selected pattern and notifies the hypervisor 111 of the extracted priority information.

For example, the pattern number 1 indicates that the application B is in the executable state in a certain VM. Since the executable application information table 301 indicates that the application B is the executable application, the pattern number 1 is a subset of the executable application information table 301. Similarly, the pattern number 2 indicates that the application A and the application B are executable applications in a certain VM. Since the executable application information table 301 indicates that the application A and the application B are executed by the same VM, i.e., the VM1, the pattern number 2 is a subset of the executable application information table 301.

The pattern number 3 indicates that the application A and the application B are executable applications in a certain VM and the application C and the application D are executable applications in another VM. Although the executable application information table 301 indicates that the application A and the application B are executed by the same VM, i.e., the VM1, the application C and the application D are not executed by another VM, i.e., the VM2. Therefore, the pattern number 3 is not a subset of the executable application information table 301.

As described above, the pattern number 1 and the pattern number 2 are subsets of the executable application information table 301. If multiple patterns are selected in this way, for example, the following two selection methods exist as a method of further selecting one pattern.

In a first selection method, the patterns registered in the priority application pattern table 113 are registered such that the pattern having the highest priority order is registered at the top, and a first applicable pattern is selected. With the first method, the priority control VM 112 selects the pattern number 1 among the priority application pattern table 113. The first selection method can reduce the time required for selection.

In a second selection method, a pattern making up the largest subset is selected from the extracted patterns. With the second method, the priority control VM 112 selects the pattern number 2 among the priority application pattern table 113. The second selection method can select a pattern more closely coinciding with the execution state of the information processing apparatus 100.

From the pattern selected with the first or second selection method, the priority control VM 112 determines the priority information of all the executable applications. The priority information of applications not registered in the selected pattern may be set as priority information having a default value or as priority information having unknown set as the application ID.

No pattern registered in the priority application pattern table 113 may be a subset of the executable application information table 301. In this case, the executable application information table 301 may select a pattern serving as the subset among the patterns registered in the priority application pattern table 113. Alternatively, since no pattern to be selected is present, the priority control VM 112 notifies the hypervisor 111 of the priority information having unknown set as all the application IDs.

The hypervisor 111 supplied with the priority information of the applications registered in the selected pattern updates corresponding priority information. In the example of FIG. 8, an application priority information table 114-1 is depicted as an update example when the priority information of the application registered as the pattern number 1 is supplied. Similarly, an application priority information table 114-2 is depicted as an update example when the priority information of the applications registered as the pattern number 2 is supplied.

If the priority information of the application registered as the pattern number 1 is supplied, the hypervisor 111 updates the priority information of the application B from 5 to 1, and updates the priority information of other applications to a default value 0. If the priority information of the applications registered as the pattern number 2 is supplied, the hypervisor 111 updates the priority information of the application A from 3 to 5, updates the priority information of the application B from 5 to 4, and updates the priority information of other applications to the default value 0. When receiving a notification of application switching after the update, the hypervisor 111 selects the VM having the highest priority information of the applications under execution among VMs.

For example, in the case of the example of the application priority information table 114-1, the hypervisor 111 selects the VM1 in accordance with the priority information 1 of the application B that is the application under execution of the VM1 and the priority information 0 of the application C that is the application under execution of the VM2. Similarly, in the case of the example of the application priority information table 114-2, the hypervisor 111 selects the VM1 in accordance with the priority information 4 of the application B that is the application under execution of the VM1 and the priority information 0 of the application C that is the application under execution of the VM2.

Therefore, the information processing apparatus 100 can set priorities to applications without being affected by priorities of applications retained by OSs and can perform effective scheduling independent of the OSs.

Figure 9:
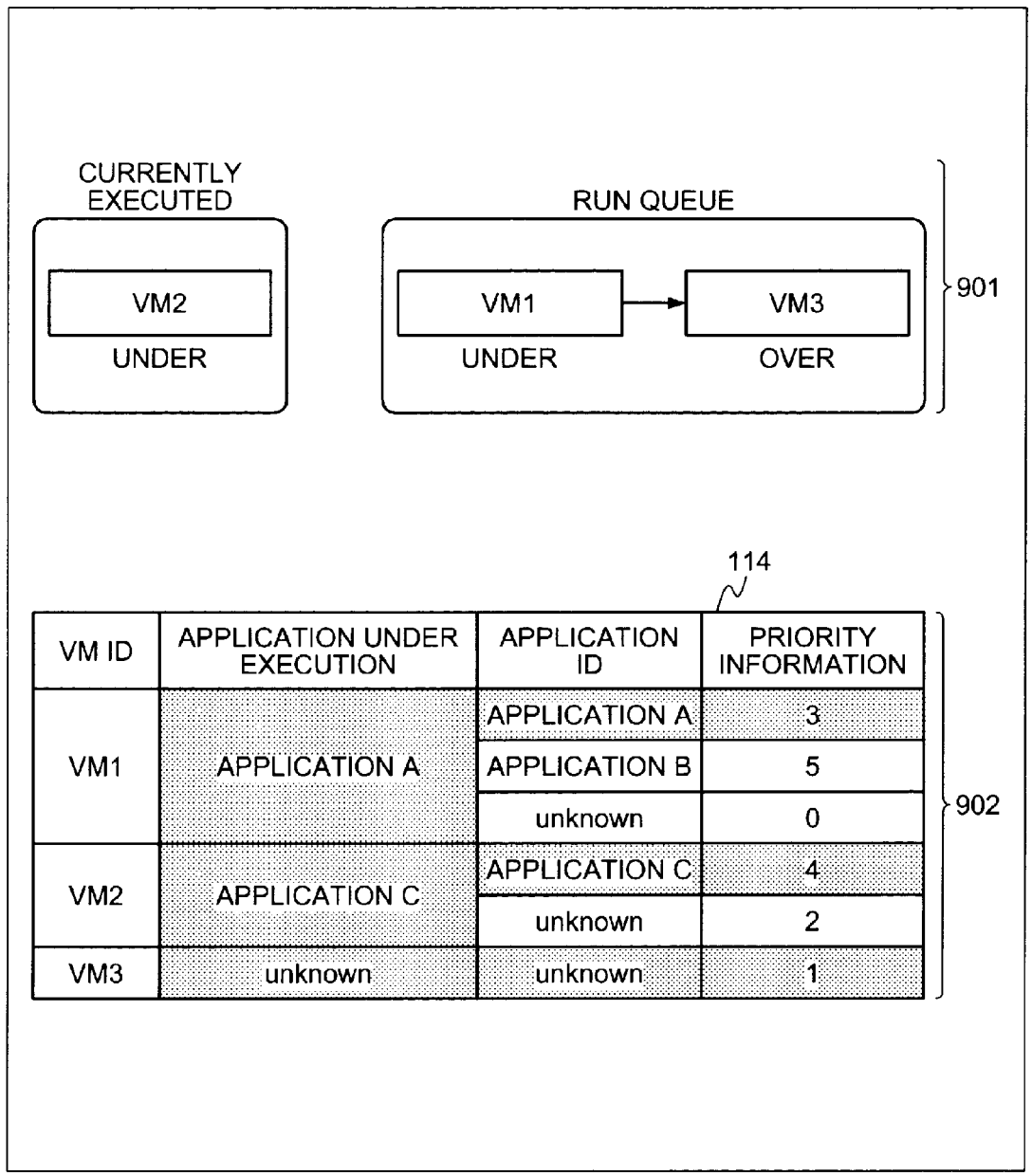
FIG. 9 is an explanatory view of a state before application switching in an application example of the first embodiment to an existing scheduler.
Figure 10:
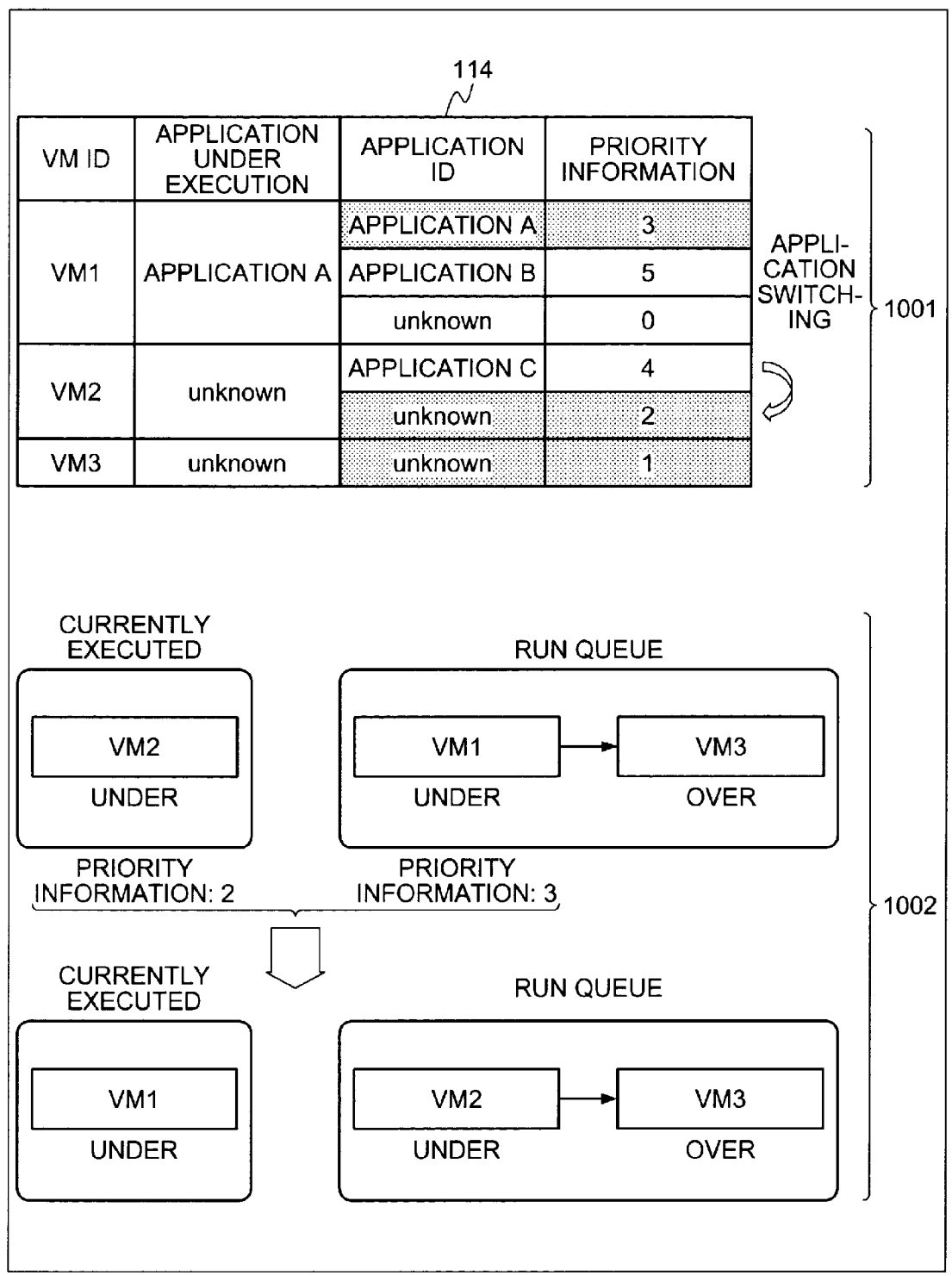
FIG. 10 is an explanatory view of a state after application switching in the application example of the first embodiment to the existing scheduler.

FIGS. 9 and 10 depict an application example of the first embodiment to an existing scheduler. Description will be made of the case that the first embodiment is applied to a credit scheduler employed by Xen (registered trademark), which is one piece of software that provides virtual machines, with reference to FIGS. 9 and 10. Before the description of FIGS. 9 and 10, the operation of the credit scheduler will be described.

The credit scheduler periodically distributes a numeric value referred to as credit, to VMs operating on the information processing apparatus 100. Subsequently, the credit scheduler sets two priorities, i.e., UNDER and OVER, to the operating VMs depending on a retaining amount of the credit. In the relationship of the priorities, UNDER indicates a priority higher than OVER. In accordance with the set priorities, the credit scheduler rearranges a run queue in the order from UNDER to OVER. The run queue represents executable VMs arranged in the order of execution. The credit scheduler sequentially selects a VM from the run queue. The VM is allocated to the CPU 101 for a certain period.

Although the VM may occupy the CPU 101 to be executed for a certain entire period, the VM may release the CPU 101 if entering an idling state due to an interrupt from a device. After the CPU 101 is released, the credit scheduler selects the next VM from the run queue. On this occasion, the credit scheduler subtracts the credit corresponding to the execution period.

As described above, the credit scheduler has an algorithm where a higher priority is maintained and allocation to the CPU 101 is achieved as long as the consumption of the credit does not exceed the supply thereof while the priority is lowered and execution is postponed if the credit is consumed.

Although the credit scheduler has a priority called BOOST along with UNDER and OVER, BOOST is not directly applied to a scheduling program of this embodiment and therefore will not be described. If the information processing apparatus 100 is a multi-core processor system, a run queue exists for each of the CPUs 101; however, for simplicity of description, it is assumed that one run queue exists on the assumption that the information processing apparatus 100 is a single core processor system. An executed VM is excluded from a run queue and will be registered into the run queue when the VM starts waiting to be executed again.

FIG. 9 is an explanatory view of a state before application switching in an application example of the first embodiment to the existing scheduler. An explanatory view denoted by reference numeral 901 depicts a state of an executed VM and a run queue before application switching in the information processing apparatus 100. The information processing apparatus 100 operates three VMs, which are a VM1, a VM2, and a VM3, as VMs; the VM1 and the VM2 have the priority UNDER; and the VM3 has the priority OVER. In the example of FIGS. 9 and 10, the scheduling according to the first embodiment is applied in the case of the same priority on the credit scheduler.

An explanatory view denoted by reference numeral 902 depicts the application priority information table 114 before application switching. The execution state of applications in the VMs is the same as that depicted in FIG. 7 and will not be described. The priority information of the VM1 having the priority UNDER given by the credit scheduler is 3, which is the priority information of the application A that is the application under execution, and the priority information of the VM2 is 4, which is the priority information of the application C that is the application under execution. Therefore, the hypervisor 111 selects the VM2 and sets the execution VM as the VM2. The run queue stores the VMs in the order from the VM1 to the VM3 due to the priorities UNDER and OVER as indicated by reference numeral 901.

FIG. 10 is an explanatory view of a state after application switching in the application example of the first embodiment to the existing scheduler. FIG. 10 depicts a selection example of an VM subject to operation when an application is switched in the VM2. An explanatory view denoted by reference numeral 1001 depicts the application priority information table 114 after the switching. The execution state of applications in the VMs is the same as the application priority information table 114 denoted by reference numeral 902 and will not be described.

As depicted in the application priority information table 114 in the explanatory view denoted by reference numeral 1001, the application under execution of the VM2 is switched from the application C to unknown and the priority information is changed to 2. In this case, the hypervisor 111 executes the execution application identifier 315 and subsequently executes the execution VM selector 316. With the function of the execution VM selector 316, the hypervisor 111 selects the execution VM from the VM2 and the VM1 having the priority UNDER given by the credit scheduler.

Specifically the selection of the execution VM will be described with reference to an explanatory view denoted by reference numeral 1002. The hypervisor 111 compares the priority information of the objects to be compared, i.e., the VM1 and the VM2 having the priority UNDER. Since the VM1 has higher priority information as a result of the comparison, the hypervisor 111 selects the VM1 and sets the VM1 as the execution VM. Subsequently, the hypervisor 111 registers the VM2 into the run queue. Since the VM2 has a higher priority between the VM2 and the VM3 in terms of the priorities of the credit scheduler, the hypervisor 111 registers the VMs in the order from the VM2 to the VM3.

Although the hypervisor 111 makes a comparison based on the same priority in FIGS. 9 and 10, the execution VM may be selected from VMs of all the priorities UNDER and OVER. On this occasion, the hypervisor 111 may directly compare the priority information or may subtract a certain value from the priority information of a VM having the priority OVER so as to compare OVER and UNDER and may compare a remaining value with the priority information of a VM of UNDER. Although the credit scheduler has two types of priorities, the embodiment is applicable to schedulers having three or more types of priorities.

The hypervisor 111 may change whether the priority information of an application is applied, depending on whether OS on VM operates in a user mode or in a kernel mode. Although an application actually operates when OS operates in the user mode, the OS executes processes such as a system call, device access, or application switching when the OS operates in the user mode. Since application switching is performed when the OS operates in the kernel mode, an application may possibly be switched to an application more desired to be prioritized. In such a case, if the hypervisor 111 performs the scheduling in accordance with the priority information of applications, the execution of the application desired to be prioritized is delayed.

Therefore, if the OS operates in the kernel mode, the hypervisor 111 does not utilize the priority information of applications and makes no change to the operation of the credit scheduler. As a result, the information processing apparatus 100 can timely execute the application desired to be prioritized.

FIGS. 11 to 16 depict the processes of the information processing apparatus 100 according to the first embodiment by using the functions and the tables described with reference to FIGS. 3 to 7. The processes are implemented by the CPU 101 executing the function of the hypervisor 111, the function of the priority control VM 112, and the functions of the VM1 and the VM2. In the following description, the hypervisor 111, the priority control VM 112, the VM1, and the VM2 are described as execution entities so as to describe what piece of software implements each of the processes.

Figure 11:
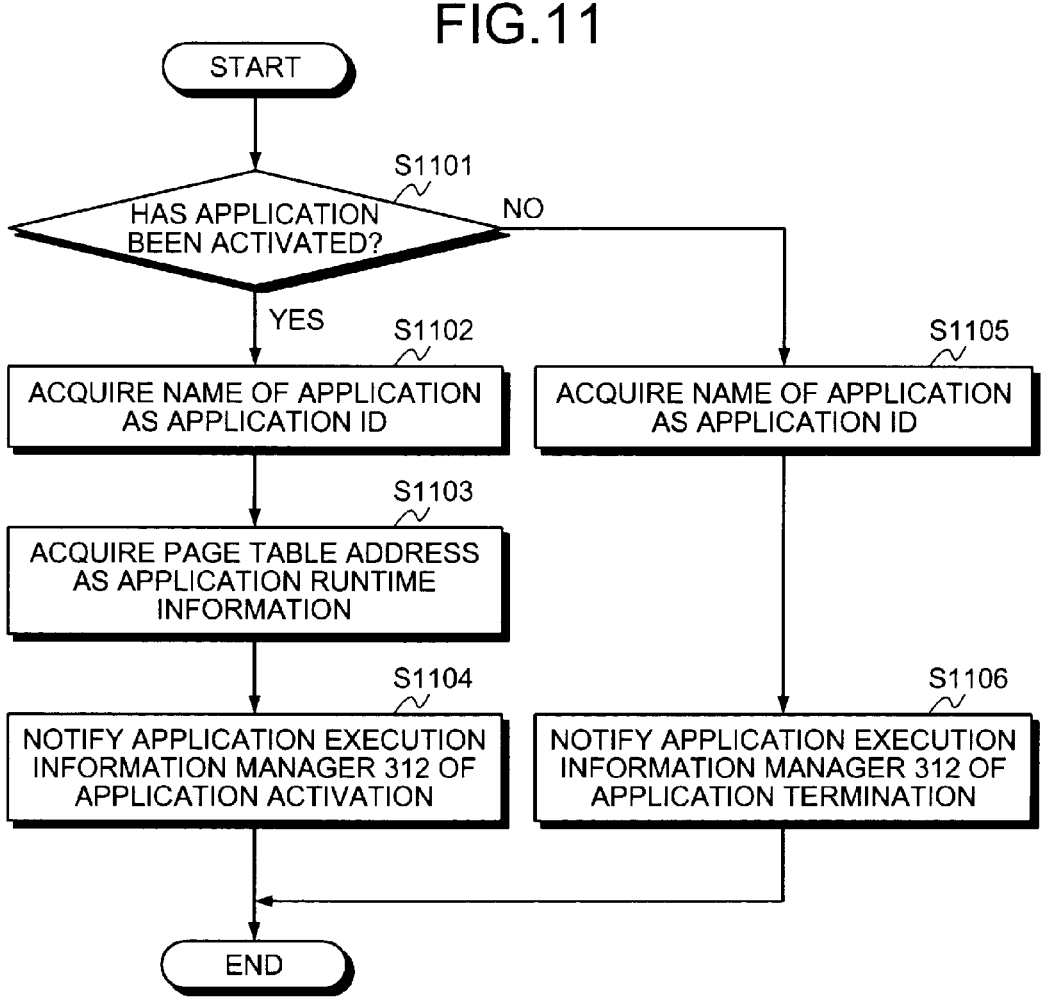
FIG. 11 is a flowchart of an example of a process procedure of an application notifier 311.

FIG. 11 is a flowchart of an example of the process procedure of the application notifier 311. The application notifier 311 is executed on the VM1 and the VM2, which are virtual machines. The description of FIG. 11 will be made on the assumption that the VM1 executes the unit. The application notifier 311 starts operating at the time of activation or termination of application. Before describing the flowchart, an activation process executed at the time of application activation and a termination process executed at the time of application termination will be described.

The application activation is executed in OS on VM by specifying a command including a file name of an executable application with a system call. In short, the following process is executed for the activation process. First, OS generates a process and prepares a virtual address space. Subsequently, the OS expands a file of the executable application in the virtual address space and sets a register such as a program counter to start execution of application. In this procedure, pieces of information such as a process ID and a name of application are retained by the OS. The application activation process is as described above.

The termination process will then be described. The OS releases resources such as a memory and deletes the process. In this procedure, pieces of information such as a process ID and a program name are deleted from a guest OS. The application notifier 311 may be included in the application activation process and termination process.

The VM1 determines whether an application is activated (step S1101). If an application is activated (step S1101: YES), the VM1 acquires the name of the application as an application ID (step S1102). After the acquisition, the VM1 acquires a page table address as the application runtime information (step S1103), notifies the application execution information manager 312 of the application activation (step S1104), and terminates the process of the application notifier 311.

If the application is terminated (step S1101: NO), the VM1 acquires the name of the application as an application ID (step S1105), notifies the application execution information manager 312 of the application termination (step S1106), and terminates the process of the application notifier 311.

Figure 12:
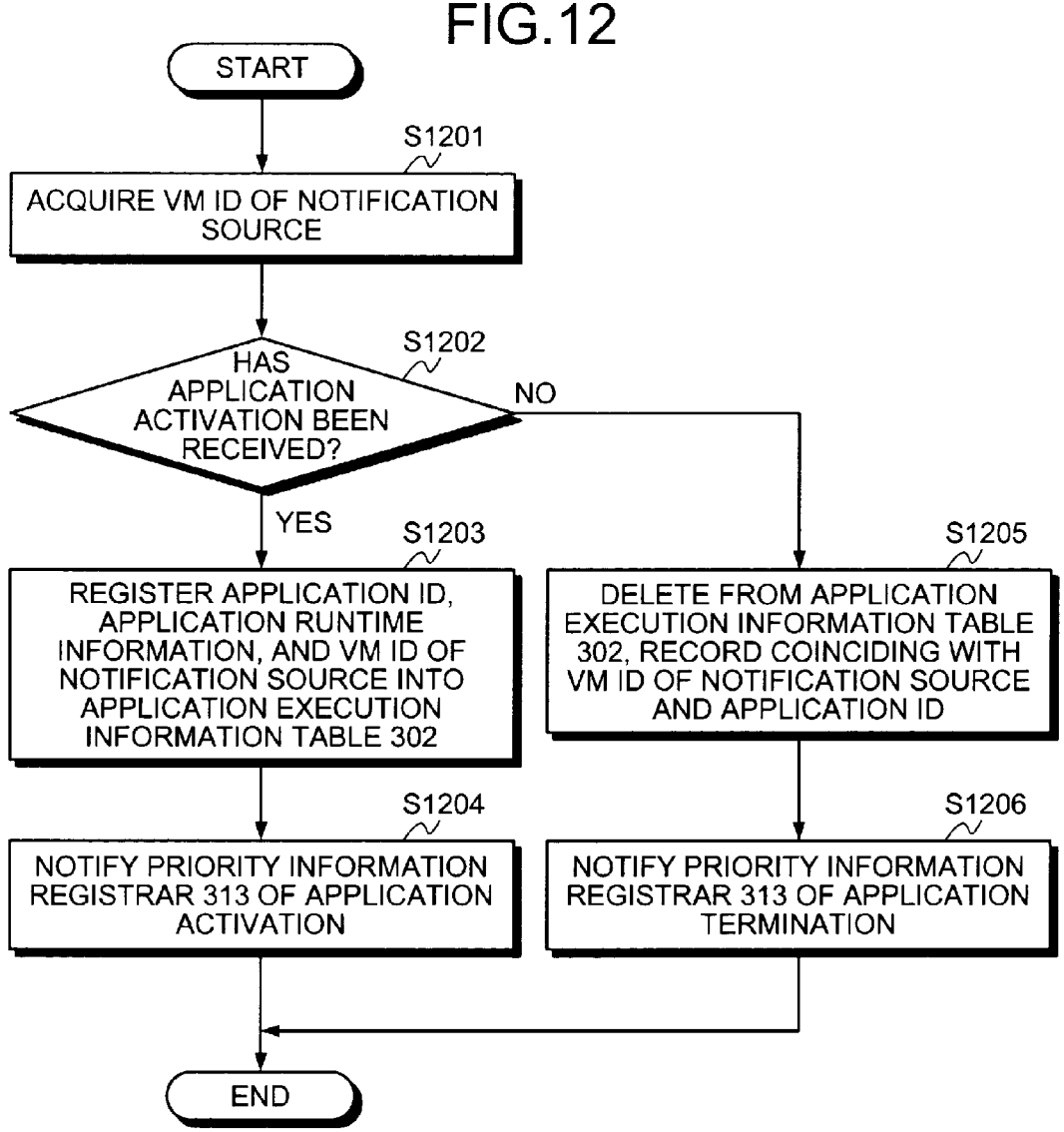
FIG. 12 is a flowchart of an example of a process procedure of an application execution information manager 312.

FIG. 12 is a flowchart of an example of the process procedure of the application execution information manager 312. The application execution information manager 312 is executed by the hypervisor 111. The application execution information manager 312 starts operating at the time of the notification from the application notifier 311.

The hypervisor 111 acquires the VM ID of the notification source (step S1201). The hypervisor 111 can acquire the VM ID of the notification source by acquiring an ID of a currently operating VM. For example, if the VM1 is in execution and the notification is sent from the application notifier 311-1, the hypervisor 111 acquires the VM1. Similarly, if the VM2 is in execution and the notification is sent from the application notifier 311-2, the hypervisor 111 acquires the VM2.

After the acquisition, the hypervisor 111 determines whether the application activation been received (step S1202). If the application activation been received (step S1202: YES), the hypervisor 111 registers the application ID, the application runtime information, and the VM ID of the notification source into the application execution information table 302 (step S1203). After the registration, the hypervisor 111 notifies the priority information registrar 313 of the application activation (step S1204) and terminates the process of the application execution information manager 312.

If the application termination been received (step S1202: NO), the hypervisor 111 deletes a record coinciding with the VM ID of the notification source and the application ID from the application execution information table 302 (step S1205). After the deletion, the hypervisor 111 notifies the priority information registrar 313 of the application termination (step S1206) and terminates the process of the application execution information manager 312.

Figure 13:
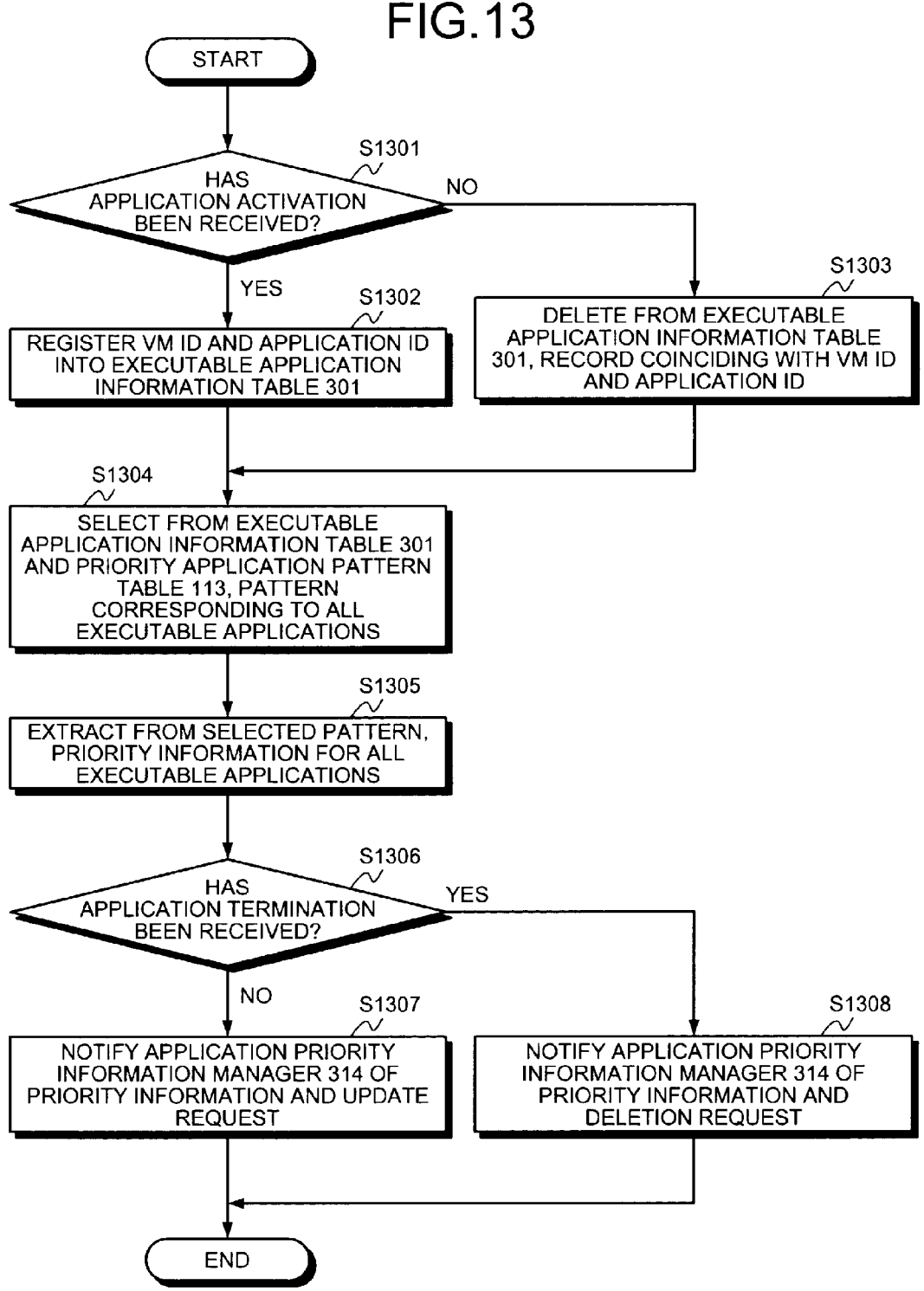
FIG. 13 is a flowchart of an example of a process procedure of a priority information registrar 313.

FIG. 13 is a flowchart of an example of the process procedure of the priority information registrar 313. The priority information registrar 313 is executed on the priority control VM 112. The priority information registrar 313 starts operating at the time of the notification from the application execution information manager 312.

The priority control VM 112 determines whether the application activation been received (step S1301). If the application activation been received (step S1301: YES), the priority control VM 112 registers the VM ID and the application ID into the executable application information table 301 (step S1302). If the application termination been received (step S1301: NO), the priority control VM 112 deletes a record coinciding with the VM ID and the application ID from the executable application information table 301 (step S1303).

After the registration or the deletion, the priority control VM 112 selects a pattern corresponding to all the executable applications from the executable application information table 301 and the priority application pattern table 113 (step S1304). After the selection, the priority control VM 112 extracts the priority information of all the executable applications from the selected pattern (step S1305). After the determination, the priority control VM 112 determines whether the application termination been received (step S1306). If receiving other than the application termination (step S1306: NO), the priority control VM 112 notifies the application priority information manager 314 of the priority information and an update request (step S1307) and terminates the process of the priority information registrar 313.

If receiving the application termination (step S1306: YES), the priority control VM 112 notifies the application priority information manager 314 of the priority information and a deletion request (step S1308) and terminates the process of the priority information registrar 313. The priority information of the notification may be supplied on the basis of an application or may be supplied on the basis of a VM or in a form based on all the executable applications or a difference of a change.

Figure 14:
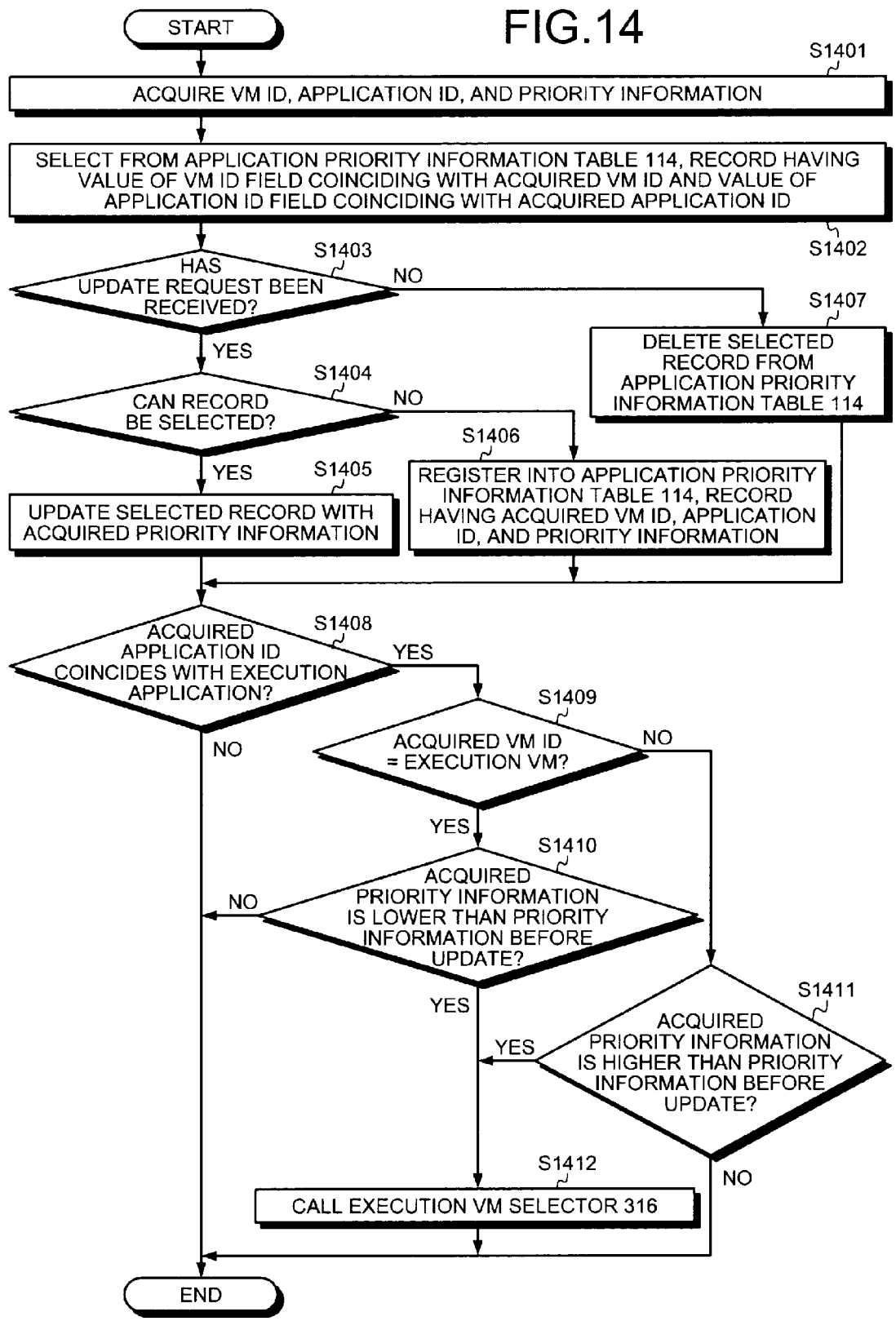
FIG. 14 is a flowchart of an example of a process procedure of an application priority information manager 314.

FIG. 14 is a flowchart of an example of the process procedure of the application priority information manager 314. The application priority information manager 314 is executed by the hypervisor 111. The application priority information manager 314 starts operating at the time of the notification from the priority information registrar 313. In this example, the notification from the priority information registrar 313 is made for each record. The notification from the priority information registrar 313 may be made for multiple records, records of each VM, or all the records. The notification from the priority information registrar 313 may be made for changed records. The information supplied for one record is information that is a set of the VM ID, the application ID, and the priority information.

The hypervisor 111 acquires the VM ID, the application ID, and the priority information (step S1401). After the acquisition, the hypervisor 111 selects a record having a value of the VM ID field coinciding with the acquired VM ID and a value of the application ID field coinciding with the acquired application ID, from the application priority information table 114 (step S1402). After the selection, the hypervisor 111 determines whether the update request been received (step S1403). If the update request been received (step S1403: YES), the hypervisor 111 subsequently determines whether the record can be selected (step S1404).

If the record can be selected (step S1404: YES), the hypervisor 111 updates the selected record with the acquired priority information (step S1405). If the record cannot be selected (step S1404: NO), the hypervisor 111 registers a record having the acquired VM ID, application ID, and priority information into the application priority information table 114 (step S1406). If the deletion request been received (step S1403: NO), the hypervisor 111 deletes the selected record from the application priority information table 114 (step S1407).

After performing one of the update, the registration, and the deletion, the hypervisor 111 determines whether the acquired application ID coincides with the execution application (step S1408). If matching (step S1408: YES), the hypervisor 111 determines whether the acquired VM ID indicates the execution VM (step S1409). If indicating the execution VM (step S1409: YES), the hypervisor 111 subsequently determines whether the acquired priority information is lower than the priority information before update (step S1410). If indicating the execution VM and lower than the priority information before update (step S1410: YES), the hypervisor 111 calls the execution VM selector 316 (step S1412) and terminates the process of the application priority information manager 314.

If not indicating the execution VM (step S1409: NO), the hypervisor 111 determines whether the acquired priority information is higher than the priority information before update (step S1411). If higher than the priority information before update (step S1411: YES), the hypervisor 111 proceeds to the operation at step S1412. If indicating the execution VM and equal to or greater than the priority information before update (step S1410: NO) or if not indicating the execution VM and equal to or less than the priority information before update (step S1411: NO), the hypervisor 111 terminates the process of the application priority information manager 314.

If not matching (step S1408: NO), the hypervisor 111 terminates the process of the application priority information manager 314. With regard to the process of step S1408, if the deletion request is supplied from the priority information registrar 313, the application ID never coincides with the execution application. Therefore, if the deletion request is supplied, the hypervisor 111 may execute the route of step S1408: NO without executing the process of step S1408.

In the case of step S1408: YES, the hypervisor 111 may execute the process of step S1412 without executing the determination processes of step S1409 to step S1411. In this case, the hypervisor 111 can save the time required for the determinations. If the determination processes of step S1409 to step S1411 are executed, the hypervisor 111 can limit the call of the execution VM selector 316, thereby suppressing wasted scheduling processes.

Figure 15:
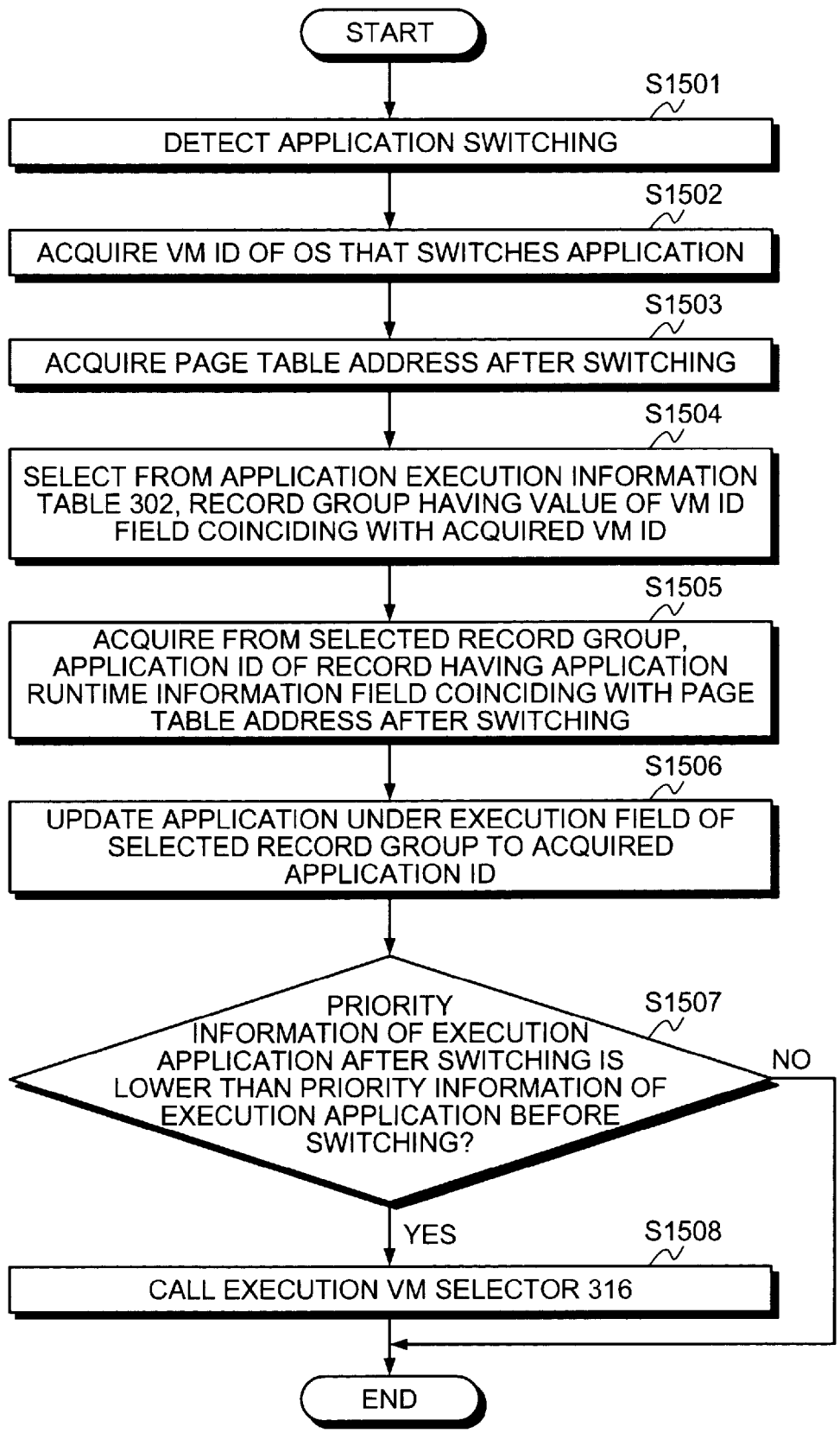
FIG. 15 is a flowchart of an example of a process procedure of an execution application identifier 315.

FIG. 15 is a flowchart of an example of the process procedure of the execution application identifier 315. The execution application identifier 315 is executed by the hypervisor 111. The execution application identifier 315 starts operating at the time of the application switching in OS on VM.

The hypervisor 111 detects the application switching (step S1501) and acquires the VM ID of the OS that switches the application (step S1502). After the acquisition, the hypervisor 111 acquires the page table address after the switching (step S1503).

With regard to a method of acquiring the page table address, in the case of the OS having a virtual machine implementing method that is the full virtualization, the information processing apparatus 100 shifts a process from the OS to the hypervisor 111 in accordance with an instruction for setting a page table. In this case, the hypervisor 111 can acquire the page table address by analyzing the page table setting instruction causing the shift of the process. In the case of the OS having a virtual machine implementing method that is the paravirtualization, since the page table address after the switching is specified as an argument of a hypercall, the hypervisor 111 can acquire the page table address from the argument.

A physical address is specified as the page table address. However, in the case of virtualization by virtual software, OS on a virtual machine uses a virtual physical address different from an actual physical address. Therefore, with regard to an address type of the application runtime information registered in the application execution information table 302, an address of the same type is registered as the address acquired at step S1503. The type of the address may be an actual physical address, a virtual physical address, and a virtual address.

After acquiring the page table address, the hypervisor 111 selects a record group having a value of the VM ID field coinciding with the acquired VM ID, from the application execution information table 302 (step S1504). After the selection, the hypervisor 111 acquires an application ID of a record having the application runtime information field coinciding with the page table address after the switching, from the selected record group (step S1505).

After the acquisition, the hypervisor 111 updates the application under execution field of the selected record group to the acquired application ID (step S1506) and determines whether the priority information of the execution application after the switching is lower than the priority information of the execution application before the switching (step S1507). If the priority information of the execution application after the switching is lower (step S1507: YES), the hypervisor 111 calls the execution VM selector 316 (step S1508) and terminates the process of the execution application identifier 315. If the priority information of the execution application after the switching is not lower (step S1507: NO), the hypervisor 111 terminates the process of the execution application identifier 315.

The hypervisor 111 may select the route of step S1507: YES to execute the process of step S1508 without executing the determination process of step S1507. In this case, the hypervisor 111 can save the time required for the determinations. If the determination process of step S1507 is executed, the hypervisor 111 can limit the call of the execution VM selector 316, thereby suppressing wasted scheduling processes.

Figure 16:
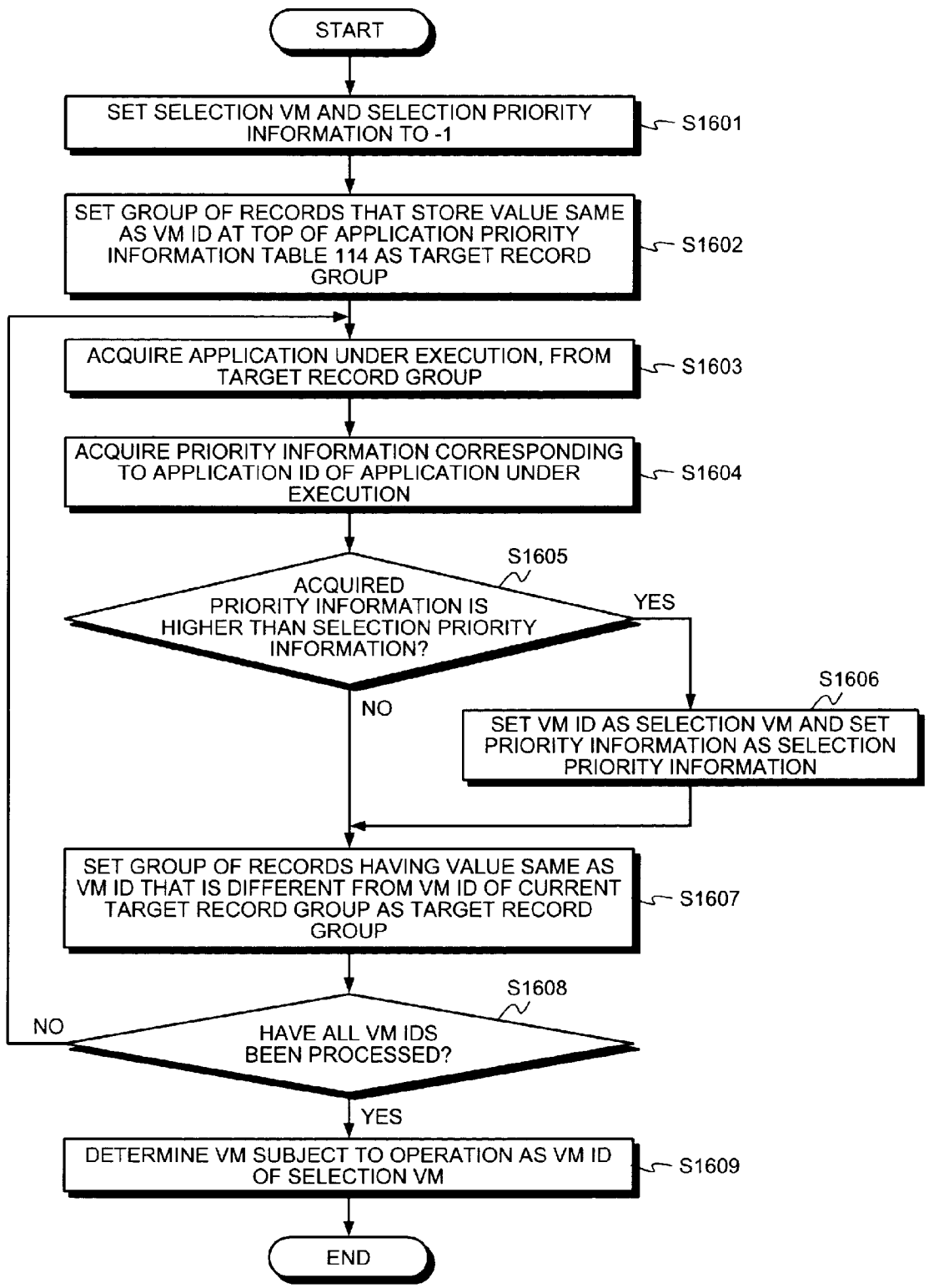
FIG. 16 is a flowchart of an example of a process procedure of an execution VM selector 316.

FIG. 16 is a flowchart of an example of the process procedure of the execution VM selector 316. The execution VM selector 316 is a portion of a scheduler function and therefore starts operating when a VM scheduler of the hypervisor 111 operates. If an execution application is changed by the execution application identifier 315 or if the priority information is updated by the application priority information manager 314, the execution VM selector 316 may be called.

The hypervisor 111 sets a selection VM and selection priority information to −1 (step S1601). The selection VM and the selection priority information are variables that temporarily retain a VM to be selected and priority information of the VM to be selected. After the setting, the hypervisor 111 sets a group of records that store a value that is the same as the VM ID of the application priority information table 114 as a target record group (step S1602). Subsequently, the hypervisor 111 acquires the application under execution from the target record group (step S1603) and acquires the priority information corresponding to the application ID of the application under execution (step S1604).

After the acquisition, the hypervisor 111 determines whether the acquired priority information is higher than the selection priority information (step S1605). If the acquired priority information is higher than the selection priority information (step S1605: YES), the hypervisor 111 sets the VM ID of the target record group as the selection VM and sets the acquired priority information as the selection priority information (step S1606). After the setting, or if the acquired priority information is equal to or lower than the selection priority information (step S1605: NO), the hypervisor 111 sets a group of records that store a value that is the same as a VM ID that is different from the VM ID of the current target record group as the target record group (step S1607).

After the setting, the hypervisor 111 determines whether all the VM IDs are processed (step S1608). If an unprocessed VM ID exists (step S1608: NO), the hypervisor 111 proceeds to the operation at step S1603. If all the VM IDs are processed (step S1608: YES), the hypervisor 111 determines the execution VM as the VM ID of the selection VM (step S1609) and terminates the process of the execution VM selector 316.

As described above, if an executable application is activated or terminated in each of multiple OSs, the scheduling program and the information processing apparatus update the priorities of applications depending on a combination of executable applications of each OS. Therefore, the information processing apparatus can provide the priority control in accordance with an execution state of applications. Since priorities set in OSs are not used, the information processing apparatus according to the first embodiment can eliminate the possibility that a priority set in one OS interferes with operation of the other OS.

After the update of the priority information, the information processing apparatus may select an execution OS based on whether an update object application is in the execution state, whether the update object application is executed by the execution OS, and the high/low relationship between the priority before update of the update object application and the priority after update. As a result, the information processing apparatus according to the first embodiment can suppress wasted scheduling processes.

If it is detected that an application in the execution state is switched in any OS, the information processing apparatus may select the execution OS based on a determination result acquired by determining the high/low relationship between the priority of software before the switching and the priority of software after the switching.

The information processing apparatus 100 according to a second embodiment utilizes information of switching of VM and a foreground application change in OS on VM so as to determine the priority information the foreground application is an application to be operated by a keyboard 208 etc., of a user. The foreground application of an operation subject OS running on a VM subject to operation is displayed on the display 206. A switched application turns to a background application the background application is a nonoperational application not operated by a user.

The VM subject to operation is a VM to be operated by a user. The operation subject OS is an OS executed on the VM subject to operation and specifically is an OS that receives input from the keyboard 208 to execute a process.

The information processing apparatus 100 according to the second embodiment will hereinafter be described with reference to FIGS. 17 to 24. A hardware example of the information processing apparatus 100 according to the second embodiment is the same as the information processing apparatus 100 according to the first embodiment depicted in FIG. 2 and will not be described.

Figure 17:
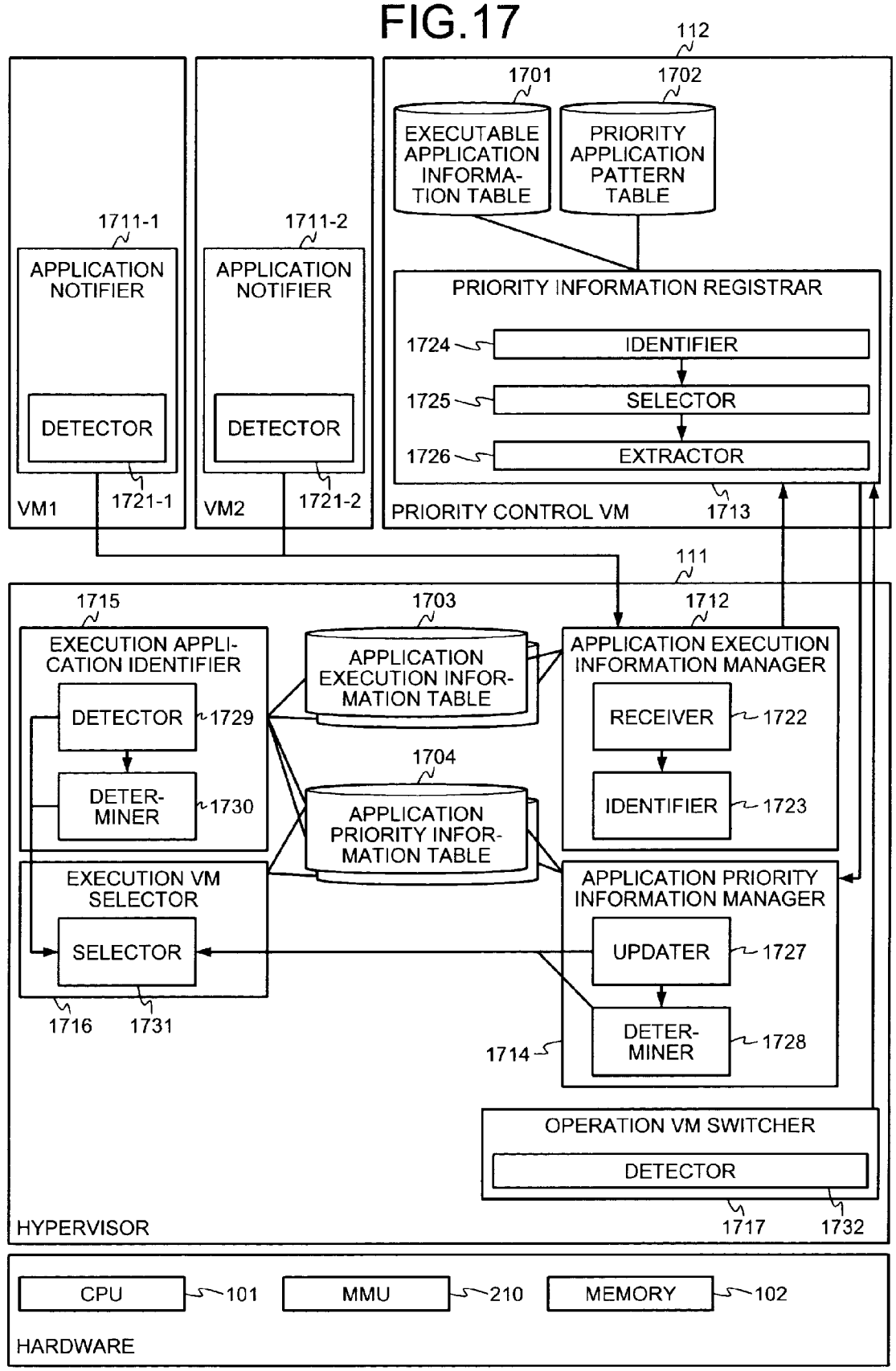
FIG. 17 is a block diagram of a functional example of the information processing apparatus 100 according to a second embodiment.

FIG. 17 is a block diagram of a functional example of the information processing apparatus 100 according to the second embodiment. The information processing apparatus 100 according to the second embodiment can access an executable application information table 1701, a priority application pattern table 1702, an application execution information table 1703, and an application priority information table 1704, as tables accessed from the functions. The application execution information table 1703 and the application priority information table 1704 store the same information as the application execution information table 302 and the application priority information table 114 and will not be described.

The information processing apparatus 100 includes an application notifier 1711 to an execution VM selector 1716 and an operation VM switcher 1717. The application priority information manager 1714 to the execution VM selector 1716 are the same functions as the application priority information manager 314 to the execution VM selector 316 and will not be described. The information processing apparatus 100 also includes a detector 1721 to a selector 1731 and a detector 1732 within the application notifier 1711 to the operation VM switcher 1717. The identifier 1723 and the updater 1727 to the selector 1731 are the same functions as the identifier 323 and the updater 327 to the selector 331 and will not be described. The detector 1732 is included in the operation VM switcher 1717. The operation VM switcher 1717 is a function included in the hypervisor 111.

The executable application information table 1701 is a table that stores the operation subject VM and applications operating in the foreground in VMs, in addition to the information stored in the executable application information table 301. Details of the executable application information table 1701 will be described later with reference to FIG. 18.

The priority application pattern table 1702 stores a priority when an object software in a pattern is in the foreground and is the operation subject, and a priority when the object software is in the background and is not the operation subject in the pattern store in the priority application pattern table 113. The priority application pattern table 1702 stores a priority when an OS executing an object application in a pattern is the VM subject to operation, and a priority when the OS is not the VM subject to operation. Details of the priority application pattern table 1702 will be described later with reference to FIG. 19.

The application notifier 1711 gives a notification of a change of the foreground application in addition to notifications of application activation and application termination. The application execution information manager 1712 receives a foreground change in addition to application activation and application termination from the application notifier 1711. At the time of the foreground change, the application execution information manager 1712 notifies the priority information registrar 1713 of the foreground change.

The priority information registrar 1713 has a function of receiving the foreground application change from the application execution information manager 1712 and of also receiving the switching of the operation VM from the operation VM switcher 1717, in addition to the function of the priority information registrar 313.

The operation VM switcher 1717 switches the VM operated by a user and notifies the priority information registrar 1713 of the VM after the switching. For example, if the information processing apparatus 100 is a server, multiple VMs may be used by different users, respectively. In this case, interfaces of the information processing apparatus 100 such as the display 206 and the keyboard 208 may not be used, and interfaces of remotely logging apparatuses of users may be used. On the other hand, if the information processing apparatus 100 is a portable terminal, it is assumed that the portable terminal is occupied and used by one user. Therefore, if multiple OSs is operated by multiple VMs, the information processing apparatus 100 provides control such that the VM subject to operation is switched to use one OS.

The operation VM switcher 1717 also switches a VM capable of using input/output devices. The input/output devices are devices such as the display 206 and the keyboard 208. A method of accessing a device from a VM may be the following three methods, for example.

In a first method, the device access is achieved by sending a message to a VM having a driver for accessing a device. The first method is referred to as a split driver since the method is implemented by dividing a driver into two drivers, i.e., an actual device driver and a device driver only sending a message. In a second method, a VM directly accesses a device. In a third method, a device is provided to a VM through emulation and the device access is achieved by using a result of the emulation.

Regardless of which method is employed, the information processing apparatus 100 sets the VM subject to operation among multiple VMs by giving the VM subject to operation a permission to access the device. With regard to a trigger of the switching of the VM subject to operation, for example, a special button may be determined in advance in the keyboard 208 and, when the predetermined button is pressed down, the VM subject to operation may be switched. With regard to another trigger of the switching of the VM subject to operation, the VM subject to operation may be switched by a special operation on a touch panel.

The detector 1721 has a function of detecting that a change is made in operation subject software in any one of multiple OSs. For example, the detector 1721 detects that the foreground application is changed from the application A to the application B. The detected data is stored in a storage area such as a register of the CPU 101, a cache memory of the CPU 101, the RAM 202, and the flash ROM 203.

The receiver 1722 has a function of receiving from any one of multiple OSs a change of operation subject software in the OS. For example, the receiver 1722 receives a notification that the foreground application is changed to the application B. A received notification may be stored in the storage area such as the register of the CPU 101, the cache memory of the CPU 101, the RAM 202, and the flash ROM 203.

The identifier 1724 has a function of identifying a group of operation subject software and a group of completely activated software in each of multiple OSs after a change of operation subject software if the receiver 1722 detects a change of the operation subject software. For example, if receiving a notification that the foreground application is changed from the application A to the application B, the identifier 1724 identifies the application B that is the operation subject, and the application A and the application B that are the executable applications in a certain OS.

If the detector 1732 detects a change of the operation subject OS, the identifier 1724 may identify an operation object OS after the change of the operation subject OS and a group of software completely activated in each of multiple OSs. For example, if it is detected that the operation subject OS is changed from the OS1 to the OS2, the identifier 1724 identifies the OS2 that is the operation subject OS, and the application A and the application B that are the executable applications in the OS other than the operation subject.

The selector 1725 selects a combination corresponding to the software group identified by the identifier 1724, from the second table. The storage contents of the second table are in the state of storing a priority when an object application is the operation subject, and a priority when the object application is not the operation subject, in terms of the priority of the object application in a pattern of the priority application pattern table 113 according to the first embodiment. The storage contents of the second table may be a priority when an OS executing the object application is the operation subject OS, and a priority when the OS is not the operation subject OS, in terms of the priority of the object application in each record of the priority application pattern table 113.

For example, it is assumed that a pattern number 1 and a pattern number 2 are registered as the patterns registered in the second table. The pattern number 1 is registered as the application B having the priority information of 3 at the time of foreground and the priority information of 1 at the time of background, and an OS executing the application B. The pattern number 2 is registered as the application A having the priority information of 5 at the time of foreground and the priority information of 4 at the time of background, and an OS executing the application A. In this case, the selector 1725 selects the pattern number 1 corresponding to the identified application group, from the registered patterns.

The number of the selected pattern or a pointer etc., to the selected pattern is stored in the storage area such as the register of the CPU 101, the cache memory of the CPU 101, the RAM 202, and the flash ROM 203.

The extractor 1726 has a function of extracting priorities of software in the identified software group, from the combination selected by the selector 1725, depending on whether software in the identified software group are the operation subjects. For example, it is assumed that the selector 1725 selects a pattern registered as the application B having the priority information of 3 at the time of foreground and the priority information of 1 at the time of background, and an OS executing the application B. If the application B is in the foreground, the extractor 1726 extracts 3 as the priority information of the application B. The extracted priority information is stored in the storage area such as the register of the CPU 101, the cache memory of the CPU 101, the RAM 202, and the flash ROM 203.

The detector 1732 has a function of detecting that the operation subject OS is changed. For example, the detector 1732 detects that the operation subject OS is changed from the OS1 to the OS2 as a result of a change of the VM subject to operation from the VM1 to the VM2. The detected data is stored in the storage area such as the register of the CPU 101, the cache memory of the CPU 101, the RAM 202, and the flash ROM 203.

FIG. 18 is an explanatory view of an example of storage contents in the executable application information table 1701 according to the second embodiment. The executable application information table 1701 is a table that includes a VM subject to operation field and a foreground application field in addition to the executable application information table 301. The values stored in the VM ID field and the application ID field are the same as the executable application information table 301 and will not be described.

The VM subject to operation field stores the VM ID of the current VM subject to operation the foreground application field stores the application ID currently in the foreground. For example, the executable application information table 1701 depicted in FIG. 18 indicates that the VM1 currently is the VM subject to operation and that the foreground application of the VM1 is the application A.

FIG. 19 is an explanatory view of an example of storage contents in the priority application pattern table 1702 according to the second embodiment. In the priority application pattern table 1702, the priority information field of the priority application pattern table 113 includes a VM-under-operation field and a VM-not-under-operation field as sub-fields. The VM-under-operation field further includes a foreground field and a background field. Similarly, the VM-not-under-operation field also includes a foreground field and a background field. The values stored in the pattern number field, the VM number field, and the application ID field are the same as the priority application pattern table 113 and will not be described.

The foreground field in the VM-under-operation field stores the priority information when the VM executing an object application is in operation and the object application is in the foreground. Similarly, the background field in the VM-under-operation field stores the priority information when the VM executing an object application is in operation and the object application is in the background.

The foreground field in the VM-not-under-operation field stores the priority information when the VM executing an object application is not in operation and the object application is in the foreground. Lastly, the background field in the VM-not-under-operation field stores the priority information when the VM executing an object application is not in operation and the object application is in the background.

For example, in the priority application pattern table 1702 depicted in FIG. 19, three patterns are registered. A pattern number 1 indicates a state where the application B is activated in a certain VM. When the pattern number 1 is extracted, if the VM executing the application B is in operation, the priority information of the application B is 3 when the application B is in the foreground and 1 when the application B is in the background. If a given VM is not in operation, the priority information of the application B is 3 when the application B is in the foreground and 1 when the application B is in the background.

Similarly, it is assumed that the pattern number 2 is extracted and the given VM executing the application A and the application B is in operation. In this case, when one of the application A, the application B, and an application other than the application A or the application B is in the foreground, the priority information of the application in the foreground is 5, 4, and 2, respectively. Similarly, when the application A, the application B, and the application other than the application A or the application B are in the background, the priority information of the applications is 4, 3, and 1, respectively. When the given VM executing the application A and the application B is not in operation, if one of the application A, the application B, and the application other than the application A or the application B is in the foreground, the priority information of the application in the foreground is 5, 4, and 0, respectively. Similarly, when the application A, the application B, and the application other than the application A or the application B are in the background, the priority information is 3, 3, and 0, respectively.

Similarly, when the pattern number 3 is extracted, if the given VM executing the application A and the application B is in operation and one of the application A and the application B is in the foreground, the priority information of the application in the foreground is 5 and 4, respectively. If the application A and the application B are in the background, the priority information of the applications is 5 and 3, respectively. If the given VM executing the application A and the application B is not in operation and one of the application A and the application B is in the foreground, the priority information of the application in the foreground is 5 and 4, respectively. If the application A and the application B are in the background, the priority information of the applications is 4 and 3, respectively.

When the pattern number 3 is extracted, if the given VM executing the application C and the application D is in operation and one of the application C and the application D is in the foreground, the priority information of the application in the foreground is 5 and 5, respectively. If the application C and the application D are in the background, the priority information of the applications is 4 and 2, respectively. If the given VM executing the application C and the application D is not in operation and one of the application C and the application D is in the foreground, the priority information of the application in the foreground is 5 and 4, respectively. If the application C and the application D are in the background, the priority information of the applications is 4 and 2, respectively.

Figure 20:
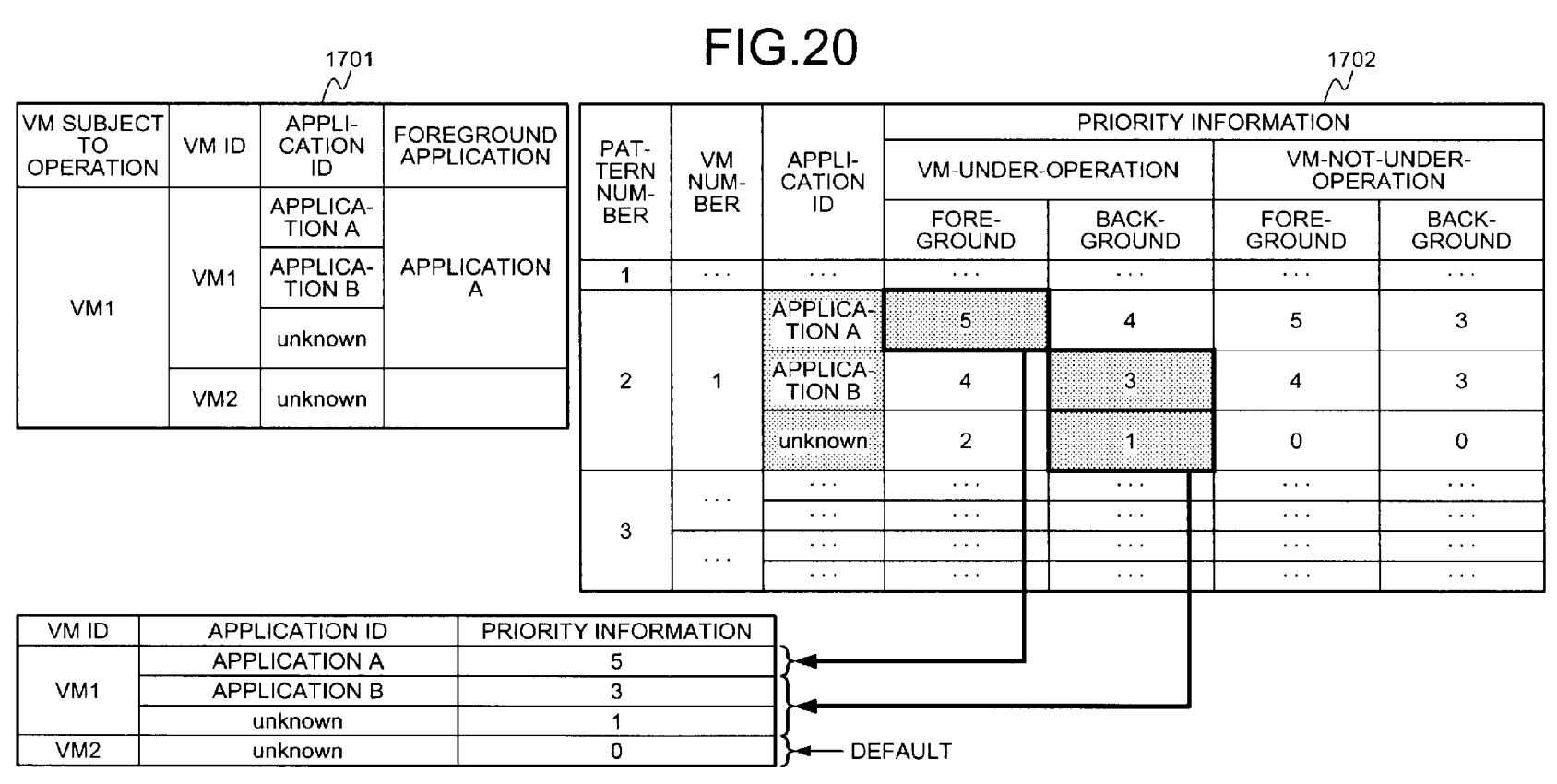

FIG. 20 is an explanatory view of an example of extraction of the priority information from the priority application pattern table 1702. In FIG. 20, the example of extraction of the priority information will be described based on the executable application information table 1701 and the priority application pattern table 1702. The pattern selection method is the same as the method depicted in FIG. 8 and will not described, and the case of selecting the pattern number 20 will be taken as an example in the description of FIG. 20.

The priority control VM 112 extracts a priority corresponding to the selected pattern depending on whether each application is executed in the VM subject to operation and whether each application is in the foreground. Specifically, if the pattern number 2 is selected, the priority control VM 112 determines the priority information of the application A, the application B, and the application other than the application A or the application B activated in the VM1, from the VM-under-operation field of the priority application pattern table 1702. The priority control VM 112 further determines the priority information of the application A, which is the foreground application as indicated in the executable application information table 1701, as 5 from the foreground field in the VM-under-operation field. Similarly, the priority control VM 112 determines the priority information of the application B and unknown, which are the background applications as indicated in the executable application information table 1701, as 3 and 1, respectively, from the background field in the VM-under-operation field.

Since no setting value is included in the pattern number 2 for some kind of application executed in the VM2, the priority control VM 112 sets the priority information 0 to the record having unknown set in the application ID field by default.

Figure 21:
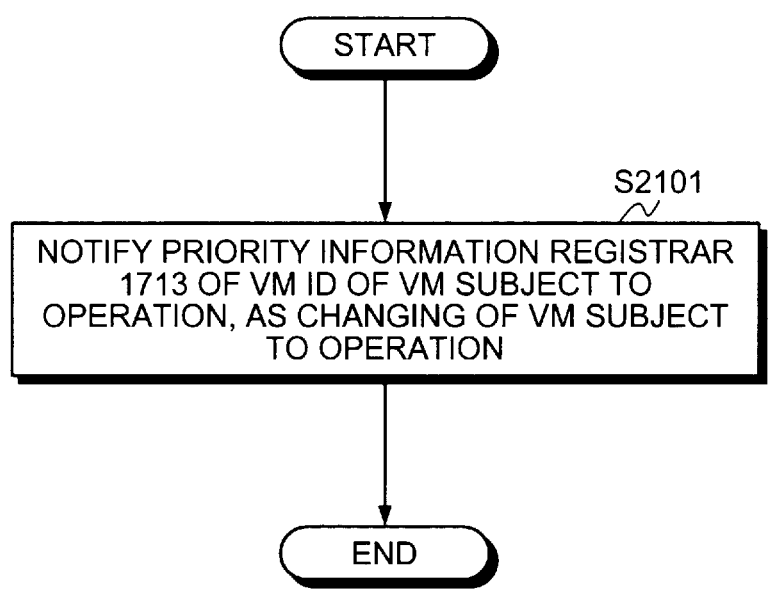
FIG. 21 is a flowchart of an example of a process procedure of an operation VM switcher 1717.

FIG. 21 is a flowchart of an example of the process procedure of the operation VM switcher 1717. The operation VM switcher 1717 is executed by the hypervisor 111. The operation VM switcher 1717 is executed after a switching operation is performed and a VM is switched. The hypervisor 111 notifies the priority information registrar 1713 of the VM ID of the VM subject to operation as a change of the VM subject to operation (step S2101) and terminates the process of the operation VM switcher 1717.

Figure 22:
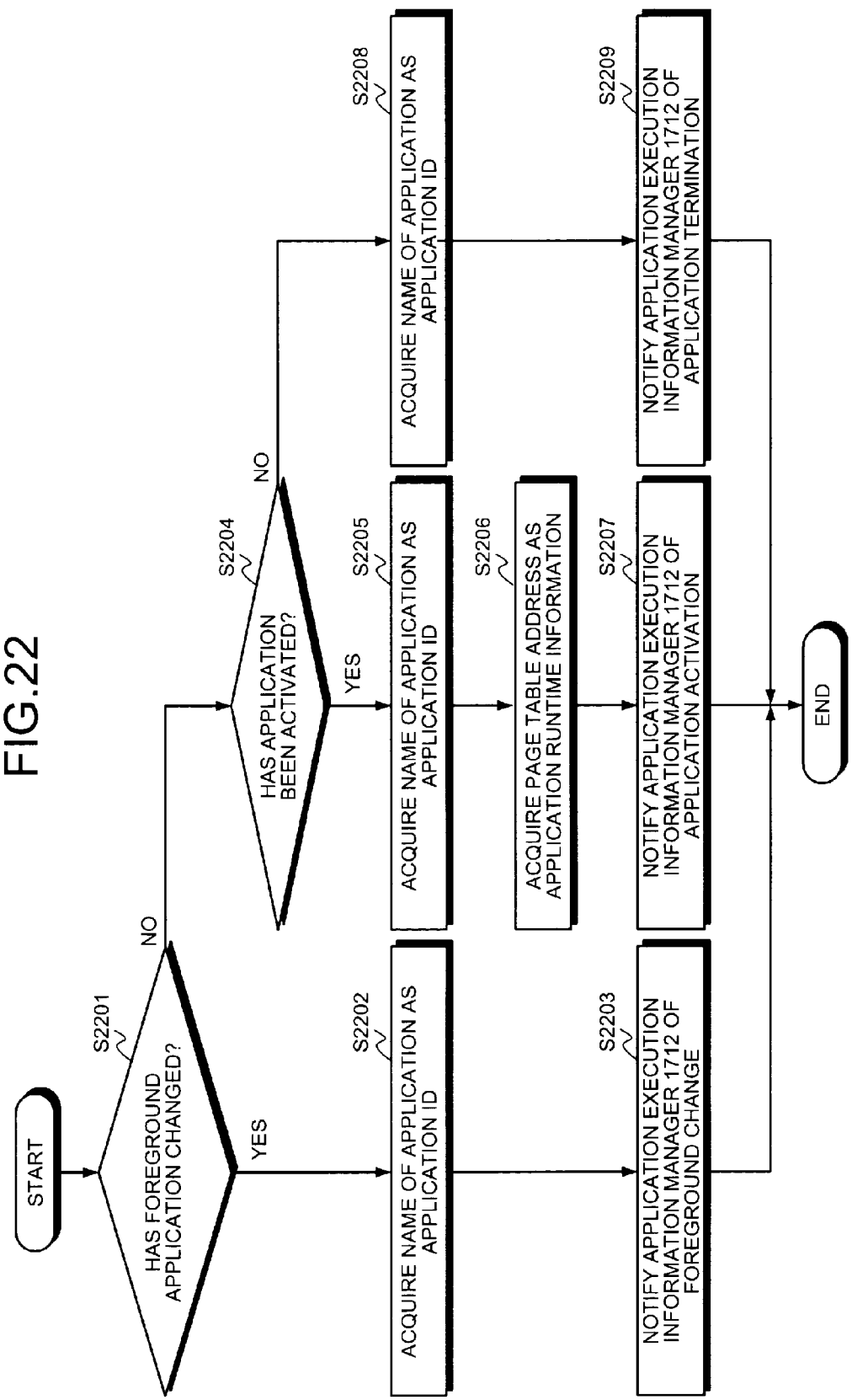
FIG. 22 is a flowchart of an example of a process procedure of an application notifier 1711 according to the second embodiment.

FIG. 22 is a flowchart of an example of the process procedure of the application notifier 1711 according to the second embodiment. The application notifier 1711 is executed on the VM1 and the VM2, which are virtual machines. The description of FIG. 22 will be made on the assumption that the VM1 executes the unit. The processes of step S2204 to step S2209 of FIG. 22 are equivalent to the processes of step S1101 to step S1106 of the application notifier 311 depicted in FIG. 11 and will not be described. The application execution information manager 312 to be processed at step S1104 and step S1106 is replaced with the application execution information manager 1712 in the processes of step S2207 and step S2209.

The VM1 determines whether the application in the foreground is changed (step S2201). If not changed (step S2201: NO), the VM1 proceeds to the operation at step S2204. If changed (step S2201: YES), the VM1 acquires the name of the application as an application ID (step S2202). After the acquisition, the VM1 notifies the application execution information manager 1712 of the foreground change and terminates the process of the application notifier 1711.

Figure 23:
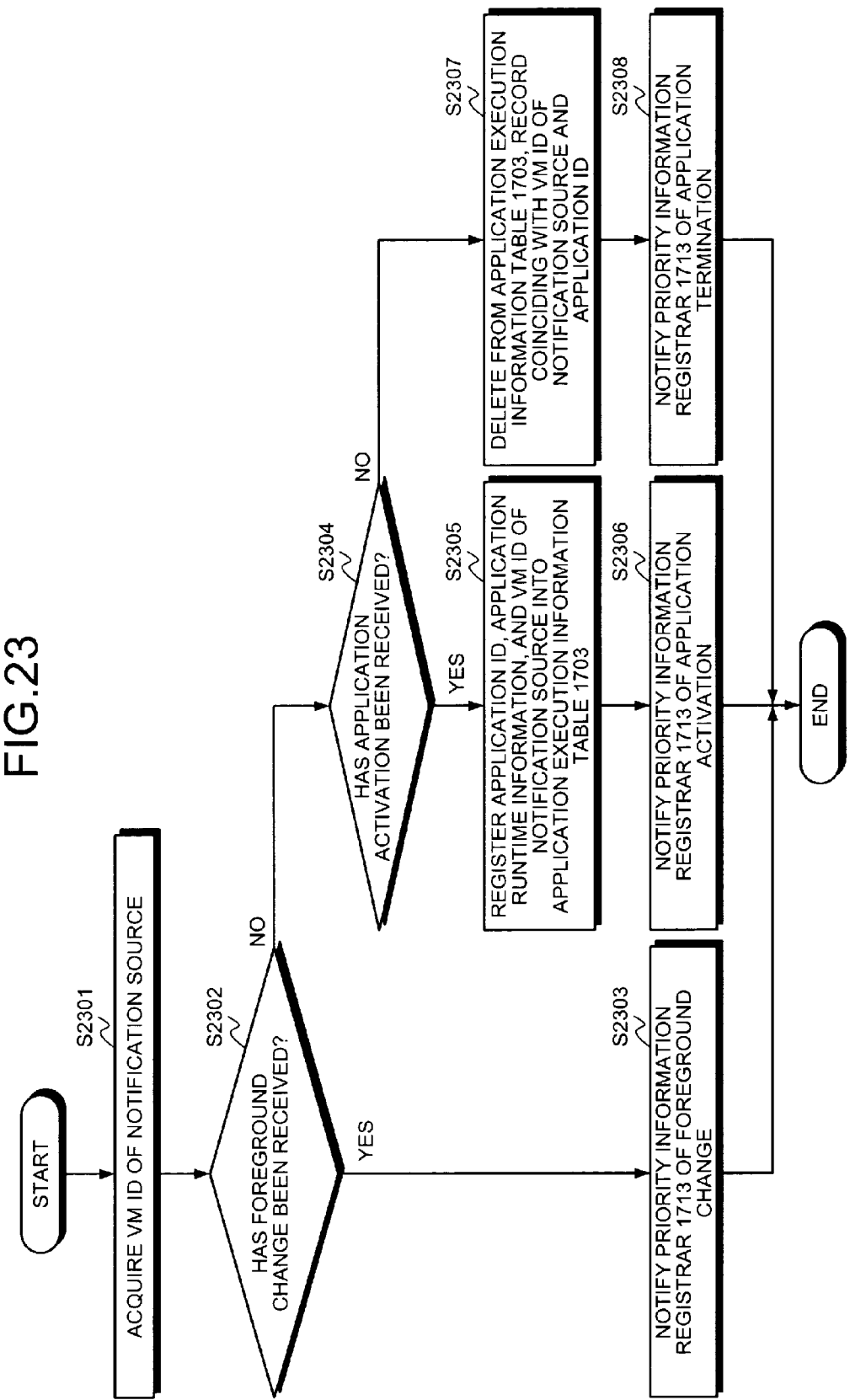
FIG. 23 is a flowchart of an example of a process procedure of an application execution information manager 1712 according to the second embodiment.

FIG. 23 is a flowchart of an example of the process procedure of the application execution information manager 1712 according to the second embodiment. The application execution information manager 1712 is executed by the hypervisor 111. The processes of step S2304 to step S2308 depicted in FIG. 23 are equivalent to the processes of step S1202 to step S1206 of the application execution information manager 312 depicted in FIG. 12 and will not be described.

The application execution information table 302 to be processed at step S1203 and step S1205 is replaced with the application execution information table 1703 in the processes of step S2305 and step S2307. Similarly, the priority information registrar 313 to be processed at step S1204 and step S1206 is replaced with the priority information registrar 1713 in the processes of step S2306 and step S2308.

The hypervisor 111 acquires the VM ID of the notification source (step S2301). After the acquisition, the hypervisor 111 determines whether a foreground change been received (step S2302). If other than the foreground change been received (step S2302: NO), the hypervisor 111 proceeds to the operation at step S2304. If foreground change been received (step S2302: YES), the hypervisor 111 notifies the priority information registrar 1713 of the foreground change (step S2303) and terminates the process of the application execution information manager 1712.

Figure 24:
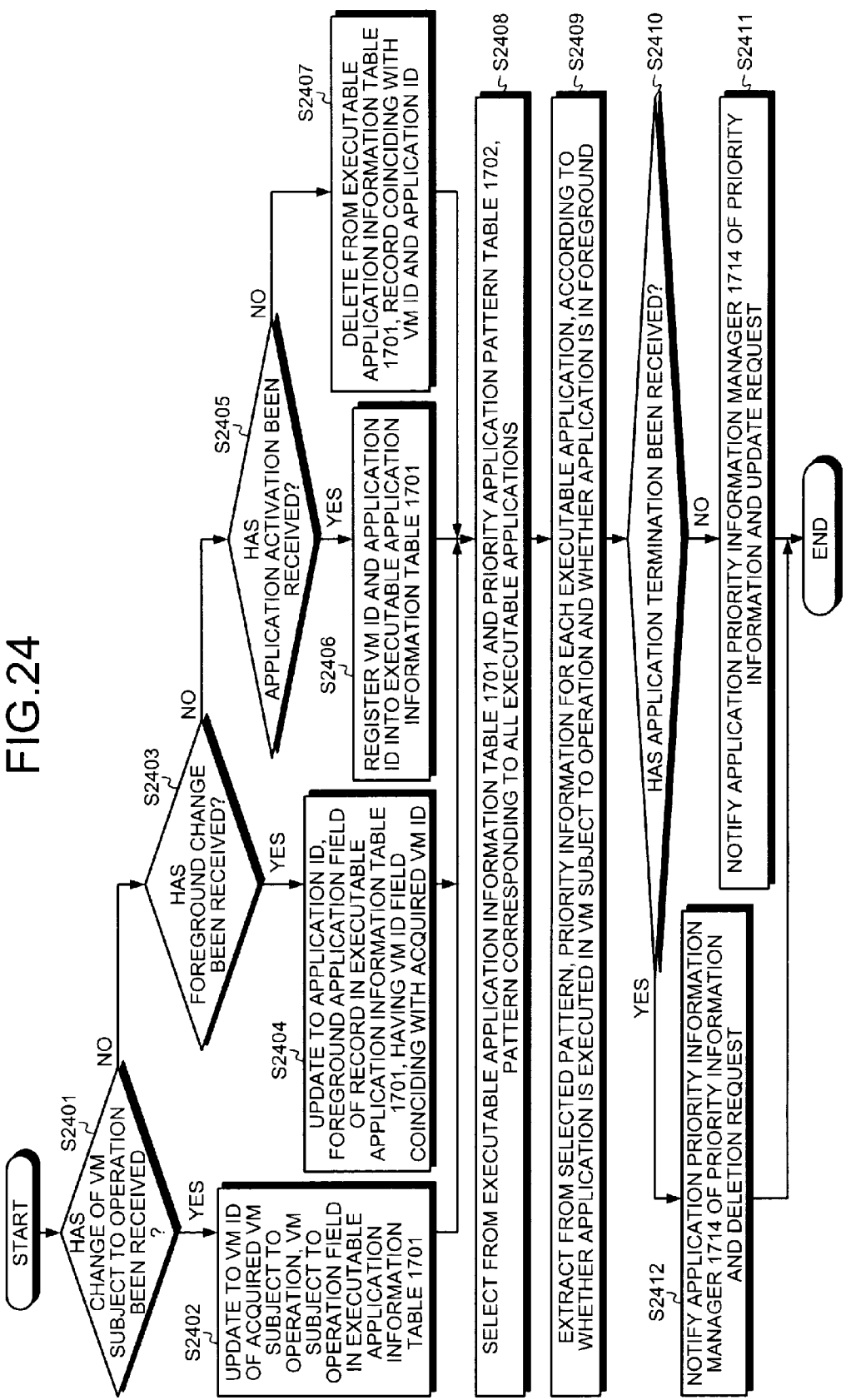
FIG. 24 is a flowchart of an example of a process procedure of a priority information registrar 1713 according to the second embodiment.

FIG. 24 is a flowchart of an example of the process procedure of the priority information registrar 1713 according to the second embodiment. The priority information registrar 1713 is executed on the priority control VM 112. The processes of step S2405 to step S2412 depicted in FIG. 24 are equivalent to the processes of step S1301 to step S1308 of the priority information registrar 313 depicted in FIG. 13 excluding step S2409 and will not be described.

The executable application information table 301 to be processed at step S1302 and step S1303 is replaced with the executable application information table 1701 in the processes of step S2406 and step S2407. The application priority information manager 314 to be processed at step S1307 and step S1308 is replaced with the application priority information manager 1714 in the processes of step S2411 and step S2412.

The priority control VM 112 determines whether a change of the VM subject to operation been received (step S2401). If a change of the VM subject to operation been received (step S2401: YES), the priority control VM 112 updates the VM subject to operation field of the executable application information table 1701 to the acquired VM ID of the VM subject to operation (step S2402) and proceeds to the operation at step S2408.

If a change of the VM subject to operation is not received (step S2401: NO), the priority control VM 112 determines whether a foreground change been received (step S2403). If a foreground change is not received (step S2403: NO), the priority control VM 112 proceeds to the operation at step S2405. If a foreground change been received (step S2403: YES), the priority control VM 112 updates the foreground application field of a record of the executable application information table 1701 having the VM ID field coinciding with the acquired VM ID, to the application ID (step S2404). After the update, the priority control VM 112 proceeds to the operation at step S2408.

After the process of step S2408, the priority control VM 112 extracts from the selected pattern, the priority information for each of the executable applications, according to whether the application is executed in the VM subject to operation and whether the application is in the foreground (step S2409). After the extraction, the priority control VM 112 proceeds to the operation at step S2410.

As described above, the scheduling program and the information processing apparatus detect that an operation subject application is changed, and update the priority of applications depending on whether the applications are operation subjects. Therefore, the information processing apparatus according to the second embodiment can schedule VMs by using the priority relationship of applications reflecting the utilization status in OS.

For example, an application executing a response process to a request from a user is generally set to a higher priority. However, an apparatus having a display with a smaller display area such as QVGA (quarter video graphics array) employed for portable terminals etc., often displays only the application in the foreground on the display. In this case, if the application executing the response process shifts to the background, the application executing the response process does not receive a request and, therefore, the information processing apparatus can set the priority lower and give a higher priority to another application to reflect the utilization status.

The information processing apparatus detects that the VM subject to operation is switched, and updates the priorities of applications depending on whether the applications are executed by the OS of the VM subject to operation. Therefore, the information processing apparatus according to the second embodiment can schedule VMs by using the priority information of applications reflecting the utilization status of multiple OSs.

For example, it is assumed that an OS1 running on the information processing apparatus executes a game application and a music player application and that an OS2 executes a download application and a mail creation application. In this case, if the OS1 is the operation subject OS, the information processing apparatus according to the second embodiment can execute the applications in accordance with priorities in the order of the game application, the music player application, the download application, and the mail creation application. By lowering the priorities of the mail creation application that never receives a response and the download application allowed to spend some time, the information processing apparatus according to the second embodiment can prevent skipping during music playing.

If the OS2 is the operation subject OS, the information processing apparatus according to the second embodiment can execute the applications in accordance with priorities in the order of the mail creation application, the music player application, the download application, and the game application. By lowering the priorities of the game application that never receives a response and the download application allowed to spend some time, the information processing apparatus according to the second embodiment can avoid a delay in a character input response when a mail is created. Therefore, the information processing apparatus according to the second embodiment can efficiently operate applications.

The information processing apparatus 100 according to a third embodiment is an example that an application notifier 2511 notifies an execution application identifier 2515 of an application switching. The information processing apparatus 100 according to the third embodiment will hereinafter be described with reference to FIGS. 25 to 27. A hardware example of the information processing apparatus 100 according to the third embodiment is the same as the information processing apparatus 100 according to the first embodiment depicted in FIG. 2 and will not be described. The information processing apparatus 100 according to the third embodiment will be described in terms of changes from the information processing apparatus 100 according to the first embodiment. The third embodiment is applicable to the information processing apparatus 100 according to the second embodiment.

Figure 25:
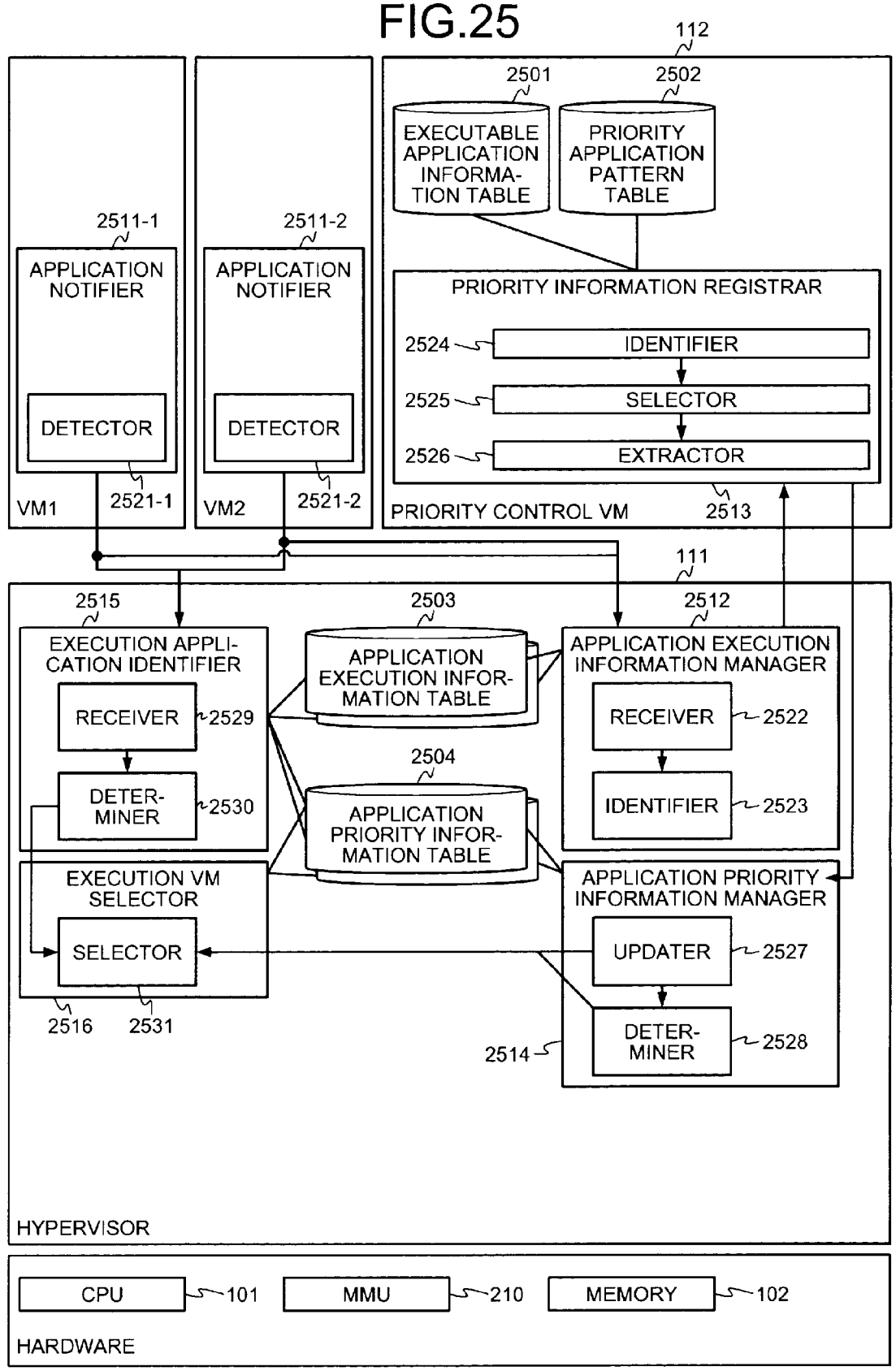
FIG. 25 is a block diagram of a functional example of the information processing apparatus 100 according to a third embodiment.

FIG. 25 is a block diagram of a functional example of the information processing apparatus 100 according to the third embodiment. The information processing apparatus 100 according to the third embodiment can access an executable application information table 2501 to an application priority information table 2504, as tables accessed from the functions. The storage contents of the executable application information table 2501 to the application priority information table 2504 are equivalent to the executable application information table 301, the priority application pattern table 113, the application execution information table 302, and the application priority information table 114 and will not be described.

The information processing apparatus 100 includes the application notifier 2511 to an execution VM selector 2516. The application execution information manager 2512 to the application priority information manager 2514 and the execution VM selector 2516 are the same functions as the application execution information manager 312 to the application priority information manager 314 and the execution VM selector 316 and will not be described. The information processing unit 100 also includes a detector 2521 to a determiner 2528, an receiver 2529, a determiner 2530, and a selector 2531 within the application notifier 2511 to the execution VM selector 2516. The receiver 2522 to the determiner 2528 and the selector 2531 are the same functions as the identifier 323 to the determiner 328 and the selector 331 and will not be described. The receiver 2529 is included in the execution application identifier 2515.

The application notifier 2511 notifies the execution application identifier 2515 of an application switching when an application is switched in OS on VM, in addition to notifications of application activation and application termination. The execution application identifier 2515 receives a notification from the application notifier 2511 and identifies execution applications. If an application ID is used for the notification to the execution application identifier 2515, the application notifier 2511 may not notify the application execution information manager 2512 of the application runtime information. In this case, the information processing apparatus 100 may not retain the application execution information table 2503. The application notifier 2511 may use a page table address for the notification to the execution application identifier 2515.

The detector 2521 has the function of the detector 321 including the function of the detector 329. The receiver 2529 receives a switching of software in the execution state. When the receiver 2529 receives a switching of software in the execution state, the determiner 2530 determines the high/low relationship between the priority of software before the switching and the priority of software after the switching.

Figure 26:
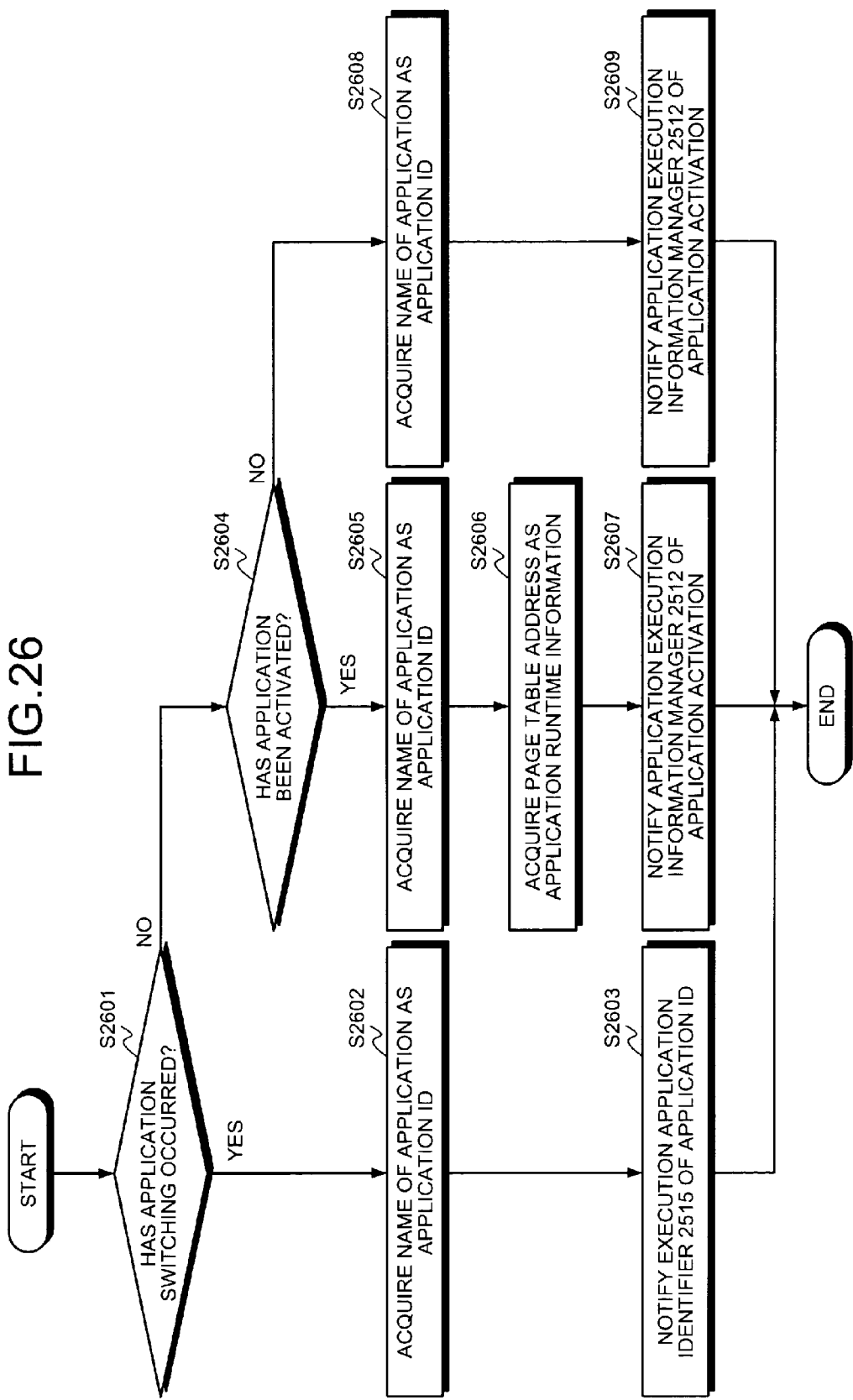
FIG. 26 is a flowchart of an example of a process procedure of an application notifier 2511 according to the third embodiment.

FIG. 26 is a flowchart of an example of the process procedure of the application notifier 2511 according to the third embodiment. The application notifier 2511 is executed by the VM1 and the VM2, which are virtual machines. The description of FIG. 26 will be made on the assumption that the VM1 executes the unit. The application notifier 2511 starts operating at the time of activation or termination of an application or an application switching. The processes of step S2604 to step S2609 depicted in FIG. 26 are equivalent to the processes of step S1101 to step S1106 of the application notifier 311 depicted in FIG. 11 and will not be described. The application execution information manager 312 to be processed at step S1104 and step S1105 is replaced with the application execution information manager 2512 in the processes of step S2607 and step S2609.

The VM1 determines whether an application switching occurs (step S2601). If no application switching occurs (step S2601: NO), the VM1 proceeds to the operation at step S2604. If an application switching occurs (step S2601: YES), the VM1 acquires the name of the application as an application ID (step S2602). After the acquisition, the VM1 notifies the execution application identifier 2515 of the application ID (step S2603) and terminates the process of the application notifier 2511.

Figure 27:
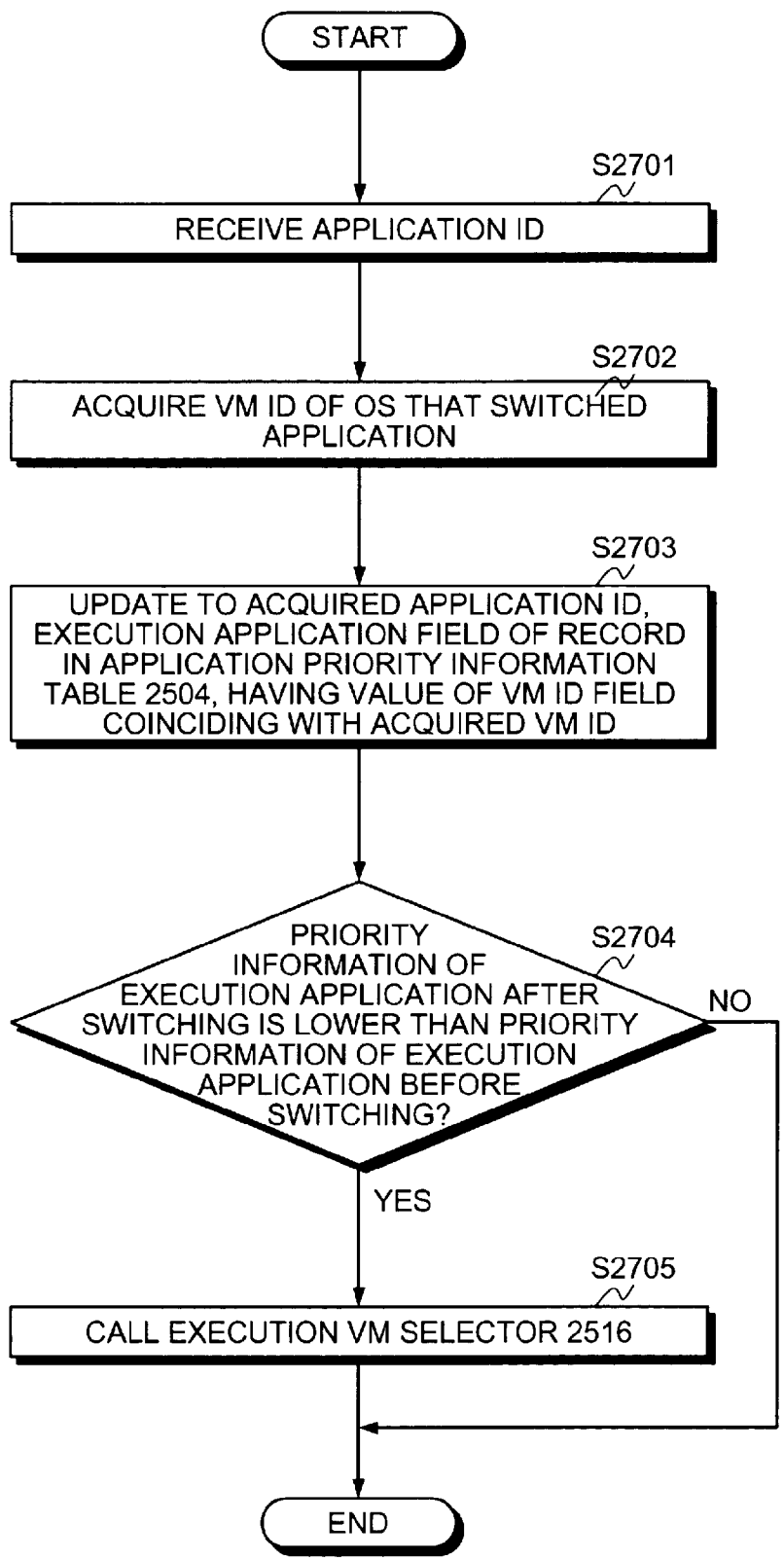
FIG. 27 is a flowchart of an example of a process procedure of an execution application identifier 2515 according to the third embodiment.

FIG. 27 is a flowchart of an example of the process procedure of the execution application identifier 2515 according to the third embodiment. The execution application identifier 2515 is executed by the hypervisor 111. The execution application identifier 2515 starts operating at the time of the notification from the application notifier 2511. The notification from the application notifier 2511 includes an application ID.

The hypervisor 111 receives the application ID (step S2701) and acquires the VM ID of the OS that switches the application (step S2702). After the acquisition, the hypervisor 111 updates the execution application field of a record of the application priority information table 2504 having a value of the VM ID field coinciding with the acquired VM ID, to the acquired application ID (step S2703). After the update, the hypervisor 111 determines whether the priority information of the execution application after the switching is lower than the priority information of the execution application before the switching (step S2704).

If the priority information of the execution application after the switching is lower (step S2704: YES), the hypervisor 111 calls the execution VM selector 2516 (step S2705) and terminates the process of the execution application identifier 2515. If the priority information of the execution application after the switching is not lower (step S2704: NO), the hypervisor 111 terminates the process of the execution application identifier 2515.

As described above, the scheduling program and the information processing apparatus notify the hypervisor when an application switching occurs. For example, the hypervisor according to the first and second embodiments executes a process of identifying an exception due to a switching of a page table among exceptions occurring due to multiple factors. However, the hypervisor according to the third embodiment may wait for a notification of switching of application from OS, thereby accelerating the process in the hypervisor.

Since the scheduling program according to the third embodiment modifies the OS side, the third embodiment may be applied when an easily modifiable OS is employed. If a hardly modifiable OS is employed, the first embodiment may be applied. Therefore, the information processing apparatus according to the third embodiment may change a form of application depending on the employed OS.

The information processing apparatus 100 according to a fourth embodiment is an example that an application notifier 2811 notifies a priority information registrar 2813. A notification to an application execution information manager 2812 is performed by the priority information registrar 2813. The information processing apparatus 100 according to the fourth embodiment will hereinafter be described with reference to FIGS. 28 to 30. A hardware example of the information processing apparatus 100 according to the fourth embodiment is the same as the information processing apparatus 100 according to the first embodiment depicted in FIG. 2 and will not be described. The information processing apparatus 100 according to the fourth embodiment will be described in terms of changes from the information processing apparatus 100 according to the first embodiment. The fourth embodiment is applicable to the information processing apparatus 100 according to the second embodiment.

Figure 28:
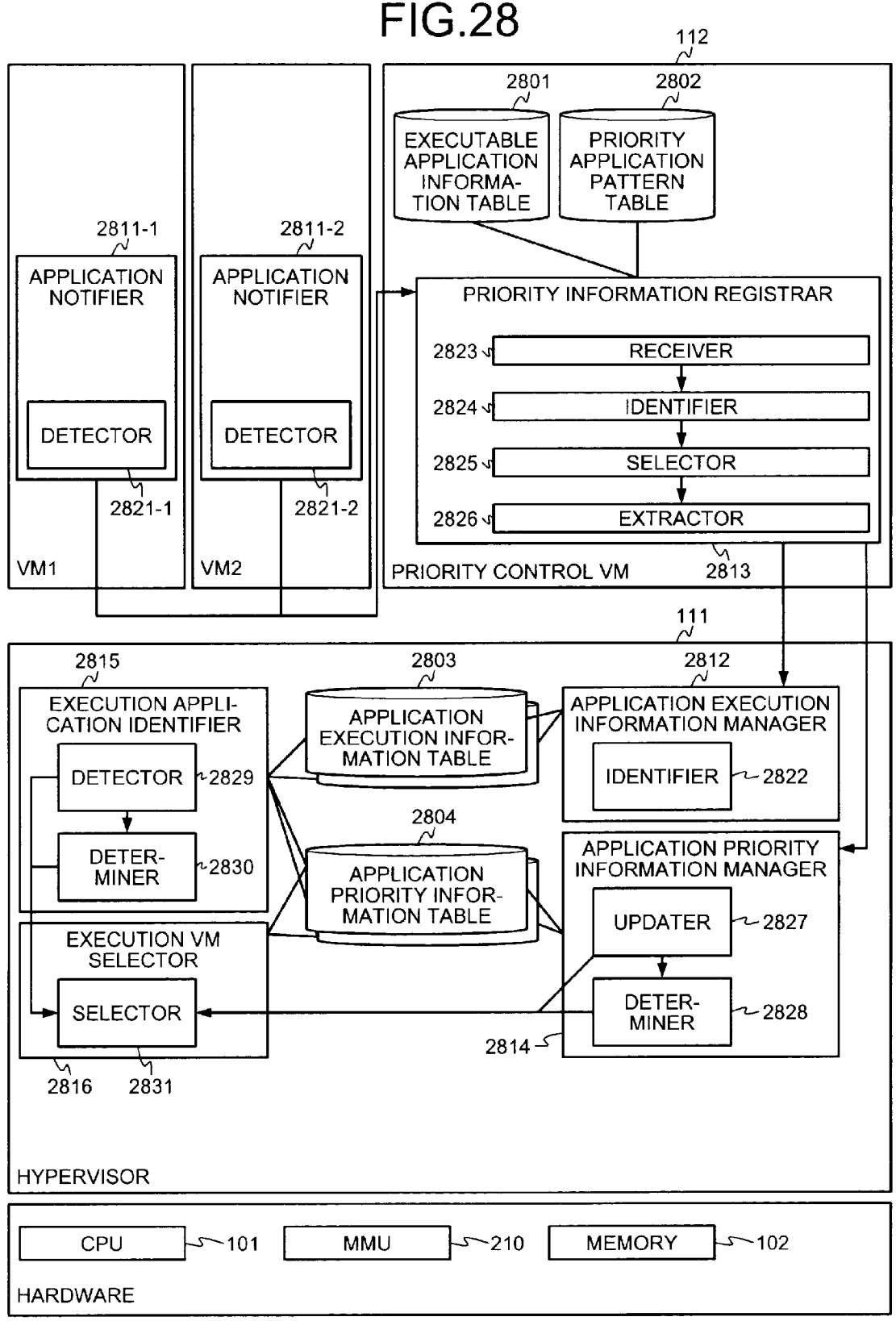
FIG. 28 is a block diagram of a functional example of the information processing apparatus 100 according to a fourth embodiment.

FIG. 28 is a block diagram of a functional example of the information processing apparatus 100 according to the fourth embodiment. The information processing apparatus 100 according to the fourth embodiment can access an executable application information table 2801 to an application priority information table 2804, as tables accessed from the functions. The storage contents of the executable application information table 2801 to the application priority information table 2804 are equivalent to the executable application information table 301, the priority application pattern table 113, the application execution information table 302, and the application priority information table 114 and will not be described.

The information processing apparatus 100 includes the application notifier 2811 to an execution VM selector 2816. The application execution information manager 2812 and the application priority information manager 2814 to the execution VM selector 2816 are the same functions as the application execution information manager 312 and the application priority information manager 314 to the execution VM selector 316 and will not be described. The information processing unit 100 also includes a detector 2821 to a selector 2831 within the application notifier 2811 to the execution VM selector 2816. The detector 2821, the identifier 2822, and the identifier 2824 to the selector 2831 are the same functions as the detector 321 and the identifier 323 to the selector 331 and will not be described. For the application notifier 2811, the notification destination of application activation and application termination is the priority information registrar 2813. The priority information registrar 2813 is notified by the application notifier 2811. The receiver 2823 is included in the priority information registrar 2813.

The receiver 2823 receives a change in the number of activations of completely activated software from any one of multiple OSs. For example, the receiver 2823 receives from the detector 2821 a notification that the application A is activated to be an executable application and causes an increase in the number of activations of completely activated software from the OS1.

Figure 29:
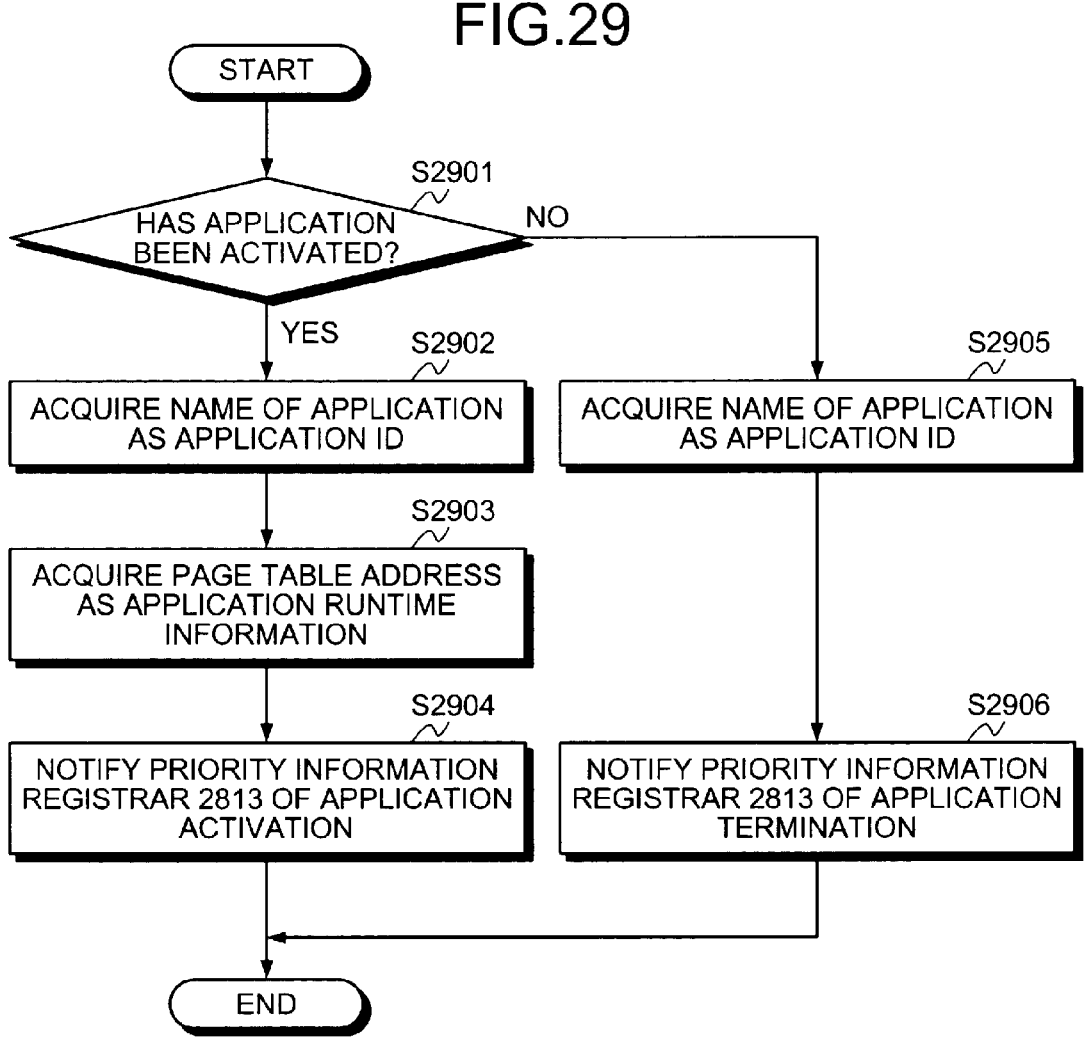
FIG. 29 is a flowchart of an example of a process procedure of an application notifier 2811 according to the fourth embodiment.

FIG. 29 is a flowchart of an example of the process procedure of the application notifier 2811 according to the fourth embodiment. The application notifier 2811 is executed by the VM1 and the VM2, which are virtual machines. The description of FIG. 29 will be made on the assumption that the VM1 executes the unit. The processes of step S2901 to step S2903 and step S2905 depicted in FIG. 29 are equivalent to the processes of step S1101 to step S1103 and step S1105 of the application notifier 311 depicted in FIG. 11 and will not be described.

After the completion of the process of step S2903, the VM1 notifies the priority information registrar 2813 of the application activation (step S2904) and terminates the process of the application notifier 2811. After the completion of the process of step S2905, the VM1 notifies the priority information registrar 2813 of the application termination (step S2906) and terminates the process of the application notifier 2811.

Figure 30:
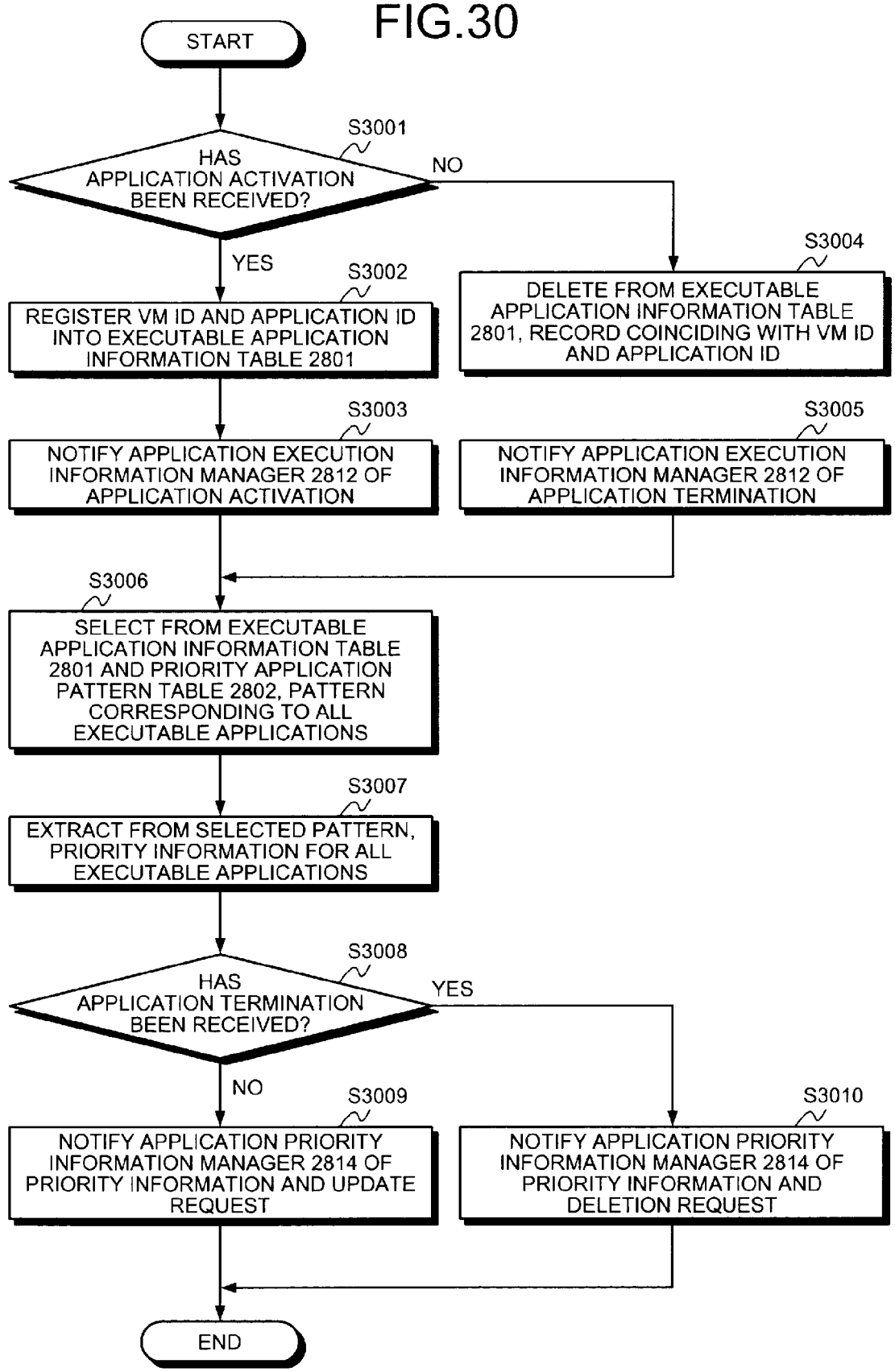
FIG. 30 is a flowchart of an example of a process procedure of a priority information registrar 2813 according to the fourth embodiment.

FIG. 30 is a flowchart of an example of the process procedure of the priority information registrar 2813 according to the fourth embodiment. The priority information registrar 2813 is executed by the priority control VM 112. The priority information registrar 2813 starts operating at the time of the notification from the application notifier 2811. The contents of the notification from the application notifier 2811 include the VM ID, the application ID, and the application runtime information. The processes of step S3001, step S3002, step S3004, and step S3006 to step S3010 depicted in FIG. 30 are equivalent to the processes of step S1301 to step S1308 of the priority information registrar 313 depicted in FIG. 13 and will not be described.

The executable application information table 301 to be processed at step S1302 to step S1304 is replaced with the executable application information table 2801 in the processes of step S3002, step S3004, and step S3006. The priority application pattern table 113 to be processed at step S1304 is replaced with the priority application pattern table 2802 in the process of step S3006. The application priority information manager 314 to be processed at step S1307 and step S1308 is replaced with the application priority information manager 2814 in the processes of step S3009 and step S3010.

After the completion of the process of step S3002, the priority control VM 112 notifies the application execution information manager 2812 of the application activation (step S3003) and proceeds to the operation at step S3006. After the completion of the process of step S3004, the priority control VM 112 notifies the application execution information manager 2812 of the application termination (step S3005) and proceeds to the operation at step S3006.

As described above, the scheduling program and the information processing apparatus cause the priority control VM to receive a notification from a VM. The information processing apparatus according to the second embodiment temporarily stores information indicative of foreground or background in the hypervisor. However, the information processing apparatus according to the fourth embodiment can change operation by storing the VM ID, the application ID, and the priority information in the storage area managed by the hypervisor and changing only the priority control VM.

The information processing apparatus 100 according to a fifth embodiment is an example when an application notifier 3111 is included in the hypervisor 111. The information processing apparatus 100 according to the fifth embodiment will hereinafter be described with reference to FIGS. 31 to 33. A hardware example of the information processing apparatus 100 according to the fifth embodiment is the same as the information processing apparatus 100 according to the first embodiment depicted in FIG. 2 and will not be described. The information processing apparatus 100 according to the fifth embodiment will be described in terms of changes from the information processing apparatus 100 according to the first embodiment. The fifth embodiment is applicable to the information processing apparatus 100 according to the second embodiment.

Figure 31:
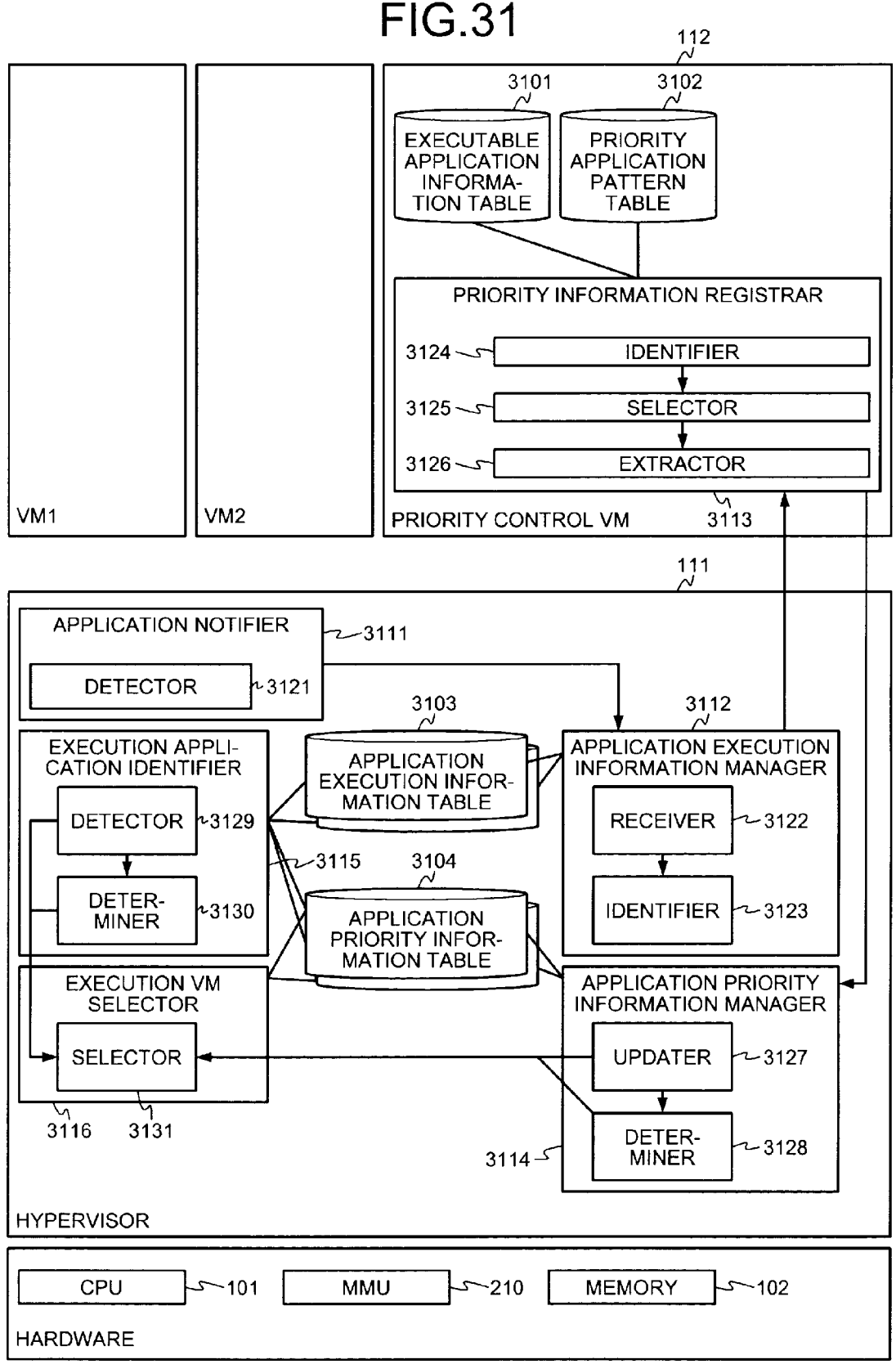
FIG. 31 is a block diagram of a functional example of the information processing apparatus 100 according to a fifth embodiment.

FIG. 31 is a block diagram of a functional example of the information processing apparatus 100 according to the fifth embodiment. The information processing apparatus 100 according to the fifth embodiment can access an executable application information table 3101 to an application priority information table 3104, as tables accessed from the functions. The storage contents of the executable application information table 3101 to the application priority information table 3104 are equivalent to the executable application information table 301, the priority application pattern table 113, the application execution information table 302, and the application priority information table 114 and will not be described.

The information processing apparatus 100 includes the application notifier 3111 to an execution VM selector 3116. The application notifier 3111 to the execution VM selector 3116 are the same functions as the application notifier 311 to the execution VM selector 316 and will not be described. The information processing unit 100 also includes a detector 3121 to a selector 3131 within the application notifier 3111 to the execution VM selector 3116. The identifier 3123 to the selector 3131 are the same functions as the identifier 323 to the selector 331 and will not be described. The detector 3121 is included in the application notifier 3111. The application notifier 3111 is a function included in the hypervisor 111.

The detector 3121 has a function of detecting that a system call is issued that changes the number of activations of completely activated software in any one of multiple OSs. For example, the detector 3121 detects that a system call of application activation and a system call of application termination are issued. The detected data is stored in the storage area such as the register of the CPU 101, the cache memory of the CPU 101, the RAM 202, and the flash ROM 203.

The receiver 3122 has a function of receiving a change in the number of activations of completely activated software corresponding to issuance of a system call. For example, if the detector 3121 detects issuance of a system call of application activation, the receiver 3122 receives an increase in the number of activations of completely activated software. A received change may be stored in the storage area such as the register of the CPU 101, the cache memory of the CPU 101, the RAM 202, and the flash ROM 203.

Figure 32:
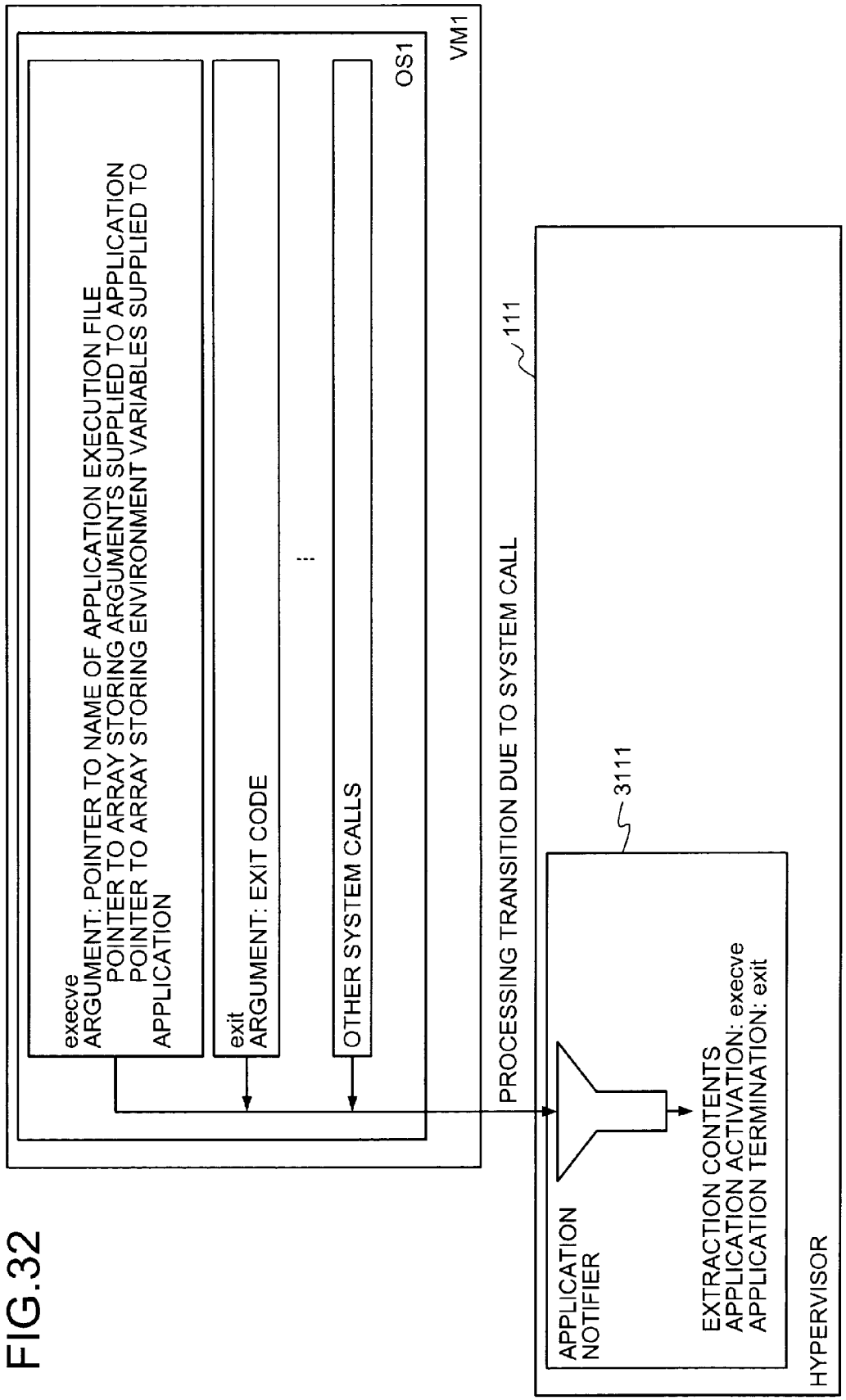
FIG. 32 is an explanatory view of an example of a method of detecting application activation or application termination according to the fifth embodiment.

FIG. 32 is an explanatory view of an example of a method of detecting application activation or application termination according to the fifth embodiment. If the OS1 on the VM1 generates a process included in an application, a system call executing a service provided by the OS is called. FIG. 32 depicts an example of the method of detecting application activation or application termination when a system call is called within OS.

First, the operation of the system call will be described. The CPU 101 has multiple operation modes and at least has a user mode while a user process operates and a privileged mode while a kernel operates. The system call is a mechanism for shifting the operation mode of the CPU from the user mode to the privileged mode to execute a process executable only in the privileged mode. For example, OS such as Linux (registered trademark) makes a copy of a process with a fork system call. Subsequently, the OS executes the execve system call for the process of the copy to expand a program of a specified file name, causing the process of the copy to execute the program.

Although an OS on a VM utilizes the system call mechanism for generating a process, if a process operating in the use mode issues a system call, the process is shifted to the hypervisor 111, instead of the kernel of the OS.

In the case of OS using the full virtualization, a mode for the hypervisor is added as an operation mode of the CPU in addition to the user mode and the privileged mode. If a system call is called, the CPU 101 shifts to the mode for the hypervisor instead of directly shifting from the user mode to the privileged mode. In this case, the hypervisor 111 executes a process of driving the OS to operate in the privileged mode to enable the process of the system call.

In the case of OS using the paravirtualization, since a mode for operation of the kernel is the user mode instead of the privileged mode, the process is shifted to the hypervisor operating in the privileged mode. Therefore, the hypervisor 111 performs callback for OS to an entry point for processing a system call to enable the OS to process the system call.

As described above, when a system call is executed on a VM, the information processing apparatus 100 shifts the process to the hypervisor 111. The hypervisor 111 extracts a system call related to application activation and a system call related to application termination among supplied system calls with the application notifier 3111 and notifies the application execution information manager 3112.

For example, in FIG. 32, it is assumed that the OS1 calls the execve system call, the exit system call, and other system calls and that the process is shifted to the hypervisor 111. In this case, the application notifier 3111 extracts the execve system call, which is a system call related to application activation, and the exit system call, which is a system call related to application termination. The application notifier 3111 acquires a name of an application from arguments of the system calls. The arguments are stored in a storage area such as the register of the CPU 101 or a stack area of processes. ABI (application binary interface) of OS specifically determines which storage area stores the arguments.

For example, it is assumed that the execve system call is executed under ARM (registered trademark) architecture. In this case, the process acting as a calling source of the execve system call stores a pointer to a name of an application execution file, into a general-purpose register r0, and a pointer to an array storing arguments supplied to an application, into a general-purpose register r1. The process acting as a calling source of the execve system call stores a pointer to an array storing environment variables supplied to an application, into a general-purpose register r2, and stores an immediate value of 11 indicative of the system call number of the execve system call, into a general-purpose register r7.

In response to the process shift due to a system call, the application notifier 3111 determines that the system call of application activation is called depending on whether the general-purpose register r7 is 11. After the determination, the application notifier 3111 refers to the pointer stored in the general-purpose register r0 to acquire the name of the application. With regard to a method of acquiring the application runtime information, the page table address and ASID currently set to the VM subject to operation are acquired.

Similarly, it is assumed that the exit system call is executed under ARM (registered trademark) architecture. In this case, the process acting as a calling source of the exit system call stores an exit code that is a return value of process termination, into the general-purpose register r0, and stores an immediate value of 1 indicative of the system call number of the exit system call, into the general-purpose register r7.

In response to the process shift due to a system call, the application notifier 3111 determines that the system call of application termination is called depending on whether the general-purpose register r7 is 1. After the determination, the application notifier 3111 acquires the corresponding application ID in the application execution information table 3103 from the current application runtime information.

Since the hypervisor 111 can acquire all the pieces of information set by the application notifier 311 on the application activation and the activation termination, the application notifier 311 can be transferred as the application notifier 3111 into the hypervisor 111.

Figure 33:
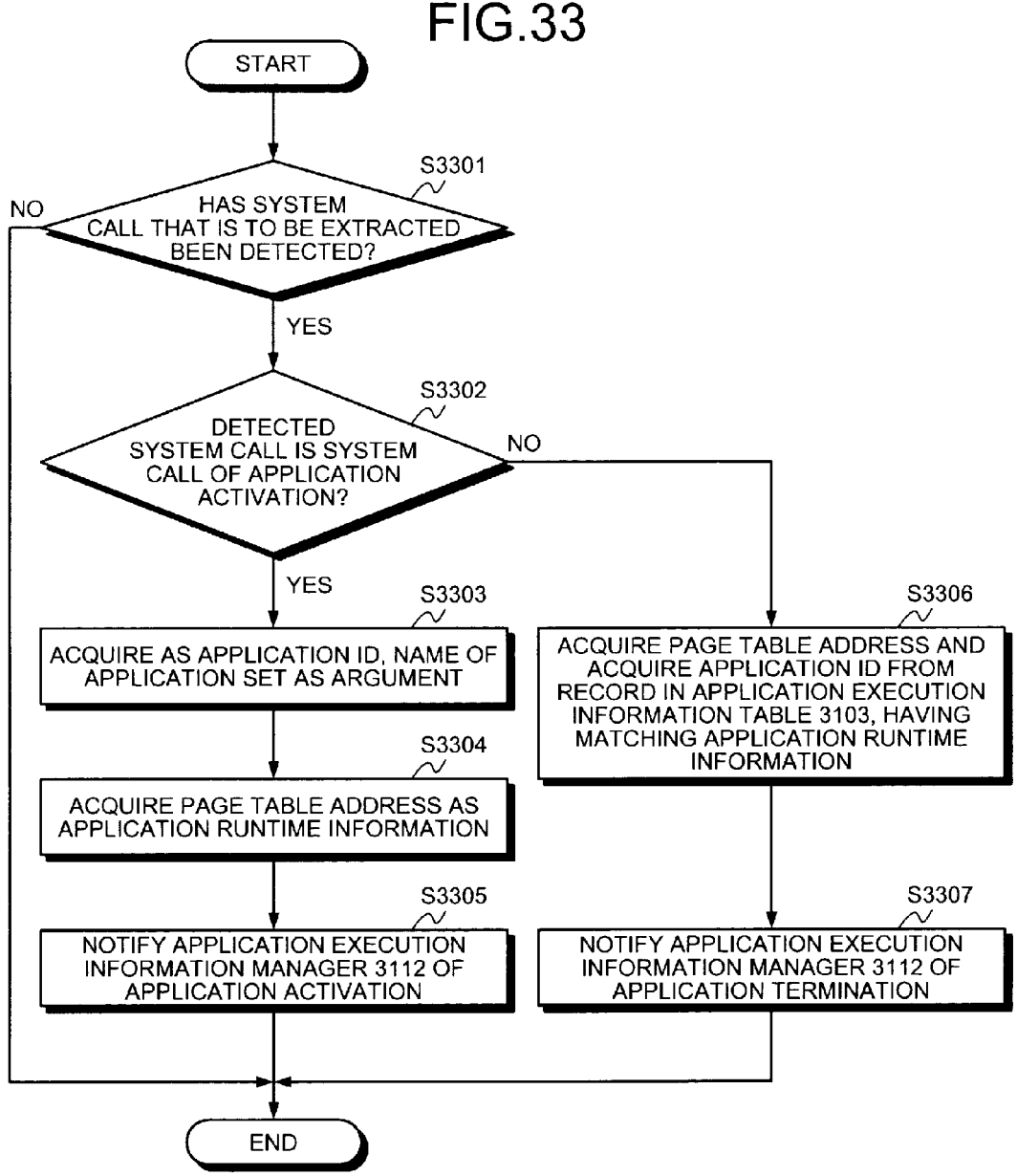
FIG. 33 is a flowchart of an example of a process procedure of an application notifier 3111 according to the fifth embodiment.

FIG. 33 is a flowchart of an example of the process procedure of the application notifier 3111 according to the fifth embodiment. The application notifier 3111 is executed by the hypervisor 111. The hypervisor 111 determines whether a system call that is to be extracted is detected (step S3301). If a system call that is to be extracted is not detected (step S3301: NO), the hypervisor 111 terminates the process of the application notifier 3111.

If a system call that is to be extracted is detected (step S3301: NO), the hypervisor 111 determines whether the detected system call is the system call of application activation (step S3302). In the case of the system call of application activation (step S3302: YES), the hypervisor 111 acquires the name of the application set as an argument, as an application ID (step S3303). Subsequently, the hypervisor 111 acquires the page table address as the application runtime information (step S3304). After the acquisition, the hypervisor 111 notifies the application execution information manager 3112 of the application activation (step S3305) and terminates the process of the application notifier 3111.

In the case of the system call of application termination (step S3302: NO), the hypervisor 111 acquires the page table address and acquires the application ID from a record of the application execution information table 3103 having the matching application runtime information (step S3306). After the acquisition, the hypervisor 111 notifies the application execution information manager 3112 of the application termination (step S3307) and terminates the process of the application notifier 3111.

As described above, the scheduling program and the information processing apparatus detect issuance of a system call that changes the number of activations of the executable applications. Therefore, the information processing apparatus according to the fifth embodiment can apply this scheduling program without changing an OS.

The information processing apparatus according to a sixth embodiment is an example that enables prioritization of an application specified by a user. The information processing apparatus 100 according to the sixth embodiment will hereinafter be described with reference to FIGS. 34 to 38. A hardware example of the information processing apparatus 100 according to the sixth embodiment is the same as the information processing apparatus 100 according to the first embodiment depicted in FIG. 2 and will not be described. The information processing apparatus 100 according to the sixth embodiment will be described in terms of changes from the information processing apparatus 100 according to the second embodiment. The sixth embodiment is applicable to the information processing apparatus 100 according to the first embodiment.

Figure 34:
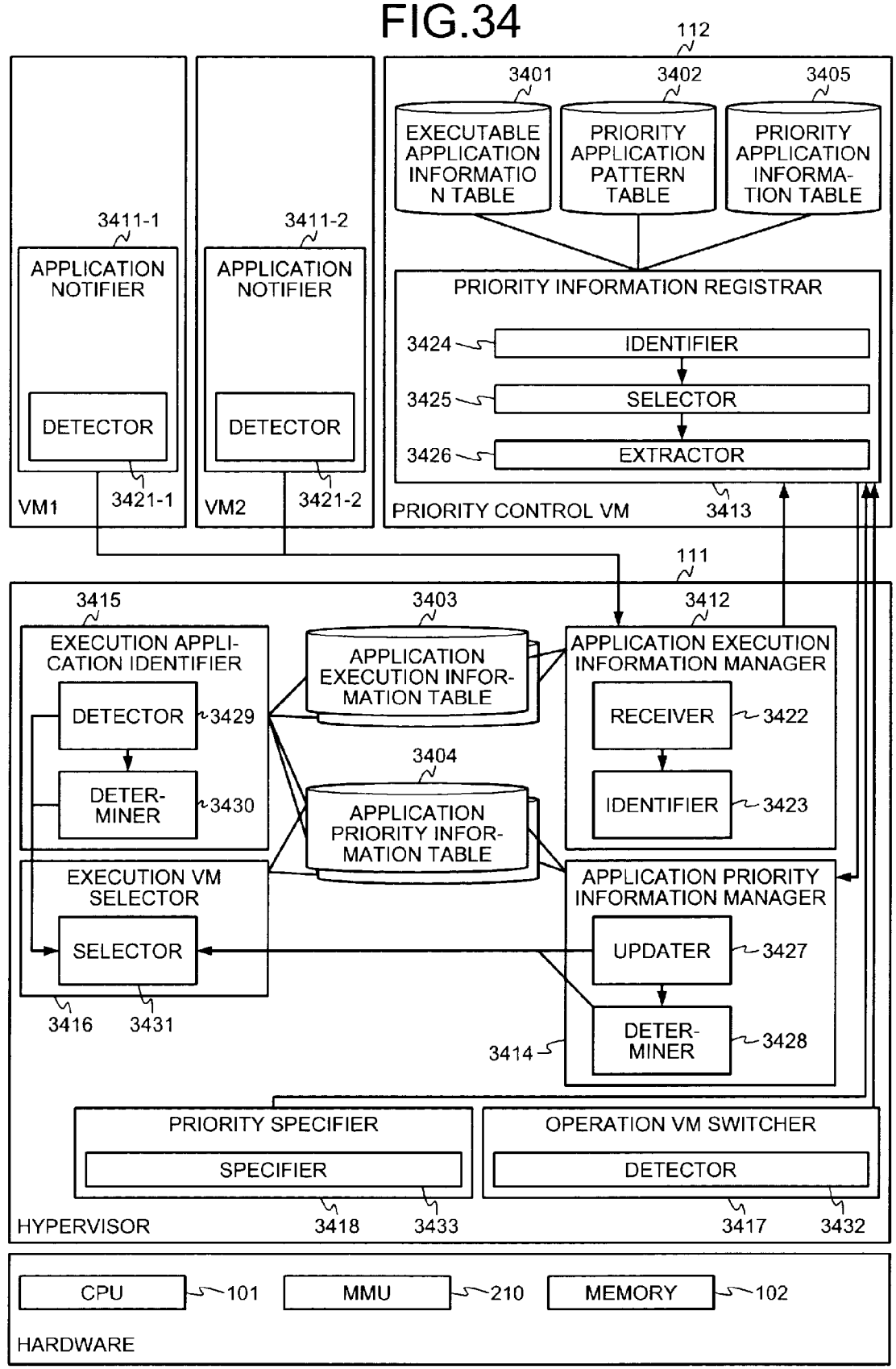
FIG. 34 is a block diagram of a functional example of the information processing apparatus 100 according to a sixth embodiment.

FIG. 34 is a block diagram of a functional example of the information processing apparatus 100 according to the sixth embodiment. The information processing apparatus 100 according to the sixth embodiment can access an executable application information table 3401 to an application priority information table 3404 and a priority application information table 3405, as tables accessed from the functions. The storage contents of the executable application information table 3401 to the application priority information table 3404 are equivalent to the executable application information table 1701 to the application priority information table 1704 and will not be described.

The information processing apparatus 100 includes an application notifier 3411 to an operation VM switcher 3417 and a priority specifier 3418. The application notifier 3411 to an operation VM switcher 3417 except the priority information registrar 3413 are the same functions as the application notifier 1711 to the operation VM switcher 1717 except the priority information registrar 1713 and will not be described. The information processing unit 100 also includes a detector 3421 to a detector 3432 and a specifier 3433 within the application notifier 3411 to the priority specifier 3418. The detector 3421 to the detector 3432 except the extractor 3426 are the same functions as the detector 1721 to the detector 1732 and will not be described. The specifier 3433 is included in the priority specifier 3418. The priority specifier 3418 is a function included in the hypervisor 111.

The priority application information table 3405 is a table that stores priority specifications specified by the priority specifier 3418. Details of the priority application information table 3405 will be described with reference to FIG. 35.

The priority specifier 3418 specifies priority information to the foreground application of the operation subject OS if a pre-specified button is pressed. The priority specifier 3418 notifies the priority information registrar 3413 of the specified priority specification.

If notified of the priority specification, the priority information registrar 3413 acquires the foreground application of the VM subject to operation from the executable application information table 3401 and extracts priority information of the acquired application. When extracting the priority information, the priority information registrar 3413 gives preference and refers to the priority application information table 3405 created due to the priority specification over the priority application pattern table 3402.

The specifier 3433 has a function of specifying a priority of operation subject software in the operation subject OS. For example, the specifier 3433 specifies a priority of the application B executed in the OS1 that is the operation subject OS. The specified priority is stored in the storage area such as the register of the CPU 101, the cache memory of the CPU 101, the RAM 202, and the flash ROM 203.

The extractor 3426 has a function of extracting a priority of each piece of software of the identified software group from the combination selected by the selector 3425 and the priorities specified by the specifier 3433.

For example, it is assumed that the selector 3425 selects a pattern registered as the application B having the priority information of 3 at the time of foreground and the priority information of 1 at the time of background and an OS executing the application B. It is also assumed that the specifier 3433 specifies the priority information of 5 as the priority specification of the application B. In this case, the extractor 3426 gives preference to the priority specification by the specifier 3433 and extracts 5 as the priority information of the application B.

FIG. 35 is an explanatory view of an example of storage contents in the priority application information table 3405. The fields included in the priority application information table 3405 make up a field group including the fields of the priority application pattern table 1702 except the pattern number field. Values stored in the fields of the priority application information table 3405 are the same as the priority application pattern table 1702 and will not be described.

The priority application information table 3405 depicted in FIG. 35 depicts four types of specification contents of the priority information. The four types of specification contents of the priority information are respectively indicated by priority specification 1 to priority specification 4 in FIG. 35. With regard to a trigger of the priority specification, the priority information is specified by pressing down a predetermined button among buttons on the keyboard 208. The information processing apparatus 100 may have four buttons prepared for specifying the priority information and the respective buttons may be allocated to the priority specification 1 to the priority specification 4.

The priority specification 1 is a specifying method of specifying the priority information regardless of a state of an object application. Specific specification contents of the priority specification 1 are as depicted in a priority application information table 3405-1, and a predetermined number of 5 is stored in the foreground field in the VM-under-operation field and in the background field in the VM-under-operation field. Similarly, in the priority application information table 3405-1, 5 is also set in the foreground field in the VM-not-under-operation field and in the background field in the VM-not-under-operation field.

The priority specification 2 is a specifying method of specifying the priority information when an object application is the executable application in the VM subject to operation and is in the foreground. Specific specification contents of the priority specification 2 are as depicted in a priority application information table 3405-2, and 5 is stored in the foreground field in the VM-under-operation field.

The priority specification 3 is a specifying method of specifying the priority information when an object application is in the foreground. Specific specification contents of the priority specification 3 are as depicted in a priority application information table 3405-3, and 5 is stored in the foreground field in the VM-under-operation field and in the foreground field in the VM-not-under-operation field.

The priority specification 4 is a specifying method of specifying the priority information when an object application is the executable application in the VM subject to operation. In specific specification contents of the priority specification 4, 5 is stored in the foreground field and the background field in the VM-under-operation field in a priority application information table 3405-4.

The predetermined number stored in the priority application information table 3405-1 to the priority application information table 3405-4 may be determined in advance or may be incremented by a constant number each time a predetermined button is pressed down. A button of cancelling the specification of the priority information may be determined among the buttons on the keyboard 208.

FIG. 36 is a flowchart of an example of the process procedure of the priority specifier 3418 according to the sixth embodiment. The priority specifier 3418 is executed by the hypervisor 111. The priority specifier 3418 is executed when any button in the keyboard 208 is pressed down.

The hypervisor 111 determines whether a button determined as priority specification is pressed down (step S3601). If the button determined as priority specification is pressed down (step S3601: YES), the hypervisor 111 notifies the priority information registrar 3413 of the priority specification (step S3602) and terminates the process of the priority specifier 3418. If four buttons determined as the priority specification 1 to the priority specification 4 exist as depicted in FIG. 35, the hypervisor 111 may make a notification of the corresponding priority specification in the process of step S3602.

If the button determined as priority specification is not pressed down (step S3601: NO), the hypervisor 111 determines whether a button determined as priority specification cancellation is pressed down (step S3603). If the button determined as priority specification cancellation is pressed down (step S3603: YES), the hypervisor 111 notifies the priority information registrar 3413 of the priority specification cancellation (step S3604) and terminates the process of the priority specifier 3418. If the button determined as priority specification cancellation is not pressed down (step S3603: NO), the hypervisor 111 terminates the process of the priority specifier 3418.

A flowchart of an example of the process procedure of the priority information registrar 3413 will be described with reference to FIGS. 37 and 38. The priority information registrar 3413 is executed by the priority control VM 112. The processes of step S3801 to step S3811 depicted in FIG. 38 are equivalent to the processes of step S2401 to step S2412 of the priority information registrar 313 depicted in FIG. 24 except step S3809 and will not be described.

The executable application information table 1701 to be processed at step S2402 and step S2404 is replaced with the executable application information table 3401 in the processes of step S3802 and step S3804. Similarly, the executable application information table 1701 to be processed at step S2406 to step S2408 is replaced with the executable application information table 3401 in the processes of step S3806 to step S3808. The priority application pattern table 1702 to be processed at step S2408 is replaced with the priority application pattern table 3402 in the process of step S3808.

The application priority information manager 1714 to be processed at step S2411 and step S2412 is replaced with the application priority information manager 3414 in the processes of step S3811 and step S3812.

Figure 37:
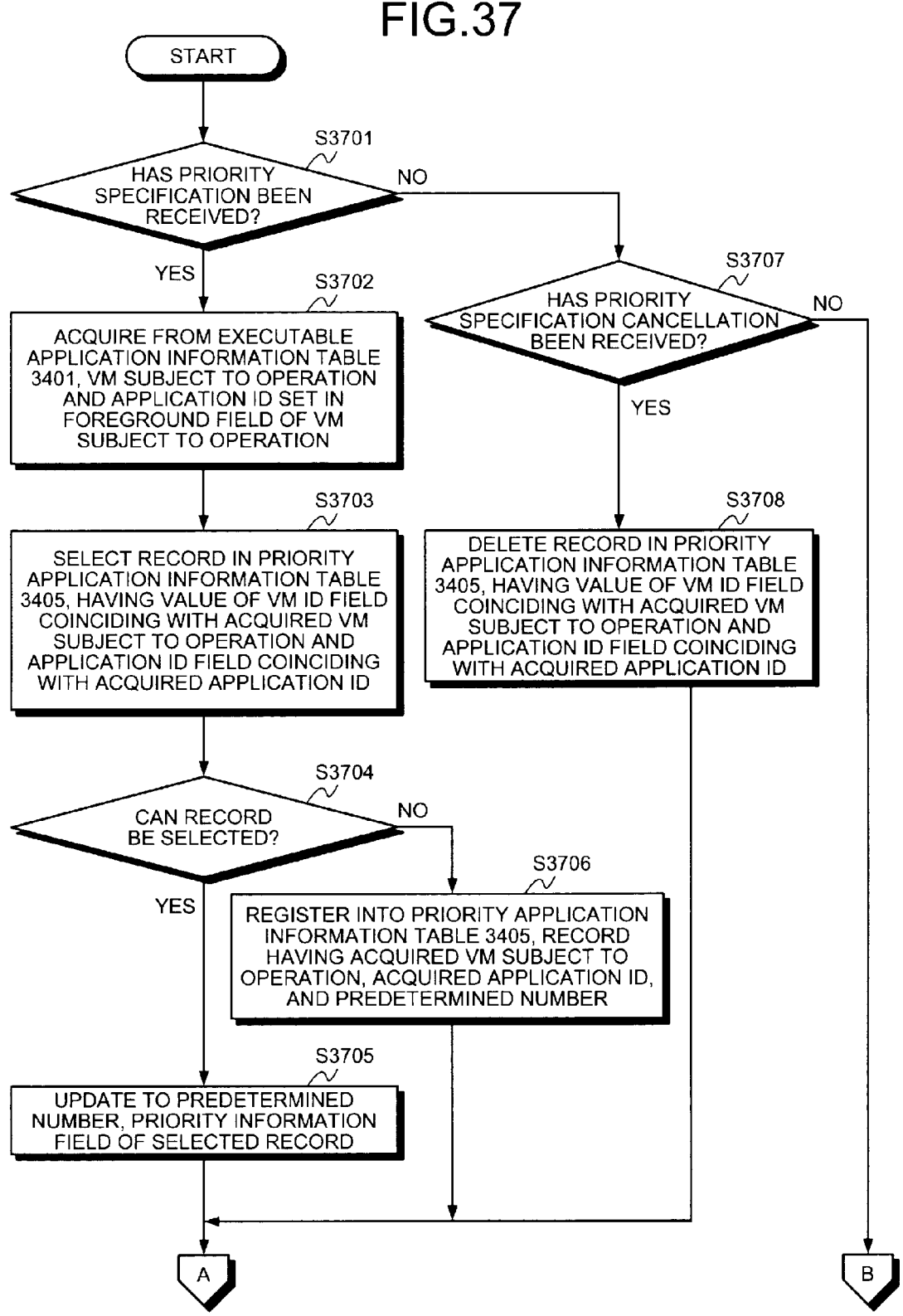
FIG. 37 is a flowchart (part 1) of an example of a process procedure of a priority information registrar 3413 according to the sixth embodiment.
Figure 38:
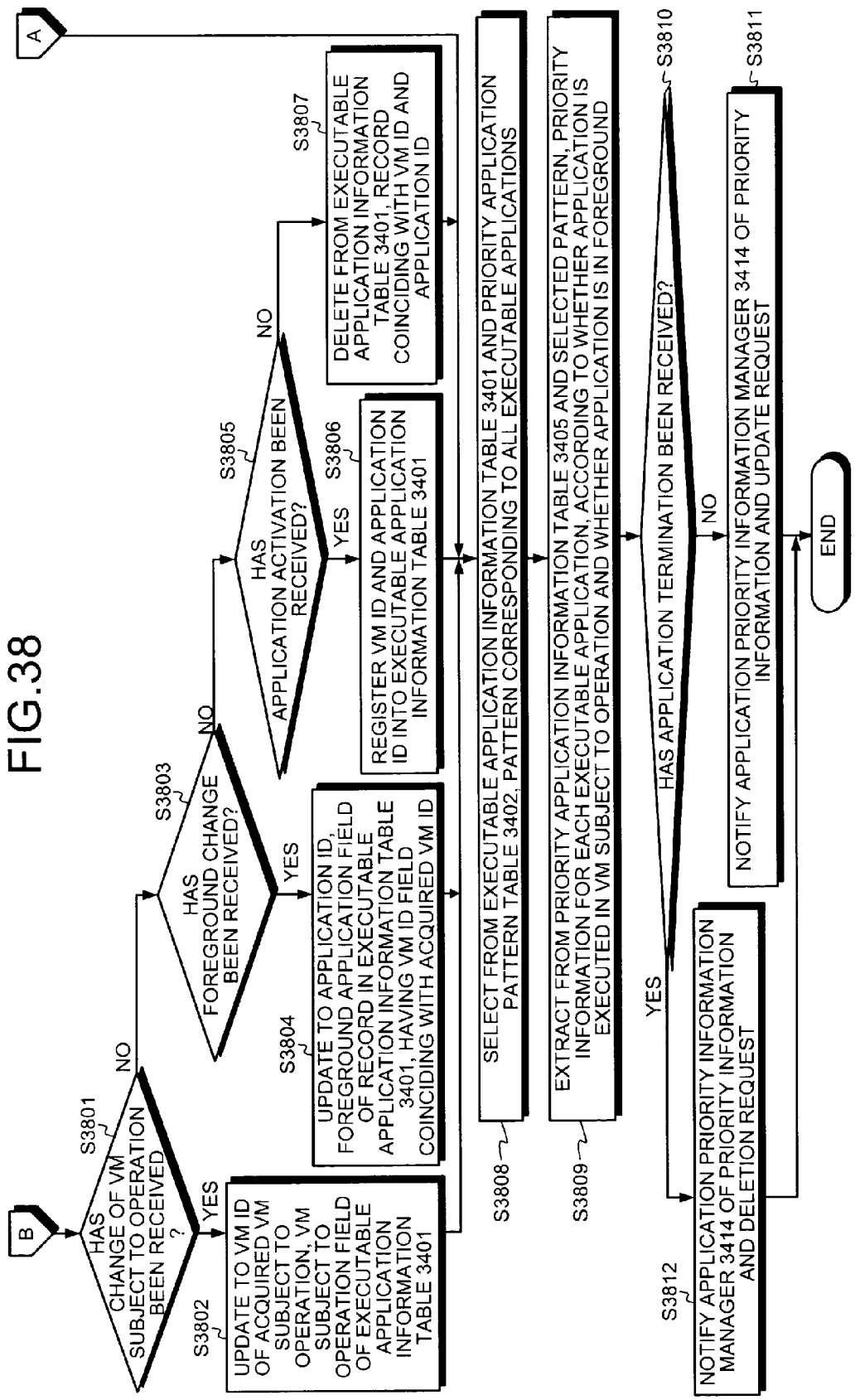
FIG. 38 is a flowchart (part 2) of the example of the process procedure of a priority information registrar 3413 according to the sixth embodiment.

FIG. 37 is a flowchart (part 1) of an example of the process procedure of the priority information registrar 3413 according to the sixth embodiment. The priority control VM 112 determines whether the priority specification been received (step S3701). If the priority specification been received (step S3701: YES), the priority control VM 112 acquires the VM subject to operation and the application ID set in the foreground field of the VM subject to operation from the executable application information table 3401 (step S3702). After the acquisition, the priority control VM 112 selects a record of the priority application information table 3405 having a value of the VM ID field coinciding with the acquired VM subject to operation and the application ID field coinciding with the acquired application ID (step S3703).

Subsequently, the priority control VM 112 determines whether the record can be selected (step S3704). If the record can be selected (step S3704: YES), the priority control VM 112 updates the priority information field of the selected record to a predetermined number (step S3705) and proceeds to the operation at step S3808. If the record cannot be selected (step S3704: NO), the priority control VM 112 registers into the priority application information table 3405, a record having the acquired VM subject to operation, the acquired application ID, and the predetermined number (step S3706). After the registration, the priority control VM 112 proceeds to the operation at step S3808.

Which sub-field in the priority information field stores the predetermined number may be changed depending on a type of the priority specification of the notification. For example, in the case of the notification of the priority specification 1, the priority control VM 112 stores the predetermined number in all the sub-fields in the priority information field.

If the priority specification is not received (step S3701: NO), the priority control VM 112 determines whether the priority specification cancellation been received (step S3707). If the priority specification cancellation been received (step S3707: YES), the priority control VM 112 deletes a record of the priority application information table 3405 having a value of the VM ID field coinciding with the acquired VM subject to operation and the application ID field coinciding with the acquired application ID (step S3708). After the deletion, the priority control VM 112 proceeds to the operation at step S3808. If the priority specification cancellation is not received (step S3707: NO), the priority control VM 112 proceeds to the operation at step S3801.

FIG. 38 is a flowchart (part 2) of the example of the process procedure of the priority information registrar 3413 according to the sixth embodiment. After the process of step S3808, the priority control VM 112 extracts the priority information of all the executable applications from the priority application information table 3405 and the selected pattern depending on whether each application is executed in the VM subject to operation and whether each application is in the foreground (step S3809). After the extraction, the priority control VM 112 proceeds to the operation at step S3810.

As described above, the scheduling program and the information processing apparatus update a priority of an application in accordance the priority specification. Therefore, the information processing apparatus according to the sixth embodiment can preferentially execute the application that a user wants to preferentially execute.

The scheduling method described in the present embodiment may be implemented by executing a prepared program on a computer such as a personal computer and a workstation. The program is stored on a computer-readable medium such as a hard disk, a flexible disk, a CD-ROM, an MO, and a DVD, read out from the recording medium, and executed by the computer. The program may be distributed through a network such as the Internet. However, the computer-readable medium does not include a transitory medium such as a propagation signal.

One aspect of the present invention achieves an effect of enabling the scheduling of OSs according to the execution state applications operated on the apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein a scheduling program that causes a computer to execute a process, the process comprising:
   executing a plurality of virtual computing machines, with each virtual computing machine operating a respective OS;
   receiving a change in the number of activations of completely activated software from the respective OSs;
   updating when the change in the number of activations has been received, a first table that stores software completely activated in the respective OSs;
   selecting from a second table that stores combinations of a completely activated software group, a combination according to a software group stored in the first table;
   extracting from the second table and according to the selected combination, priorities of software stored for each of the combinations;
   updating the priorities of the software stored in the first table to the extracted priorities;
   determining whether any software stored in the first table is in an execution state;
   determining whether the OS executing software stored in the first table is an execution OS;
   determining a high/low relationship between priorities of software before and after execution, the software being stored in the first table; and
   selecting based on a determination result obtained at the determining, a virtual computing machine that operates the execution OS.

2. The computer-readable medium according to claim 1, the process further comprising:
   receiving a change of operation subject software in the OS;
   identifying the operation subject software when the change of operation subject software has been received; and
   extracting from the second table that stores the priority corresponding to operation subject software, a priority corresponding to the identified operation subject software.

3. The computer-readable medium according to claim 1, the process further comprising:
   detecting that an operation subject OS has changed;
   identifying the operation subject OS after the change of the operation subject OS is detected at the detecting; and
   extracting from the second table that stores a priority corresponding to each operation subject OS, a priority corresponding to the identified operation subject OS.

4. The computer-readable medium according to claim 1, the process further comprising:
   detecting that a system call has been issued that changes the number of activations of the completely activated software in the OS; and
   receiving when the issuance of the system call is detected, a change in the number of activations of the completely activated software consequent to the issuance of the system call.

5. The computer-readable medium according to claim 1, the process further comprising:
   specifying the priority of operation subject software in the operation subject OS; and
   extracting the priority of software managed in the first table according to the selected combination and the specified priority.

6. The computer-readable medium according to claim 1, the process further comprising:
   detecting that software in the execution state in the OS has been switched;

determining a high/low relationship between the priority of software before the switching and the priority of software after the switching, when the switching of the software in the execution state is detected; and selecting based on a determination result obtained at the determining, a virtual computing machine that operates the execution OS.

7. An information processing apparatus comprising:

a first non-transitory storage device that manages software completely activated by an OS operating on the information processing apparatus and stores priorities of the managed software:

a second non-transitory storage device that stores combinations of completely activated software groups and for each of the combinations, stores priorities for the software;

a plurality of virtual computing machines that operate a respective OS;

a receiver that receives a change in the number of activations of completely activated software from the respective OSs;

an identifier that when the change in the number of activations has been received, updates the first storage device that stores the software completely activated in the respective OSs after the change in the number of activations;

a first selector that selects from the second storage device, a combination corresponding to a software group stored in the first storage device;

an extractor that extracts from the second storage device and according to the selected combination, priorities of software stored in the first storage device;

an updater that updates the priorities of the software stored in the first storage device to the extracted priorities;

a second selector that refers to the priorities updated by the updater and selects a virtual machine that operates an execution OS;

determining whether any software stored in the first table is in an execution state;

determining whether the OS executing software stored in the first table is an execution OS;

determining a high/low relationship between priorities of software before and after execution, the software being stored in the first table; and selecting based on a determination result obtained at the determining, a virtual computing machine that operates the execution OS.

8. A non-transitory computer-readable recording medium storing therein a scheduling program that causes a computer to execute a process, the process comprising:

executing a plurality of virtual computing machines, with each virtual computing machine operating a respective OS;

receiving a change in the number of activations of completely activated software from the respective OSs;

updating when the change in the number of activations has been received, a first table that retains completely activated software, and priority information of software in a combined manner for each of the virtual computing machines;

selecting from a second table that for each combination pattern of the completely activated software group, stores priorities of software in the completely activated software groups, a combination pattern according to a software group stored in the first table;

extracting from the second table and according to the selected combination pattern, priorities of software stored for each of the combinations;

updating the priorities of the software stored in the first table to the extracted priorities;

determining whether any software stored in the first table is in an execution state;

determining whether the OS executing software stored in the first table is an execution OS;

determining a high/low relationship between priorities of software before and after execution, the software being stored in the first table; and selecting based on a determination result obtained at the determining, a virtual computing machine that operates the execution OS.

9. An information processing apparatus comprising:

a plurality of virtual computing machines that operate a respective OS;

a first non-transitory storage device that retains completely activated software, and priority information of software in a combined manner for each of the virtual computing machines;

a second non-transitory storage device that for each combination patterns of completely activated software groups, stores priorities of software in the completely activated software groups;

a receiver that receives a change in the number of activations of completely activated software from the respective OSs;

an identifier that when the change in the number of activations has been received, updates the first storage device that stores the software completely activated in the respective OSs after the change in the number of activations;

a first selector that selects from the second storage device, a combination pattern corresponding to a software group stored in the first storage device;

an extractor that extracts from the second storage device and according to the selected combination pattern, priorities of software stored in the first storage device;

an updater that updates the priorities of the software stored in the first storage device to the extracted priorities;

a second selector that refers to the priorities updated by the updater and selects a virtual machine that operates an execution OS;

determining whether any software stored in the first table is in an execution state;

determining whether the OS executing software stored in the first table is an execution OS;

determining a high/low relationship between priorities of software before and after execution, the software being stored in the first table; and selecting based on a determination result obtained at the determining, a virtual computing machine that operates the execution OS.

* * * * *